(12) United States Patent
Ahn et al.

(10) Patent No.: US 11,438,840 B2
(45) Date of Patent: Sep. 6, 2022

(54) WIRELESS COMMUNICATION METHOD AND WIRELESS COMMUNICATION TERMINAL USING VARIABLE-LENGTH WAKE-UP FRAME

(71) Applicant: WILUS INSTITUTE OF STANDARDS AND TECHNOLOGY INC., Gyeonggi-do (KR)

(72) Inventors: Woojin Ahn, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

(*) Notice: Subject to any disclaimer, the term of this patent is extended or adjusted under 35 U.S.C. 154(b) by 0 days.

(21) Appl. No.: 17/040,188

(22) PCT Filed: Mar. 22, 2019

(86) PCT No.: PCT/KR2019/003409
§ 371 (c)(1),
(2) Date: Nov. 13, 2020

(87) PCT Pub. No.: WO2019/182420
PCT Pub. Date: Sep. 26, 2019

(65) Prior Publication Data
US 2021/0195524 A1    Jun. 24, 2021

(30) Foreign Application Priority Data

Mar. 22, 2018 (KR) .................. 10-2018-0033252
May 5, 2018 (KR) .................. 10-2018-0052187
(Continued)

(51) Int. Cl.
*G08C 17/00* (2006.01)
*H04W 52/02* (2009.01)
*H04L 69/324* (2022.01)

(52) U.S. Cl.
CPC ....... *H04W 52/0229* (2013.01); *H04L 69/324* (2013.01)

(58) Field of Classification Search
None
See application file for complete search history.

(56) References Cited

U.S. PATENT DOCUMENTS 10,856,228 B1 * 12/2020 Chu .................. H04W 52/0235
2008/0049654 A1   2/2008 Otal et al.
(Continued)

OTHER PUBLICATIONS

Asterjadhi, Alfred et al. Considerations on VL WUR frames, IEEE 802.11 Documents. IEEE 802.11-18/0420r0. Mar. 5, 2018.
(Continued)

*Primary Examiner* — Gerald A Smarth
(74) *Attorney, Agent, or Firm* — Ladas & Parry, LLP

(57) ABSTRACT

A wireless communication terminal for wireless communicating includes a first wireless transceiver transmitting and receiving a signal through a first waveform, a second wireless receiver receiving a signal through a second waveform different from the first waveform, and a processor. The processor may be configured to start receiving a variable length Wake-Up frame through the second wireless receiver, from a base wireless communication terminal of a basic service set (BSS) to which the wireless communication terminal belongs, determine whether or not a Frame Body field of the Wake-Up frame includes an identifier of the wireless communication terminal, when an ID field of the Wake-Up frame indicates an identifier of a group including the wireless communication terminal, and wake up the first wireless transceiver based on the Wake-Up frame, when the
(Continued)

Frame Body field of the Wake-Up frame includes the identifier of the wireless communication terminal.

14 Claims, 26 Drawing Sheets

(30) Foreign Application Priority Data

| | | | |
|---|---|---|---|
| May 10, 2018 | (KR) | ......................... | 10-2018-0053494 |
| Jul. 12, 2018 | (KR) | ......................... | 10-2018-0081077 |
| Sep. 7, 2018 | (KR) | ......................... | 10-2018-0107278 |
| Jan. 8, 2019 | (KR) | ......................... | 10-2019-0002437 |

(56) References Cited

U.S. PATENT DOCUMENTS

| | | | | |
|---|---|---|---|---|
| 2008/0181156 | A1 | 7/2008 | Ecclesine | |
| 2008/0310391 | A1* | 12/2008 | Schneidman | ..... H04W 28/0289 370/349 |
| 2017/0026151 | A1* | 1/2017 | Adachi | ............... H04W 72/005 |
| 2017/0134943 | A1 | 5/2017 | Min et al. | |
| 2018/0317172 | A1* | 11/2018 | Lepp | ................... H04W 68/005 |
| 2019/0007904 | A1 | 1/2019 | Asterjadhi et al. | |
| 2020/0367157 | A1* | 11/2020 | Kim | ..................... H04W 52/02 |

OTHER PUBLICATIONS

Huang, Lei et al. Discussion on Group ID Structure. IEEE 802.11 Documents. IEEE 802.11-18/0472r3. Mar. 8, 2018.

Ahn, Woojin et al. Discussion on WUR identifiers. IEEE 802.11 Documents. IEEE 802.11-18/0507r2. Mar. 14, 2018.

Kim, Suhwook et al. Data transmission detail in WUR mode. IEEE 802.11 Documents. IEEE 802.11-18/0154r0, Jan. 14, 2018.

Kim, Jeongki et al. Clarification for Variable-length WUR frame. IEEE 802.11 Documents. IEEE 802.11-17/0104r1. Jan. 18, 2018.

International Search Report for PCT/KR2019/003409 dated Jul. 11, 2019 and its English translation from WIPO (now published as WO2019/182420).

Written Opinion of the International Searching Authority for PCT/KR2019/003409 dated Jul. 11, 2019 and its English translation from WIPO (now published as WO2019/182420).

International Search Report for PCT/KR2018/012948 dated Feb. 13, 2019 and its English translation from WIPO (now published as WO2019/083346).

Written Opinion of the International Searching Authority for PCT/KR2018/012948 dated Feb. 13, 2019 and its English translation from WIPO (now published as WO2019/083346).

International Preliminary Report on Patentability (Chapter I) for PCT/KR2018/012948 dated Apr. 28, 2020 and its English translation from WIPO (now published as WO2019/083346).

International Preliminary Report on Patentability for PCT/KR2019/003409 dated Sep. 22, 2020 and its English translation from WIPO.

Son, John et al., "WUR Signaling Field", IEEE 802.11-17/0049r0, Jan. 14, 2017. See slides 3, 6.

Lim, Dong Guk et al. "Consideration on WUR Frame Structure," IEEE 802.11-17/0036r2, Jan. 17, 2017, See slides 2, 8, 12.

Office Action dated May 31, 2021 for Indian Patent Application No. 202027018219.

Office Action dated Jun. 23, 2021 for U.S. Appl. No. 16/759,320.

Yang Liu et al.: "Energy Efficiency and Resource Allocation of IEEE 802.15.6 IR-UWB WBANs: Current State-of-the-Art and Future Directions", 2017 Information Theory and Applications Workshop (ITA), IEEE, 2017, pp. 1-17.

Notice of Allowance dated Oct. 15, 2021 for U.S. Appl. No. 16/759,320.

Williams, Jennifer M. et al.: "Weaving the wireless web: toward a low-power, dense wireless sensor network for the industrial IoT", IEEE Microwave Magazine 18.7 (Nov./Dec. 2017); pp. 40-63.

\* cited by examiner (a)

(b)

(c)

(d)

(a)

(b)

(c)

(d)

| Type (Wake-Up Frame or WUR Beacon) | (Length Present)/ Special Control | Misc. | Reserved | ID (TXID) | TD Control | FCS |

*FIG. 23*

WIRELESS COMMUNICATION METHOD AND WIRELESS COMMUNICATION TERMINAL USING VARIABLE-LENGTH WAKE-UP FRAME

TECHNICAL FIELD

The present invention relates to a wireless communication method and a wireless communication terminal using a wake-up radio. More specifically, the present invention relates to a wireless communication method and a wireless communication terminal using a variable length Wake-Up frame.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

In particular, as mobile devices including built-in batteries as a power source are proliferating and the usage time of mobile devices becomes important, the energy efficiency of the wireless communication terminal is also being important. Therefore, a wireless communication method is required that is capable of increasing the energy efficiency of the wireless communication terminal. A method mainly used to increase energy efficiency in the wireless LAN is to increase energy efficiency by the wireless communication terminal entering a doze state when not being used. However, since the wireless communication terminal entering the doze state does not perform wireless communication, wireless communication between the wireless communication terminal and an external device may be restricted. In addition, the wireless communication terminal may have to periodically wake up from the doze state to receive a wireless signal transmitted from the external device to the wireless communication terminal. Accordingly, a method of using a separate wake-up radio for triggering interruption of power save mode by the wireless communication terminal is presented. When the wireless communication terminal uses the wake-up radio, the wireless communication terminal includes a wake-up radio receiver for receiving a wake-up radio at low power, and in the doze state, the wireless communication terminal may receive the wake-up radio through the wake-up radio receiver.

DISCLOSURE

Technical Problem

An object of an embodiment of the present invention is to provide a wireless communication terminal using a wake-up radio.

Technical Solution

According to an embodiment of the present invention, a wireless communication terminal for wireless communicating includes a first wireless transceiver transmitting and receiving a signal through a first waveform, a second wireless receiver receiving a signal through a second waveform different from the first waveform, and a processor. The processor is configured to: start receiving a variable length Wake-Up frame through the second wireless receiver, from a base wireless communication terminal of a basic service set (BSS) to which the wireless communication terminal belongs, determine whether or not a Frame Body field of the Wake-Up frame includes an identifier of the wireless communication terminal, when an ID field of the Wake-Up frame indicates an identifier of a group including the wireless communication terminal, and wake up the first wireless transceiver based on the Wake-Up frame, when the Frame Body field of the Wake-Up frame includes the identifier of the wireless communication terminal. The Frame Body field of the Wake-Up frame may not include the identifier of the wireless communication terminal that is not included in the group identified by the ID field, when the Wake-Up frame has a variable length and the ID field of the Wake-Up frame indicates a group identifier identifying a group including one or more wireless communication terminal.

The processor may be configured to receive, from the base wireless communication terminal, a bitmap indicating a starting group identifier indicating a group identifier corresponding to a first bit of the bitmap, and a group identifier allocated to a group including the wireless communication terminal together with the starting group identifier, and determine, as the group identifier allocated to the group including the wireless communication terminal, a value obtained by applying a modulo operation that uses a value obtained based on the starting group identifier and the bitmap as a numerator and the maximum number of values that the ID field is able to represent as a denominator.

The processor may be configured to determine that a group identifier corresponding to (SGID+n) %(2^12) is allocated to the group including the wireless communication terminal when a value of a bit position n of the bitmap is 1. In this case, a bit position 0 of the bitmap may indicate a first bit of the bitmap, and the SGID may be the starting group identifier.

The processor may be configured to stop receiving the Wake-Up frame based on whether or not an identifier obtained from the Frame Body field of the Wake-Up frame in a location order in the Frame Body field is greater than the identifier of the wireless communication terminal. In this case, the Frame Body field may include identifiers of one or more wireless communication terminals, and the identifiers of the one or more wireless communication terminals in the Frame Body field may be located in order from a smaller value to a larger value.

The processor may be configured to deliver, to a physical layer of the wireless communication terminal, a command for resetting a clear channel assessment (CCA) function when the wireless communication terminal stops receiving the Wake-Up frame.

The processor may stop receiving the Wake-Up frame when the ID field indicates a group identifier of a group that does not include the wireless communication terminal.

According to another embodiment of the present invention, a base wireless communication terminal for wireless communicating includes a first wireless transceiver transmitting and receiving a signal through a first waveform, a second wireless transmitter transmitting a signal through a second waveform different from the first waveform, and a processor. The processor may be configured to: insert, into an ID field of a variable length Wake-Up frame, a group identifier identifying a group of wireless communication terminals including one or more wireless communication terminals belonging to a basic service set (BSS) operated by the base wireless communication terminal, insert an identifier of at least one of the one or more wireless communication terminals and not insert an identifier of a wireless communication terminal that is not included in a group identified by the group identifier, into a Frame Body field of the Wake-Up frame, and transmits, through the second wireless transmitter, the Wake-Up frame to one or more wireless communication terminal of the basic service set (BSS) operated by the base wireless communication terminal.

The processor may be configured to set a bitmap such that a value obtained based on a modulo operation in which a value obtained based on a starting group identifier and the bitmap is a numerator and the maximum number of values that the ID field is able to represent is a denominator indicates a group identifier allocated to a group including a wireless communication terminal receiving the bitmap, the starting group identifier indicating the group identifier corresponding to a first bit of the bitmap of the group, and may transmit the starting group identifier and the bitmap to at least one wireless communication terminal of the BSS.

The processor may be configured to establish the bitmap such that the wireless communication terminal has a group identifier corresponding to (SGID+n) %(2^12) allocated to a group including the wireless communication terminal, when a value of a bit position n of the bitmap field is 1. In this case, a bit position 0 of the bitmap may indicate a first bit of the bitmap, and the SGID may be the starting group identifier.

The processor may be configured to allocate the group identifier within a subset of consecutive values obtained in 0 to 0xFFF.

The processor may be configured to insert identifiers of the one or more wireless communication terminals into the Frame Body field such that the identifier of the at least one wireless communication terminal is located in the Frame Body field in order from a smaller value to a larger value.

According to another embodiment of the present invention, there is provided an method of operating a wireless communication terminal transmitting a signal through a first waveform and receiving a signal through a second waveform different from the first waveform. The operation method may include starting receiving a variable length Wake-Up frame through the second waveform, from a base wireless communication terminal of a basic service set (BSS) to which the wireless communication terminal belongs, determining whether or not a Frame Body field of the Wake-Up frame includes an identifier of the wireless communication terminal, when an ID field of the Wake-Up frame indicates an identifier of a group including the wireless communication terminal, and waking up a first wireless transceiver transmitting and receiving a signal through the first waveform based on the Wake-Up frame, when the Frame Body field of the Wake-Up frame includes the identifier of the wireless communication terminal.

The Frame Body field of the Wake-Up frame may not include the identifier of the wireless communication terminal that is not included in the group identified by the ID field, when the Wake-Up frame has a variable length and the ID field of the Wake-Up frame indicates a group identifier identifying a group including one or more wireless communication terminal.

The method may further include receiving, from the base wireless communication terminal, a bitmap indicating a starting group identifier indicating a group identifier corresponding to a first bit of the bitmap, and a group identifier allocated to a group including the wireless communication terminal together with the starting group identifier, and determining, as the group identifier allocated to the group including the wireless communication terminal, a value obtained by applying a modulo operation that uses a value obtained based on a value obtained based on the starting group identifier and the bitmap as a numerator and the maximum number of values that the ID field is able to represent as a denominator.

The determining the obtained value as the group identifier allocated to the group including the wireless communication terminal may include determining that a group identifier corresponding to (SGID+n) %(2^12) is allocated to the group including the wireless communication terminal when a value of a bit position n of the bitmap is 1. A bit position 0 of the bitmap may indicate a first bit of the bitmap, and the SGID may be the starting group identifier.

The method may further include stopping receiving the Wake-Up frame based on whether or not an identifier acquired from the Frame Body field of the Wake-Up frame in a location order in the Frame Body field is greater than the identifier of the wireless communication terminal. In this case, the Frame Body field may include identifiers of one or more wireless communication terminals, and the identifiers of the one or more wireless communication terminals in the Frame Body field may be located in order from a smaller value to a larger value.

The stopping receiving the Wake-Up frame may include delivering, by the processor, a command for resetting a clear channel assessment (CCA) function to a physical layer of the wireless communication terminal.

The method may further include stopping, by the processor, receiving the Wake-Up frame when the ID field indicates a group identifier of a group that does not include the wireless communication terminal.

Advantageous Effects

An embodiment of the present invention provides a wireless communication method using a wake-up radio and a wireless communication terminal using the same.

DESCRIPTION OF DRAWINGS

FIG. 23 illustrates a method of configuring a fixed length wake up frame by a wireless communication terminal according to an embodiment of the present invention.

MODE FOR CARRYING OUT THE INVENTION

Figure 1:
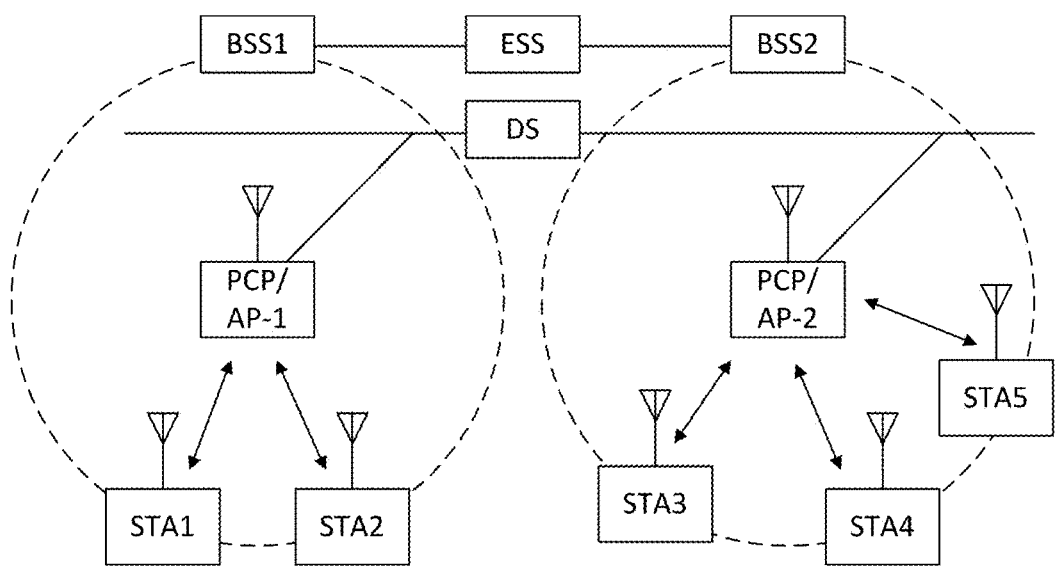
FIG. 1 is a diagram illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

In addition, when a part "includes" a certain component, it means that other components may be further included rather than excluding other components unless otherwise stated.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
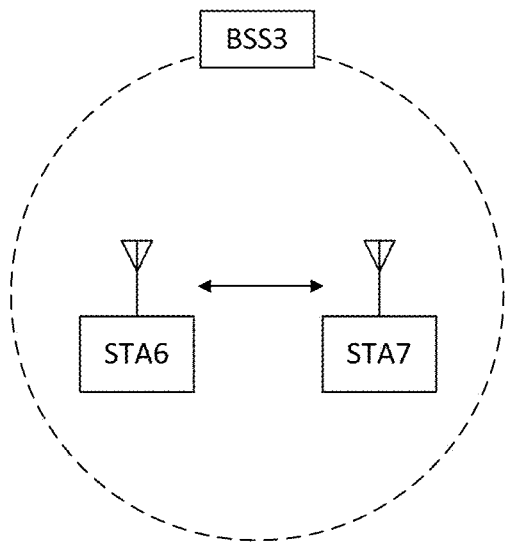
FIG. 2 illustrates an independent BSS that is a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
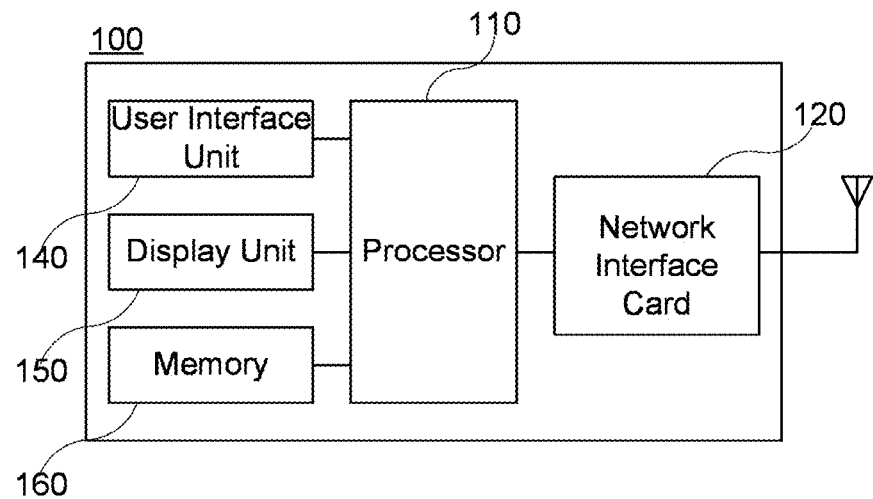
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the disclosure of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the disclosure of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to a disclosure of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the disclosure of the present invention, some components of the station 100, for example, the user interface unit 140 and the display unit 150 may be optionally provided in the station 100.

Figure 4:
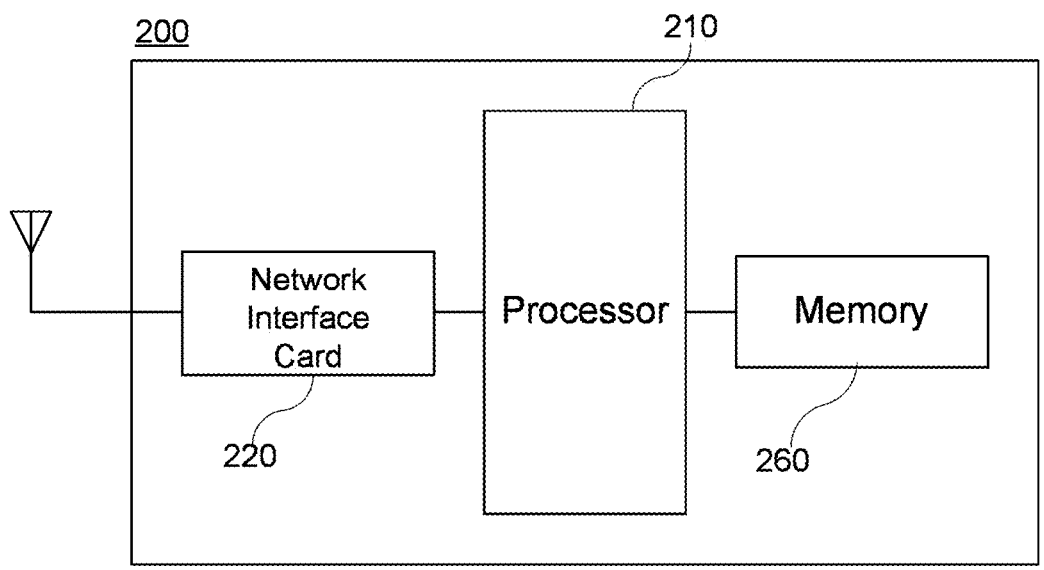
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the disclosure of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the disclosure of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
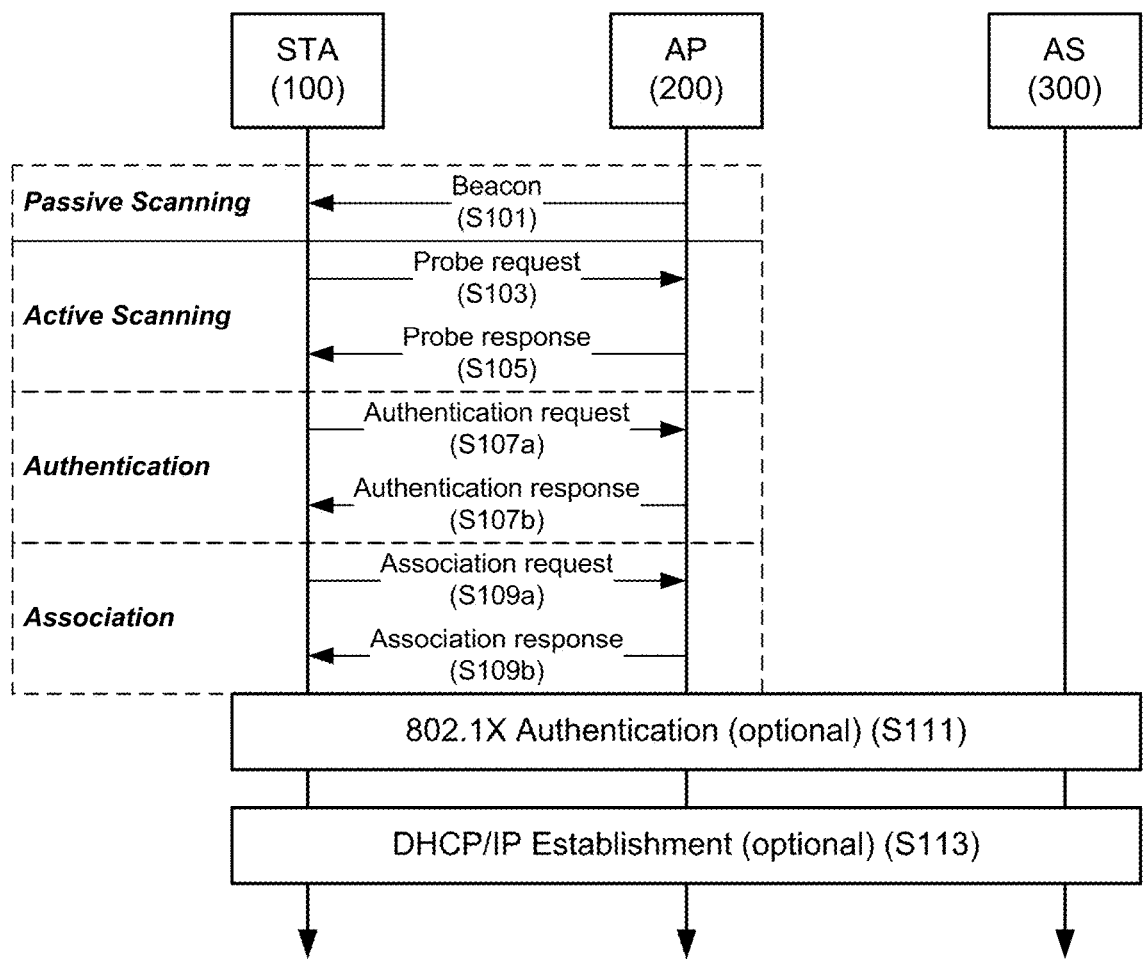
FIG. 5 is a diagram illustrating a process that a station configures an AP and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The wireless communication terminal may stop transmitting and receiving a wireless LAN radio and receive a wake-up radio (WUR) to increase energy efficiency. In this case, the magnitude of the power used for the wake-up radio transmission and reception may be smaller than the magnitude of the power used for the wireless LAN signal transmission. A general wireless LAN radio distinguished from the WUR may be referred to as a primary connectivity radio (PCR). A typical wireless LAN may indicate a radio capable of transmitting and receiving a 20 MHz non-high throughput (HT) physical layer protocol data unit (PPDU) defined in IEEE 802.11.

In the existing power save mode (hereinafter referred to as 'PS mode'), the wireless communication terminal may enter a PCR doze state that blocks power supply for some functions including a PCR transmission and reception function. In addition, in the PS mode, the wireless communication terminal may stop the PCR dose state to receive a radio signal from an external device and enter a PCR awake state, which is a state in which PCR transmission and reception can be performed. In the PCR doze state, supplying the power blocked by the wireless communication terminal again is referred to as PCR wake-up. In the existing PS mode, the wireless communication terminal may periodically wake up to receive a wireless signal from an external device. This operation may lower the operation efficiency of the wireless communication terminal.

When the wireless communication terminal wakes up according to the WUR signal triggering the wake-up of the PCR transceiver, it is possible to increase the operation efficiency of the wireless communication terminal. This power save operation is referred to as a WUR-based power save operation. Through the WUR-based power save operation, the wireless communication terminal can reduce unnecessary wake-up operation. In addition, when WUR is used, the time during which the wireless communication terminal stays in the PCR dose state may be increased. Thus, the power efficiency of the wireless communication terminal may be increased. An operation mode in which the wireless communication terminal can receive a WUR signal and perform a WUR signal-based operation may be referred to as a WUR mode. For WUR-based power save operation, the wireless communication terminal may include a wake-up receiver (hereinafter referred to as 'WURx') that operates at a lower power than a PCR transceiver. In addition, when the wireless communication terminal needs to transmit a WUR signal, the wireless communication terminal may include a wake-up transmitter.

A part of the WUR signal may be transmitted in a waveform different from the waveform of the PCR signal. For example, a part of the WUR signal may be transmitted through On-Off Keying (OOK). Specifically, the PCR transceiver may transmit and receive modulated signals through a wave-form modulation method using WURx and other wave forms. Hereinafter, an operation of a wireless communication terminal including a WURx and a wireless communication method using WUR will be described according to an embodiment of the present invention.

Figure 6:
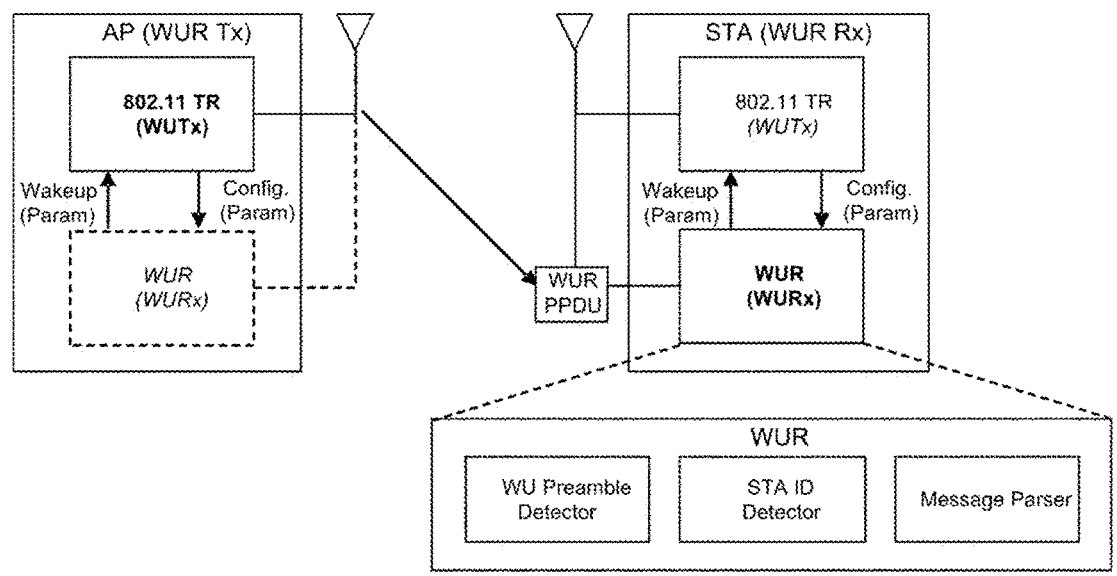
FIGS. 6 and 7 are diagrams illustrating a network including wireless communication terminals supporting WUR based power save according to an embodiment of the present invention.
Figure 7:
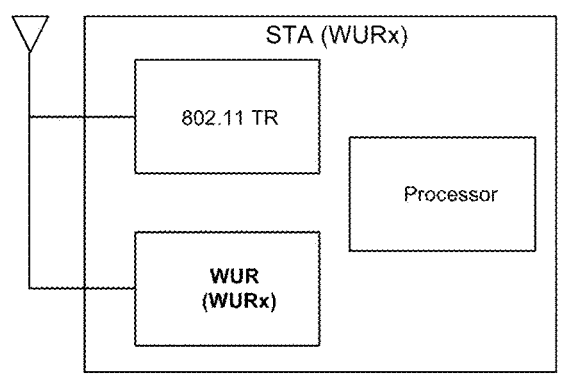

FIGS. 6 and 7 are diagrams illustrating a network including wireless communication terminals supporting WUR based power save according to an embodiment of the present disclosure. Referring to FIG. 6, the network may include an AP and a station supporting WUR based power save. The AP may transmit a WUR frame to the WUR terminal. Here, the WUR frame may include at least one of the wake-up frame or the WUR beacon frame. Specifically, the AP may wake-up the terminal by transmitting the wake-up frame to the WUR terminal. In the present specification, unless otherwise specified, a frame indicates a MAC frame. Meanwhile, the AP and the station of FIG. 6 may include a PCR transmission/reception function supporting at least one of 802.11a/b/g/n/ac/ax, which is a general wireless LAN standard. In addition, the AP and the station in FIG. 6 may coexist in one network and a general station that supports only PCR transmission/reception without supporting WUR transmission/reception. For example, the network of FIG. 6 may include a general station that does not have a WUR function.

According to an embodiment, the AP may include a first wireless transceiver (TR) supporting a communication method using PCR. The first wireless transceiver may transmit and receive PPDU through PCR. The AP may include a second wireless transmitter that performs WUR PPDU transmission. The second wireless transmitter may be referred to as a wake-up transmitter (WUTx). Here, a part of the WUR signal may be a signal transmitted in a second modulation method different from the first modulation method used in the PCR signal. Specifically, a part of the WUR signal may be transmitted through OOK. For example, the second wireless transmitter may transmit the WUR PPDU to the station through WUR. Also, if the AP additionally includes WURx, the AP may receive the WUR PPDU from the outside through the WURx.

Meanwhile, according to another embodiment, the first wireless transceiver and the second wireless transmitter may be implemented as one transceiver. For example, an AP may perform transmission and reception of a PCR signal and transmission of a WUR signal through one transceiver.

As shown in FIG. 6, the AP may transmit the WUR PPDU including a wake-up frame that triggers a wake-up of the PCR transceiver of the station to a station that supports WUR-based power save. According to an embodiment, the AP may wake up only a station entering a WUR based power save mode among a plurality of stations belonging to the AP's BSS. In addition, when the station receives a wake-up frame including an identifier indicating the station, the station may wake-up in the PCR doze state. For example, the WUR frame may include identification information identifying at least one station. The wake-up frame may include identification information identifying at least one station to wake-up. When the first station receives a wake-up frame including identification information indicating the first station, the first station may wake-up. Also, a station other than the first station belonging to the AP's BSS or another BSS may not wake-up.

According to an embodiment, a station supporting the WUR-based power save may include a WURx for receiving a wake-up frame. The station may include a first wireless transceiver that supports PCR transmission and reception and a WURx, that is, a second wireless receiver that exists separately. According to a specific embodiment, the first wireless transceiver and the second wireless receiver may exist as one transceiver. In addition, unless otherwise specified, an embodiment of the present invention does not exclude a case in which the first wireless transceiver and the second wireless receiver are included in one transceiver. Here, the first wireless transceiver may be referred to as a PCR transceiver. The wireless communication terminal may transmit and receive PCR signals using a PCR transceiver. Also, the second wireless receiver may receive a signal transmitted in a second wave-form different from the first wave-form of the signal transmitted/received through the first wireless transceiver. The WURx may receive a wake-up frame from the AP and wake-up the PCR transceiver. If the WURx receives a wake-up frame while the PCR transceiver of the station operates in the PCR doze state, the WURx may wake-up the PCR transceiver by using an internal wake-up signal.

For example, the station may have an interface between the PCR transceiver and the WURx. At this point, the WURx may wake-up the PCR transceiver of the station by using the internal interface. Specifically, the WURx may wake-up a PCR transceiver by transmitting an internal signal to the PCR transceiver, but it is not limited thereto. For example, the station may have a processor that controls the overall operation of the station. At this point, the WURx may wake-up the PCR transceiver over the processor. Specifically, the station may cut off the power supply of the PCR and the processor in the PCR doze state. In this case, the WURx may operate in a manner that stops cutting off the power supply of the processor and wakes-up the PCR transceiver over the processor by receiving a wake-up frame.

According to an embodiment, the WURx may deliver information received through the wake-up frame to the PCR transceiver. The WURx may transmit information on subsequent operations following the wake-up to the PCR transceiver by using the internal interface. Specifically, the information on the subsequent operations may be a Sequence ID (SID) that identifies each of the subsequent operations. In addition, PCR may set WURx parameters required for the WUR based power save operation by using the internal interface.

For example, the WURx may include a wake-up preamble detector (WU Preamble Detector), a wireless communication terminal identifier detector (STA ID Detector), and a message parser. The WU preamble detector detects a wake-up frame by identifying a sequence of signal patterns included in the wake-up frame. In addition, the WU preamble detector may perform automatic gain control (AGC) and synchronization on WUR based on the detected signal pattern sequence.

The wireless communication terminal identifier detector WUR detects a recipient of a WUR frame. Here, the recipient of a WUR frame indicates a recipient intended by the wireless communication terminal which has transmitted the WUR frame. Furthermore, the wireless communication terminal identifier detector may obtain information for identifying the recipient of the WUR frame based on WUR DATA of WUR PPDU. Furthermore, the wireless communication terminal identifier detector may obtain information for identifying the recipient of the WUR frame based on WUR DATA and WUR SYNC of WUR PPDU. WUR DATA and WUR SYNC of WUR PPDU will be described later with reference to FIG. 8. The message parser parses a message included in a WUR frame. In detail, the message parser may obtain a message indicated by the WUR frame by parsing the message included in the WUR frame.

According to an embodiment, the wireless communication terminal may determine a condition for maintaining the wireless communication terminal in a state where WUR PPDU reception is possible through the WURx of the communication terminal. In a specific embodiment, the wireless communication terminal may maintain WURx to be available for reception until a certain condition is satisfied. For example, until the wireless communication terminal recognizes that the PCR transceiver of the wireless communication terminal succeeds in wake-up, the wireless communication terminal may maintain the WURx in a state capable of transmitting and receiving.

For convenience of explanation, the following description will be made on the premise that the wireless communication terminal and the base wireless communication terminal are wireless communication terminals and base wireless communication terminals that support power save based on WUR, unless otherwise stated.

For WUR-related operations, it is necessary to exchange information on whether the base wireless communication terminal and the wireless communication terminal support the WUR operations and to negotiate the WUR operations. The base wireless communication terminal and the wireless communication terminal may use PCR to exchange information on whether to support the WUR operation and negotiate the WUR operation. This will be described with reference to FIG. 8.

Figure 8:
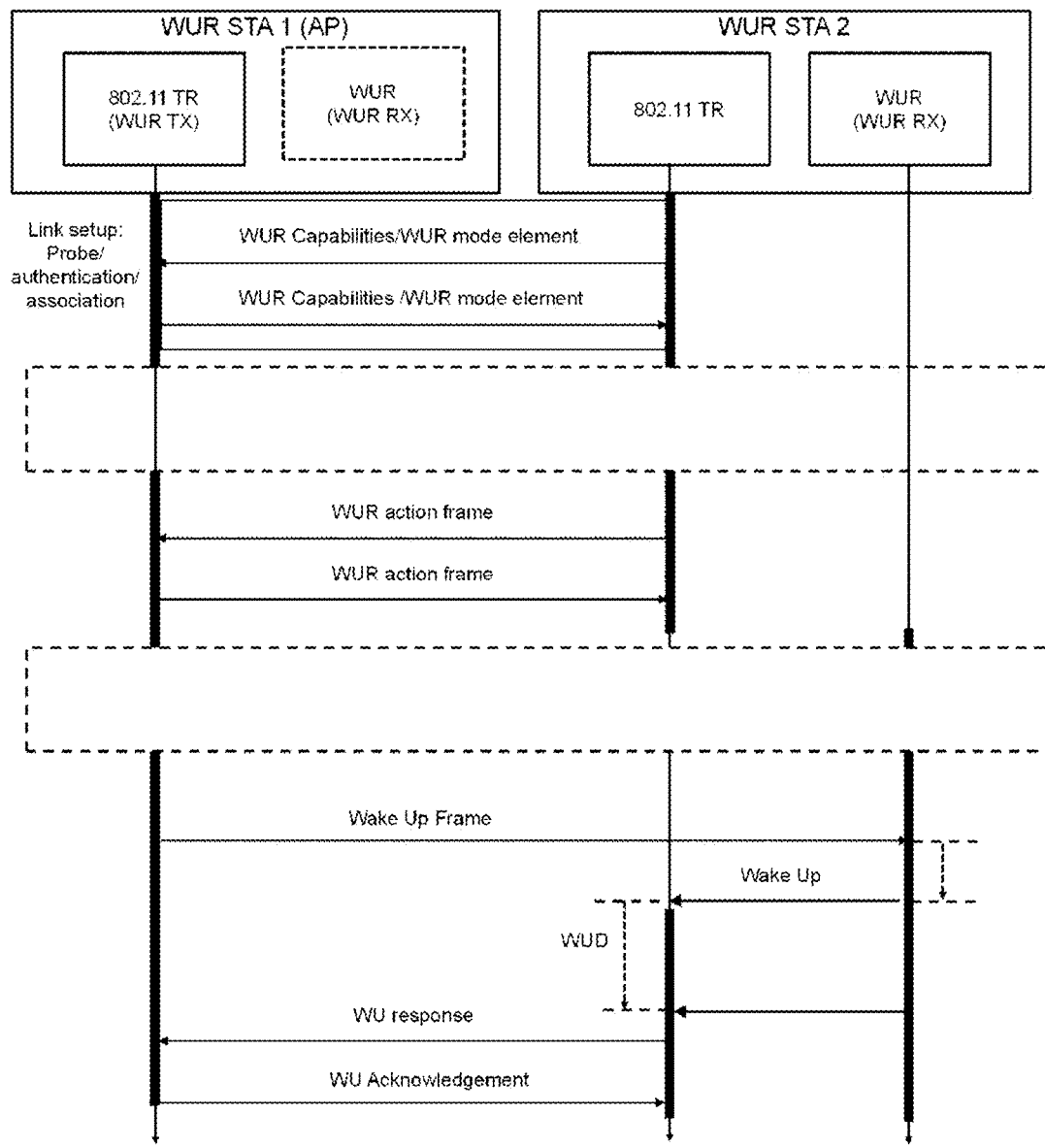
FIG. 8 is a diagram illustrating a method for a wireless communication terminal and a base wireless communication terminal to perform agreement for a WUR related operation and perform the WUR related operation according to an embodiment of the present invention.

FIG. 8 shows that a wireless communication terminal and a base wireless communication terminal according to an embodiment of the present invention perform negotiations for WUR-related operations and perform WUR-related operations. The base wireless communication terminal and the wireless communication terminal may exchange information on whether to support WUR operation in a link setup procedure. Specifically, the wireless communication terminal may transmit a WUR capability element to the base wireless communication terminal through a probe request frame, an authentication request frame, and an association request frame. The WUR capability element is an element indicating the capabilities supported by the wireless communication terminal in relation to WUR operation. In addition, the wireless communication terminal may transmit a WUR capability element to the base wireless communication terminal using a separate action frame. In addition, the base wireless communication terminal and the wireless communication terminal may transmit a WUR mode element including information on WUR operation-related parameters in a link setup procedure. In addition, the base wireless communication terminal and the wireless communication terminal may transmit WUR mode elements through an action frame. The WUR mode element will be described in detail with reference to FIG. 11.

The wireless communication terminal may perform WUR-related operations after connection with the base wireless communication terminal. When the wireless communication terminal intends to enter the PCR doze state, the wireless communication terminal may transmit a WUR action frame to the base wireless communication terminal. WUR action frames are exchanged to configure parameters related to WUR operation of the wireless communication terminal and the base wireless communication terminal. WUR action frames can be exchanged through PCR. Further, the WUR action frame may request an ACK from the recipient of the WUR action frame. When it is determined that the base wireless communication terminal receiving the WUR action frame needs to change or check the parameters related to the WUR operation, the base wireless communication terminal may transmit an additional WUR action frame to the base wireless communication terminal. The parameter related to the WUR operation may include at least one of a WUR duty-cycle period and a length of on duration. The exchange process of the WUR action frame may be repeated until the configuration of parameters related to the WUR operation is completed. When the parameter agreement related to the WUR operation is completed, the wireless communication terminal may change the power management mode to the power save mode and enter the PCR doze state.

When the wireless communication terminal of the PCR doze state receives a wake-up frame indicating a WUR station identifier (WUR STA ID) that identifies the wireless communication terminal or a WUR group identifier (WUR Group ID) that identifies a plurality of wireless communication terminals including the wireless communication terminal, the wireless communication terminal stores the information indicated by the wake-up and turns on the PCR transceiver. In this case, the WUR group ID may identify a group including one or more wireless communication terminals. Specifically, the wireless communication terminal stores the information indicated by the wake-up and transmits a signal for turning on the PCR transceiver to the PCR transceiver. When the PCR transceiver is turned on, the wireless communication terminal may transmit information obtained from the wake-up frame to the PCR transceiver. In this case, the information obtained from the wake-up frame may include at least one of the packet number and Timer Synchronization Function (TSF) described above.

After the PCR transceiver is turned on, the wireless communication terminal may transmit an awake indication to the base wireless communication terminal. In this case, the wireless communication terminal may indicate the first transmission frame to the base wireless communication terminal through the PCR transceiver after the PCR transceiver wakes up. The awake frame may be a frame indicating that the PCR transceiver of the wireless communication terminal transmitting the awake frame is in the awake state. This is because the base wireless communication terminal needs to check whether the wireless communication terminal wakes up successfully.

Specifically, when a WUR PPDU is transmitted through WUR, 1 bit is transmitted through one OFDM symbol. Therefore, the transmission time of the WUR PPDU through WUR is very long. In addition, PCR transition delay, which is the time required to turn on the PCR transceiver in the PCR doze state, may also be a relatively long time. Therefore, even if the wireless communication terminal fails to wake up, when the base wireless communication terminal attempts transmission through PCR, the wake-up process needs to be performed again and it takes a relatively long time again until the wireless communication terminal wakes up. The wireless communication terminal can reduce the time required to transmit the awake frame by transmitting the awake frame using PCR rather than WUR. The wireless communication terminal may transmit an awake frame according to a channel access method for PCR.

The awake frame may be a separate control frame defined for the WUR operation. In addition, the awake frame may be a frame used in an existing wireless LAN standard, such as a PS-poll frame. When the base wireless communication terminal wants to receive an awake frame after designating a specific wireless time, the wireless communication terminal may attempt channel access for awake frame transmission after a corresponding time elapses after wake-up. In this case, the wireless communication terminal may obtain information on a specific time through the WUR capability element. As described above, the WUR capability element may be transmitted through a probe request frame, an authentication request frame, and an association request frame. Also, the wireless communication terminal may obtain information on a specific time through a WUR action frame.

The base wireless communication terminal receiving the awake frame may transmit an awake response frame (hereinafter referred to as an 'AW response frame') to the wireless communication terminal. The AW response frame may be an immediate response frame. Specifically, the AW response frame may be an ACK frame. Further, the AW response frame may be a separately defined control frame for WUR operation. Further, the AW response frame may be QoS data. The wireless communication terminal receiving the AW response frame can perform a general PCR operation.

When the base wireless communication terminal does not receive an awake frame from a time point of transmitting a wake-up frame to a predetermined time, the base wireless communication terminal may determine that the wake-up of the wireless communication terminal fails. In this case, the base wireless communication terminal may transmit a wake-up frame to the wireless communication terminal again. In order to determine whether a predetermined time elapses, the base wireless communication terminal may configure a timer after transmitting a wake-up frame. The predetermined time may be a time longer than the sum of the PCR transition delay and the NAVSyncDelay value of the wireless communication terminal. NAVSyncDelay indicates a time during which the transmission of the wireless communication terminal is prohibited so that the wireless communication terminal can configure the NAV based on a frame or PPDU transmitted through PCR after wake-up.

In the embodiment of FIG. 8, the first WUR station WUR STA1 and the second WUR station WUR STA2, which are APs, perform a link setup procedure. In this case, the first WUR station WUR STA1 and the second WUR station WUR STA2 exchange WUR capability elements and WUR mode elements. In addition, the second WUR station WUR STA2 transmits a WUR action frame to the first WUR station, WUR STA1 to enter the WURX doze state. The first WUR station WUR STA1 and the second WUR station WUR STA2 exchange action frames to configure WUR operation-related parameters. When the first WUR station WUR STA1 has data to be transmitted to the second WUR station WUR STA2, the first WUR station WUR STA1 transmits a wake-up frame to the second WUR station WUR STA2. The second WUR station WUR STA2 receives the wake-up frame and turns on the PCR transceiver. In this case, it takes as long as the PCR switching delay until the PCR transceiver is turned on. After the PCR transceiver is turned on, the second WUR station WUR STA2 transmits an awake frame to the first WUR station, WUR STA1. The first WUR station WUR STA1 transmits an AW response frame to the second WUR station WUR STA2. Through these operations, the wireless communication terminal can enter the PCR doze state and wake-up again.

Figure 9:
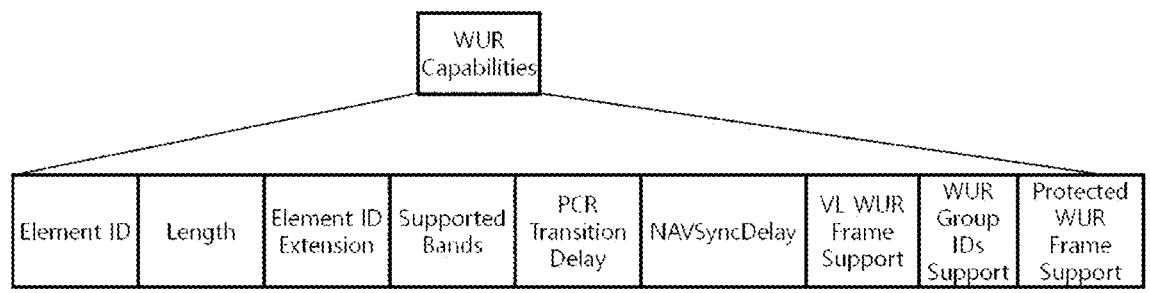
FIG. 9 illustrates a configuration of a WUR capability element according to an embodiment of the present invention.

Hereinafter, the format of the WUR capability element described with reference to FIG. 8 will be described in detail with reference to FIG. 9. FIG. 9 illustrates a format of a WUR capability element according to an embodiment of the present invention.

The WUR capability element may follow the format of the general extension element of the 802.11 standard. Specifically, the WUR capability element may include an Element ID field, a Length field, and an Element ID extention field. Further, the WUR capability element may include information indicating a frequency band through which the wireless communication terminal transmitting the WUR capability element can transmit and receive WUR frames. Specifically, the WUR capability element may include a Supported Bands field. The Supported Bands field may include bits corresponding to each of a plurality of frequency bands. For example, the Supported Bands field may include at least one bit indicating whether WUR frame transmission/reception is possible through the first frequency band. Furthermore, the Supported Bands field may include at least one bit indicating whether WUR frame transmission/reception is possible through the second frequency band. In this case, the first frequency band and the second frequency band may be different from each other. Also, the plurality of frequency bands may include frequency bands of 2.4 GHz and 5 GHz. In addition, when the terminal transmitting the Supported Bands field is a base wireless communication terminal, the Supported Bands field may be used as a reserved field.

In addition, the WUR capability element may further include WUR capability information. For example, the WUR capability element may include PCR transition delay information, which is the time required for the wireless communication terminal that transmits the WUR capability element to turn on the PCR transceiver in the PCR doze state. The base wireless communication terminal transmitting the wake-up frame may determine whether the wake-up failure is based on a time longer than the sum of the PCR transition delay and the time required to transmit the awake frame. After transmitting the wake-up frame, the base wireless communication terminal may configure a timer having a period longer than the sum of the PCR transition delay and the time required to transmit the awake frame. When the timer expires, the base wireless communication terminal may determine that the wake-up fails.

The WUR capability element may include a NAVSyncDelay field. The NAVSyncDelay field may include the individual NAVSyncDelay of a wireless communication terminal described above with reference to FIG. 8. According to another embodiment, the NAVSyncDelay may be included in a single field together with the above-described PCR transition delay information. For example, the WUR capability element may include a field indicating a value obtained by adding the NAVSyncDelay to the PCR transition delay.

The WUR capability element may include information indicating whether the wireless communication terminal that transmits the WUR capability element can receive a WUR frame of variable length. Specifically, the WUR capability element may include a VL WUR Frame Support field. When the VL WUR Frame Support field is activated, the wireless communication terminal may receive a WUR frame of variable length. Conversely, when the VL WUR Support field is deactivated, the wireless communication terminal can receive only the fixed length WUR frame transmitted in a predefined length without a Frame Body. In this case, the fixed length WUR frame may be referred as the minimum length (ML) wake-up frame.

The WUR capability element may include a WUR Group IDs Support field. The WUR Group IDs Support field may indicate whether the wireless communication terminal transmitting the WUR capability element can receive the WUR frame identified by the group ID. The base wireless communication terminal may transmit a WUR frame identifying the recipient with a unique WUR STA ID to the wireless communication terminal signaling that the WUR frame identifying the recipient by the group ID cannot be received through the WUR Group IDs Support field. The base wireless communication terminal cannot transmit the WUR frame identifying the recipient by the WUR group WUR ID to the wireless communication terminal signaling that the recipient cannot receive the WUR frame identifying the recipient by the group ID through the WUR Group IDs Support field.

In addition, the WUR Group IDs Support field may indicate the maximum number of WUR group IDs that can be processed by the wireless communication terminal that has transmitted the WUR capability element. The base wireless communication terminal may allocate a WUR group ID of a maximum number or less that the corresponding wireless communication terminal signals through the group-address WUR frame information to the wireless communication terminal that transmits the WUR capability element. In addition, the base wireless communication terminal cannot allocate a WUR group ID of more than the maximum number that the corresponding wireless communication terminal signals through the group-address WUR frame information to the wireless communication terminal that transmits the WUR capability element. Here, the size of a group ID bitmap may be determined based on the maximum number of WUR group IDs that can be processed by the wireless communication terminal. A base wireless communication terminal may use the group ID bitmap to transmit a WUR group ID allocated to a specific wireless communication terminal. Furthermore, the wireless communication terminal may obtain WUR STA ID of the wireless communication terminal based on the size of a group ID bitmap. In this case, the base wireless communication terminal may not separately transmit the WUR STA ID of the wireless communication terminal.

The WUR capability element may include information indicating whether the wireless communication terminal transmitting the WUR capability element supports Message Integrity Check (MIC) operation. This information may be referred to as a Protected WUR Frame Support field. The base wireless communication terminal may transmit a WUR frame using the MIC instead of the FCS to the wireless communication terminal signaled to support MIC operation through the Protected WUR Frame Support field. The base wireless communication terminal may not be allowed to transmit the WUR frame using the MIC instead of the FCS to the wireless communication terminal signaling not to support the MIC operation through the Protected WUR Frame Support field. A wireless communication terminal supporting MIC can detect an external attack or the like through MIC operation. In this case, the wireless communication terminal may transmit an action frame requesting a new WUR STA ID to the base wireless communication terminal.

Figure 10:
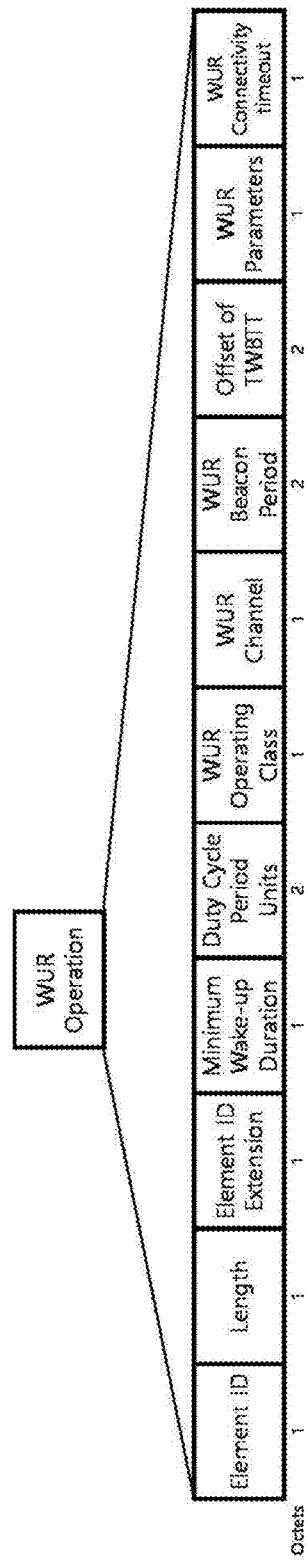
FIG. 10 illustrates a configuration of a WUR operation element according to an embodiment of the present invention.

Hereinafter, a WUR operation element including parameters related to WUR operation of the wireless communication terminal will be described with reference to FIG. 10. FIG. 10 illustrates a configuration of a WUR operation element according to an embodiment of the present invention.

The WUR operation element may include parameters related to the WUR operation that the base wireless communication terminal is operating in the BSS. Parameters signaled through the WUR operation element may be commonly applied to wireless communication terminals operating in the WUR mode. In addition, parameters individually applied to each wireless communication terminal may be configured through a WUR mode element to be described later.

The WUR operation element may follow the general extension element format of the 802.11 standard. Specifically, the WUR capability element may include an Element ID field, a Length field, and an Element ID extention field. In addition, the WUR operation element may include a WUR operation parameter composed of WUR duty-cycle operation and related parameters.

The WUR operation element may include information indicating the minimum awake duration of the wireless communication terminal in on-duration when the WUR duty cycle is operated. This information may be referred to as minimum wake-up duration information. In this case, the minimum awake holding time may be indicated in units of 256 microseconds (us). The WUR operation element may include information indicating a unit for indicating the period of the duty cycle. This information may be referred to as WUR duty-cycle period units.

The WUR operation element may include information indicating at least one channel that the base wireless communication terminal can use to transmit the WUR frame. This information may be referred to as WUR operating class information. The WUR operation element may include information indicating a channel being used for WUR frame transmission among at least one available channel. This information may be referred to as WUR channel information.

The WUR operation element may include information related to a WUR beacon frame reception period. Specifically, the WUR operation element may include information indicating the number of time units between successive target WUR beacon transmission times (TWBTTs). In addition, the WUR operation element may include information indicating a target WUR beacon transmission time that arrives most quickly based on the current time point. In addition, the WUR operation element may include additional WUR parameter fields. For example, the WUR parameter field may include a PCR BSS parameter update counter value that the base wireless communication terminal inserts and transmits in a WUR beacon frame.

The WUR operation element may include a WUR Connectivity Timeout field. The WUR Connectivity Timeout field may indicate a maximum time during which the wireless communication terminal is able to maintain a WUR mode without exchanging frames through PCR with the base wireless communication terminal. In the WUR mode, the wireless communication terminal may operate in a PCR doze state. For example, the wireless communication terminal operating in the WUR mode may maintain the PCR doze state except when receiving a wake-up frame from the base wireless communication terminal or attempting to perform uplink transmission. The wireless communication terminal according to an embodiment of the present invention may configure a timer for maintaining the PCR doze state without exchanging PCR frames with the base wireless communication terminal. This is because when the wireless communication terminal maintains the PCR doze state for a long time, it may be difficult for the base wireless communication terminal to identify whether the wireless communication terminal is outside a BSS corresponding to the base wireless communication terminal.

Figure 11:
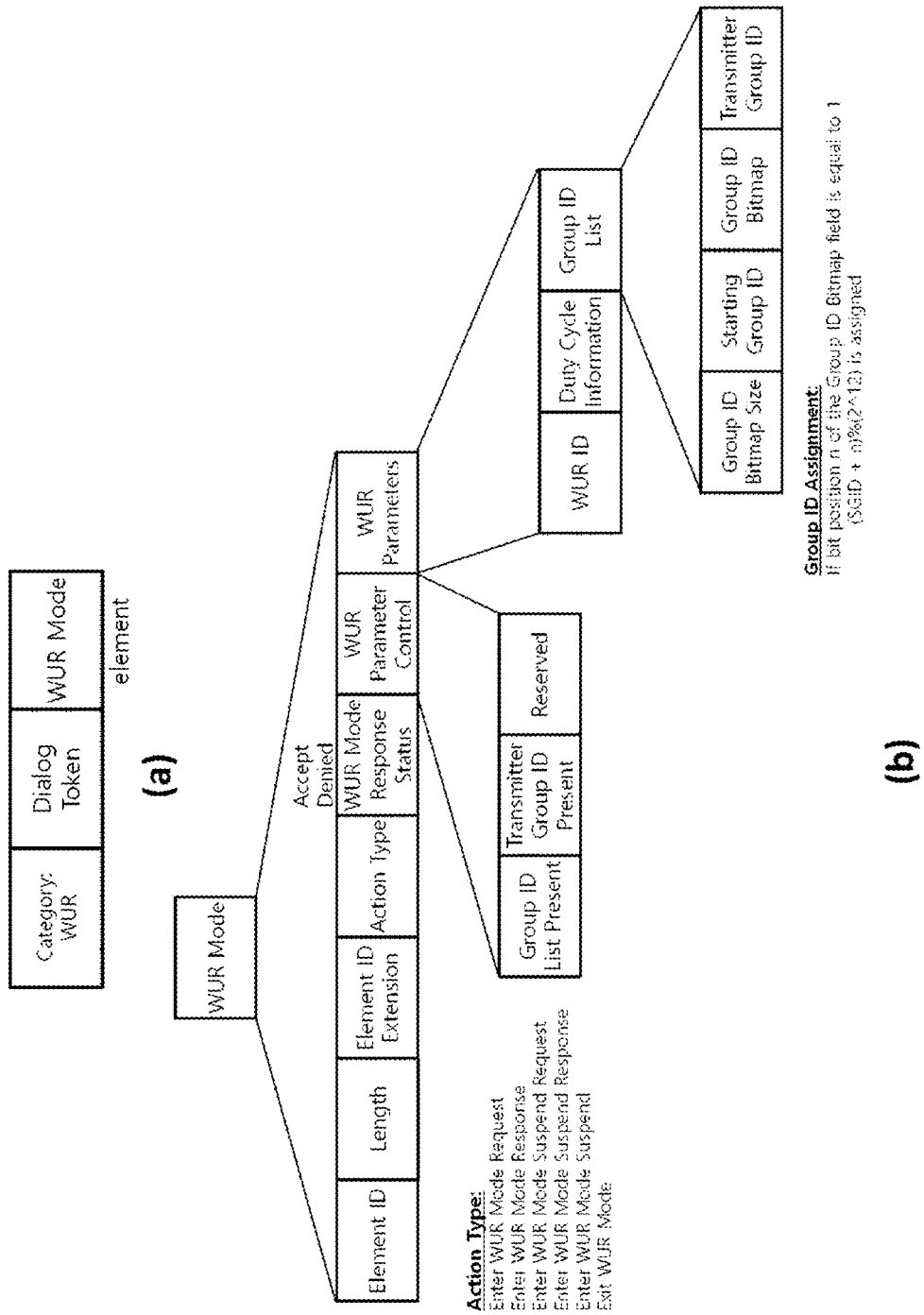
FIG. 11 illustrates an exemplary configuration of a WUR action frame and an exemplary configuration of a WUR mode element.

A WUR action frame transmitted from the wireless communication terminal to set a parameter related to a WUR operation will be described with reference to FIG. 11. Furthermore, a WUR mode element used to set the parameter related to the WUR operation will also be described. FIG. 11 illustrates an exemplary configuration of a WUR action frame and an exemplary configuration of a WUR mode element.

According to an embodiment of the present invention, the wireless communication terminal may transmit the WUR mode element to the base wireless communication terminal to set the parameter related to the WUR operation. As described above, the wireless communication terminal may transmit the WUR mode element during a link setup process. Furthermore, the wireless communication terminal may transmit the WUR mode element through an action frame.

FIG. 11A illustrates a format of the WUR action frame according to an embodiment of the present invention. The format of the WUR action frame may comply with a general action frame format of a 802.11 standard. Here, a Category field of the WUR action frame may be set to WUR. Furthermore, the WUR action frame may include a Dialog Token field and a WUR mode element field. A Dialog Token value may indicate a transmission order of WUR action frames transmitted sequentially. The WUR mode element may include a parameter related to operation of the wireless communication terminal in the WUR mode. For example, the wireless communication terminal may transmit the WUR mode element through the WUR action frame.

FIG. 11B illustrates an exemplary format of the WUR mode element according to an embodiment of the present invention. The WUR mode element may include information indicating a role of the WUR action frame. The information indicating the role of the WUR action frame may be signaled through an Action Type field. The wireless communication terminal and the base wireless communication terminal, which have changed WUR action frames, may perform operations according to the Action Type fields of the exchanged WUR action frames. The Action Type field may indicate, for each operation, any one of Enter WUR Mode Request/Response, Enter WUR Mode Suspend Request/Response, Enter WUR Mode Suspend, and Enter WUR Mode.

The WUR mode element may include information indicating a response to values included in a previously received first WUR mode element. This information may be signaled through a WUR Mode Response Status field. Here, the wireless communication terminal which has transmitted the first WUR mode element may be referred to as a requesting terminal. Furthermore, the wireless communication terminal which receives the first WUR mode element from the requesting terminal and transmits a new second WUR mode element as a response to the first WUR mode element may be referred to as a response terminal. Here, the requesting terminal may be either AP or non-AP station. Likewise, the response terminal may be either AP or non-AP station. The WUR Mode Response Status field may be set to Accept or Denied.

The WUR mode element may include information representing the configuration of subsequent WUR parameters. The information may be referred to as WUR Parameters Control. For example, the WUR Parameters Control field may include a Group ID List Present field indicating that the wireless communication terminal that has transmitted the WUR mode element has a WUR Group ID allocation. According to an embodiment, when the Group ID List Present is activated, the subsequent WUR Parameter field may include a Group ID bitmap field indicating a bitmap indicating the WUR Group ID allocated to the wireless communication terminal. In addition, the WUR Parameter field may include a Transmitter ID Present indicator indicating that a Transmitter Group ID is separately indicated. In this case, the Transmitter Group ID is an identifier for identifying a plurality of wireless communication terminals for a group-addressed wake-up operation through a variable length (VL) Wake-Up frame. The WUR mode element may include WUR mode related parameters indicated in the WUR Parameters Control field. For example, the WUR mode element may include information indicating a WUR identifier allocated to a wireless communication terminal. In addition, the WUR mode element may include information indicating a parameter related to a WUR duty-cycle operation of the wireless communication terminal. For example, the parameter related to the WUR duty-cycle operation may include a TSF value indicating a start time point of the WUR duty-cycle of the wireless communication terminal.

As described above, when the Group ID List Present is activated in the WUR Parameters Control field, the WUR mode element may include information indicating the WUR Group ID allocated to the wireless communication terminal. In one WUR network (e.g., BSS), the Group ID space may be allocated as a subset of consecutive values obtained from the WUR identifier space. The WUR identifier space is a set of consecutive integers from 0 to a specific value. In this case, the specific value may be 4095. In addition, the identifier inserted into the ID field of the WUR frame is selected from the WUR identifier space. In this case, the Group ID space may have a size of 12 bits. The base wireless communication terminal may indicate the WUR Group ID for each wireless communication terminal by using a bitmap. For example, the WUR mode element may include a Group ID Bitmap Size field indicating the size of the group ID bitmap. In this case, the size of the group ID bitmap including WUR Group ID information may be a value smaller than the maximum number of group IDs that is able to be processed by the wireless communication terminal. The maximum WUR Group ID may be signaled through the aforementioned WUR capability element.

In addition, the WUR mode element may include a Starting Group ID (SGID) field indicating the WUR Group ID corresponding to the first bit of the bitmap. The wireless communication terminal may acquire the WUR Group ID allocated to the group including the wireless communication terminal based on the value of the Group ID Bitmap Size field and the value of the Starting Group ID field value. For convenience of description, the value of the Staring Group ID field is indicated by SGID. The base wireless communication terminal may set a value of the Group ID bitmap field such that a value obtained based on a modulo operation in which a value obtained based on the value indicated by the SGID and the Group ID bitmap field is the numerator and the maximum number of values that the ID field is able to represent is the denominator indicates the WUR Group ID allocated to the group including the wireless communication terminal. In this case, since the ID field is a 12-bit field, the maximum number of values that the ID field is able to represent may be 0xFFF. For convenience of description, the first bit of the Group ID bitmap field is referred to as a bit corresponding to a bit position 0. When the value of the bit corresponding to the bit position n (that is, n+1-th bit) in the Group ID bitmap field is 1, the Group ID bitmap field may indicate that the WUR Group ID corresponding to SGID+n is allocated to the group including the wireless communication terminal.

According to an additional embodiment, the base wireless communication terminal may allocate the WUR Group ID and WUR STA ID as consecutive values based on a transmitter ID (TXID) to minimize the WUR STA ID storage space and the complexity of the WUR STA ID allocation. In this case, the TXID is an identifier that identifies the base wireless communication terminal transmitting the WUR frame. When the TXID value determined based on the PCR BSSID is close to the 0xFFF value, which is the maximum value the WUR Group ID may have, it may be difficult to obtain a continuous Group ID space based on the TXID. In this case, a separate rule for allocating the WUR Group ID and the WUR STA ID may be required depending on the location of the TXID value. The base wireless communication terminal may set the value of the Group ID bitmap field such that a value obtained based on a modulo operation in which a value obtained based on the SGID and the Group ID bitmap field is the numerator and the maximum number of values that are able to be represented by the ID field is the denominator indicates the WUR Group ID allocated to the group including the wireless communication terminal. In this case, since the ID field is a 12-bit field, the maximum number of values that the ID field is able to represent may be 0xFFF. Specifically, the base wireless communication terminal may set the value of the Group ID bitmap field using a modulo operation in units of WUR $2^{12}$. For example, when the value of the bit position n (that is, n+1-th bit) of the Group ID bitmap field is 1, it may be indicated that the WUR Group ID corresponding to (SGID+n) %($2^{12}$) may is allocated to the wireless communication terminal. In this way, the base wireless communication terminal may allocate the WUR Group ID and the WUR STA ID to the wireless communication terminals with the same rule, regardless of the TXID value of the BSS. In the previous embodiments, the wireless communication terminal may determine that a value obtained by applying a modulo operation that uses the value obtained based on the SGID and the Group ID bitmap field as the numerator and the maximum number of values that the ID field is able to represent as the denominator is the WUR Group ID allocated to the group including the wireless communication terminal. When the value of the bit position n (that is, n+1-th bit) of the Group ID bitmap field received by the group wireless communication terminal is 1, the wireless communication terminal may determine that the WUR Group ID corresponding to (SGID+n) %($2^{12}$) is allocated to the terminal.

When the Transmitter Group ID Present field is activated, the Group ID List field may indicate the Transmitter Group ID. In this case, the Transmitter Group ID may have a size of 12 bits.

Figure 12:
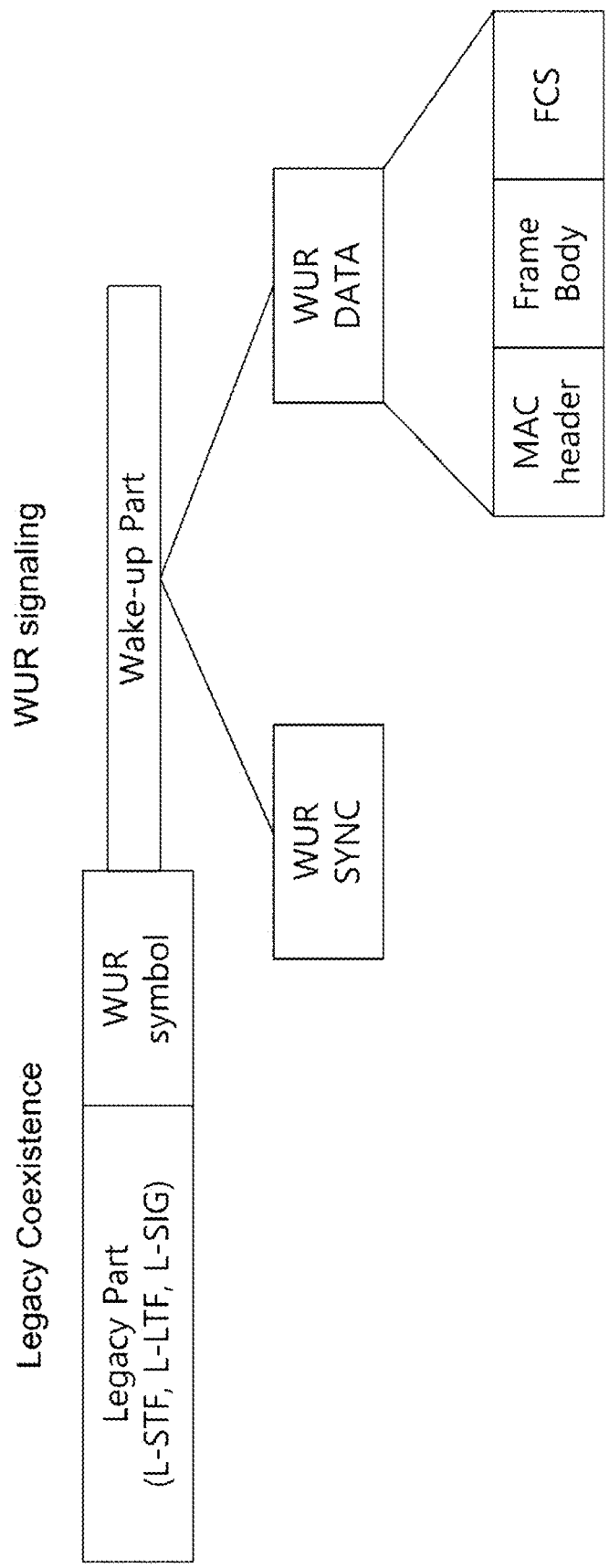
FIG. 12 illustrates a format of WUR PCLP protocol data unit (PPDU) according to an embodiment of the present invention.

A physical layer protocol data unit (PPDU) in which the WUR signal is transmitted as described above will be described with reference to FIG. 12. FIG. 12 illustrates a format of a WUR PPDU according to an embodiment of the present invention.

The WUR PPDU may include a legacy part that is able to be demodulated by a PCR transceiver. Specifically, the WUR PPDU may be divided into a legacy part that is able to be demodulated by the PCR transceiver and a wake-up part that is not able to be demodulated by the PCR transceiver. As described above, the BSS may simultaneously include a wireless communication terminal that supports WUR-based power save and a legacy wireless communication terminal that does not support WUR-based power save. In this case, the operation of the wireless communication terminal that supports the WUR-based power save is required not to interfere with the operation of the legacy wireless communication terminal existing in the BSS.

Specifically, the legacy part may include a legacy preamble (L-Preamble) used in the existing 802.11 standard. Specifically, the legacy preamble may include an L-STF including a short training signal, an L-LTF including a long training signal, and an L-SIG including signaling information for a legacy wireless communication terminal. The legacy wireless communication terminal may determine the length of the WUR PPDU using the legacy preamble. Accordingly, the legacy wireless communication terminal may not access the frequency band in which the WUR PPDU is transmitted while the WUR PPDU is transmitted. In this way, it is possible to prevent the legacy wireless communication terminal from causing interference with the signal including the WUR part subsequent to the legacy part.

In addition, the WUR PPDU may include a WUR symbol. For example, the WUR symbol may be one OFDM symbol subsequent to the L-SIG. The WUR symbol may be an OFDM symbol modulated by a binary phase shift keying (BPSK) method. In addition, the WUR symbol may include information indicating a transmission type of the WUR part. For example, the transmission type may be any one of unicast, multicast, and broadcast. When the transmission type is unicast, a WUR part to be described later may include identification information indicating a wireless communication terminal that is a target of wake-up. In this case, the identification information may be an association identifier (AID) used in the PCR. Alternatively, the identification information may be a WUR identifier (WUR ID) used in the WUR. In the present disclosure, the WUR identifier may be an identifier for identifying an intended recipient of a frame transmitted/received through a waveform used in the WUR.

The wireless communication terminal that supports the WUR-based power save may demodulate the WUR part through a wake-up receiver (WURx). In this case, the WUR part may be divided into WUR sync and WUR data. The WUR sink may include a signal pattern sequence indicating the WUR PPDU. Specifically, the base wireless communication terminal may insert, into the WUR sink, a pseudo noise sequence based on WURx modulation. The base wireless communication terminal may insert, into the WUR sink, the pseudo noise sequence using on-off keying (OOK). The signal pattern sequence may be a pattern that is equally applied regardless of the wireless communication terminal receiving the WUR PPDU. A wireless communication terminal that supports WUR-based power save may check whether the signal received through the signal pattern sequence is the WUR PPDU. In addition, the wireless communication terminal may determine whether the WUR PPDU is High Data-Rate (HDR) or Low Data-Rate (LDR) through the signal pattern sequence.

The WUR data indicates a WUR frame, which is a MAC frame included in the WUR PPDU. The WUR data may be divided into a MAC header, a Frame Body field, and a Frame Check Sequence (FCS) field. The wireless communication terminal supporting WUR-based power save may determine a recipient of the WUR PPDU received by parsing the WUR data of the WUR PPDU. For example, the MAC header may include an ID field indicating the recipient of the WUR PPDU. In addition, the Frame Body field may include information of a variable length according to the type of WUR PPDU. Hereinafter, WUR data of the WUR frame will be described in detail with reference to FIG. 13.

Figure 13:
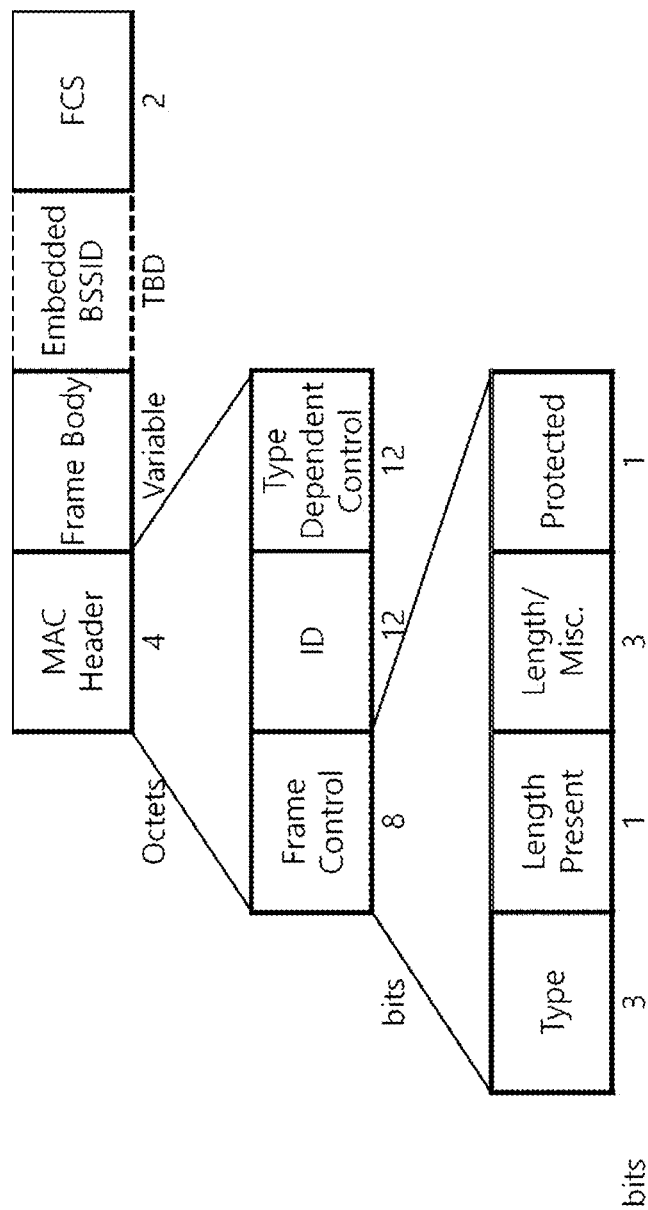
FIG. 13 illustrates a specific format of a WUR frame according to an embodiment of the present invention.

FIG. 13 illustrates a specific format of a WUR frame according to an embodiment of the present invention.

The MAC header of the WUR DATA described in FIG. 12 may be divided into a Frame Control field, an ID field, and a Type Dependent Control field. In this case, the Frame Control field indicates basic control information on the WUR frame. In addition, the ID field may indicate information on the address of the transmitter or information on the address of the recipient, of the WUR frame. Specifically, the ID field may include at least one of information indicating the address of the transmitter and information indicating the address of the recipient, of the WUR frame. In addition, the Type Dependent Control field indicates variable control information that is changed according to the type of the WUR frame.

According to an embodiment, the Frame Control field may include a Type field. The Type field may indicate the frame type of the corresponding WUR frame. Specifically, the Type field may indicate whether the WUR frame is a WUR beacon frame, a Wake-Up frame, a WUR Discovery frame, or a Vendor Specific frame. In this case, the WUR Discovery frame is a frame for discovering the BSS by using WUR.

In addition, the Frame Control field may include a Length Present field. The Length Present field may indicate whether the corresponding WUR frame includes the Frame Body field. When the Length Present field of the WUR frame indicates that the WUR frame does not include the Frame Body field, the WUR frame may be a fixed length WUR frame. When the Length Present field of the WUR frame indicates that the WUR frame includes the Frame Body field, the WUR frame may be a variable length WUR frame. In addition, the Frame Control field may include a Length/Misc field. The Length/Misc field may indicate the length of the WUR frame or additional information other than the length of the WUR frame according to whether the WUR frame corresponds to the variable length WUR frame format. Specifically, when the WUR frame is a variable length WUR frame, the Length/Misc field may indicate information on the length of the WUR frame. The information on the length of the WUR frame may indicate at least one of the length of the WUR frame or the length of the Frame Body field. According to an embodiment, when the WUR frame is a variable length WUR frame, the Length/Misc field may indicate a length within a range of a preset number of bits. When the Length/Misc field uses 3-bit, the Length/Misc field may indicate the length of the Frame Body field in units of 2 octets. In this case, the Length/Misc field may indicate the length of the Frame Body field of 2 to 16 octets. According to another embodiment, it may indicate the number of preset pieces of unit information included in the Frame Body field. For example, the Frame Body field may include additional information in addition to the identifier included in the ID field. In this case, the additional information may be a WUR identifier. For example, the WUR identifier may include at least one of the WUR STA ID or the WUR Group ID. In this case, the Length/Misc field may indicate the number of individual pieces of additional information included in the frame body. When the WUR frame corresponds to a fixed length WUR frame format, the Length/Misc field may include pre-defined additional information.

In addition, the Frame Control field may include a Protected field. The Protected field may indicate whether the WUR frame is a frame protected by applying additional encryption. For example, the Protected field may indicate whether the WUR frame is a frame protected through a Message Integrity Check (MIC). The Protected field may be a 1-bit field. When the Protected field indicates that the MIC is required, the wireless communication terminal that has received the WUR frame may use the MIC to check whether the WUR frame is valid. When the wireless communication terminal determines that the WUR frame is valid through the MIC, the wireless communication terminal may process the corresponding WUR frame. When the wireless communication terminal determines that the WUR frame is not valid through the MIC, the wireless communication terminal may discard the corresponding WUR frame. The FCS field of the WUR frame in which the Protected field is activated may include a value calculated by MIC rather than a value calculated by CRC. Specifically, when a frame validity check is required through the MIC, the FCS field of the WUR frame may indicate a message integrity value. The wireless communication terminal that has received the WUR frame may perform MIC by using the previously received encryption key. The order of the above-described Protected field, Length Present field, and Length/Misc field in the MAC header may be changed according to implementation.

The ID field may include a WUR identifier indicating an intended recipient of the WUR frame. The ID field may include a different type of identifier according to the transmission purpose of the WUR frame and the target receiving the WUR frame. For example, the ID field may indicate either an ID of the transmitter or an ID of the recipient. The ID field of the WUR frame may not distinguish the ID of the transmitter from the ID of the recipient. Specifically, the WUR frame may not include information indicating whether the WUR identifier indicated by the ID field is the identifier of the transmitter or the identifier of the recipient. For example, the ID field of the WUR frame may indicate any one of a transmitter ID (TXID), a WUR STA ID, and a WUR Group ID. In this case, each of the TXID, the WUR STA ID, and the WUR Group ID may be a value determined within one WUR identifier space described above.

The wireless communication terminal may determine whether the wireless communication terminal is an intended recipient of the corresponding WUR frame based on the ID field of the WUR frame. In addition, when the wireless communication terminal is an intended recipient of the received WUR frame, the wireless communication terminal may perform a subsequent operation according to the received WUR frame. When the WUR frame is a WUR Beacon frame, the ID field of the WUR frame may include the TXID of the WUR beacon frame. In addition, when the WUR frame is a Wake-Up frame for inducing wake-up of a plurality of wireless communication terminals, the ID field of the WUR frame may include a WUR Group ID indicating the plurality of wireless communication terminals. In addition, when the WUR frame is a Variable WUR frame and a Wake-Up frame for inducing wake-up of a plurality of wireless communication terminals, the WUR frame may include a plurality of WUR STA IDs in which the WUR frame indicates the variable frame and the Frame Body field identifies each of the plurality of wireless communication terminals. In addition, when the WUR frame is the WUR frame for inducing wake-up of one wireless communication terminal, the ID field of the WUR frame may include the WUR STA ID.

The WUR frame includes the FCS field after the Frame Body field. The WUR frame may not include the ID of the base wireless communication terminal transmitting the WUR frame. In addition, the WUR frame may include non-encrypted data. Therefore, the WUR frame may be vulnerable to security, and the wake-up of the wireless communication terminal in the WUR network may be induced by simply retransmitting the WUR frame received by the wireless communication terminal outside the WUR network. Accordingly, the wireless communication terminal outside the WUR network may cause the power of the wireless communication terminal in the WUR network to be consumed. In order to solve the above-mentioned problem, a WUR frame validation checking method is required.

The FCS field of the WUR frame may indicate a value obtained, including a value of an Embedded BSSID field that is not included in the WUR frame. In this case, the Embedded BSSID field may be information indicating the BSS of the base wireless communication terminal transmitting the WUR frame. Specifically, the Embedded BSSID field may include a part of the BSSID of the base wireless communication terminal transmitting the WUR frame. In a specific embodiment, the base wireless communication terminal may obtain the CRC value of the WUR frame including the Embedded BSSID field. When the WUR frame does not include the Frame Body field, the Embedded BSSID field may be located after the TD Control field. When the WUR frame includes the Frame Body field, the Embedded BSSID field may be positioned after the Frame Body field. The base wireless communication terminal may insert the obtained CRC value into the FCS field in the WUR frame. The base wireless communication terminal may transmit the WUR frame excluding the Embedded BSSID field. The wireless communication terminal that has received the WUR frame may acquire the CRC value for the WUR frame received based on the value of the Embedded BSSID field negotiated with the base wireless communication terminal. Specifically, the wireless communication terminal may acquire the CRC value by inserting the Embedded BSSID field after the TD Control field or the Frame Body field according to the value of the Embedded BSSID field negotiated with the base wireless communication terminal. The wireless communication terminal may determine whether the received WUR frame is valid based on the acquired CRC value.

The wireless communication terminal may reduce the power consumed for the wireless communication terminal as the non-intended recipient to receive the WUR frame, by using the characteristics of the WUR frame. When the wireless communication terminal receives a signal recognized as a wireless LAN frame in the existing wireless LAN, the wireless communication terminal receives the signal until the end of the frame, except when there is an error in a preamble of the received PPDU. Specifically, when the wireless communication terminal receives a signal recognized as a wireless LAN frame, the wireless communication terminal transmits a bit stream to a MAC layer by performing channel decoding. The wireless communication terminal may verify whether the frame is valid by using FCS in the MAC layer, and may extract information from the corresponding frame. The reason that the wireless communication terminal receives the signal until the end of the frame in this way is as follows. First, since the wireless LAN frame is encoded based on a convolution code, decoding may not be performed until the wireless communication terminal receives the entire wireless LAN frame. In addition, even if the wireless communication terminal is not the intended recipient of the wireless LAN frame, the wireless communication terminal may configure a network allocation vector (NAV) based on information related to the BSS indicated by the wireless LAN frame and information related to the NAV. In this case, the information related to the NAV may be a value of the Duration field.

For the WUR PPDU, if binary convolutional coding is not applied, only Manchester code and repetition code may be applied. Accordingly, the wireless communication terminal may sequentially recognize information included in the WUR frame while receiving the WUR frame. Consequently, the wireless communication terminal may determine information included in the WUR frame even if the entire WUR frame is not received. In addition, the wireless communication terminal operating based on the WURx may not be required to consider the transmission situation of other terminals in the channel. Accordingly, the wireless communication terminal operating based on the WURx may not perform an operation such as NAV configuring in order not to interfere with transmission between other wireless communication terminals. Consequently, it may be unnecessary to determine whether all WUR PPDUs received by the wireless communication terminal are valid. When the wireless communication terminal determines that the received WUR PPDU does not have to be received by the wireless communication terminal, the wireless communication terminal may stop receiving the WUR PPDU. Specifically, when the wireless communication terminal determines that the received WUR PPDU does not have to be received by the wireless communication terminal, the wireless communication terminal may stop receiving the WUR PPDU. For example, the wireless communication terminal may stop receiving a WUR PPDU including a WUR frame in a format not supported by the wireless communication terminal. Specifically, when the Type field, the Protected field, and the Length Present field of the WUR frame are configured with values not supported by the wireless communication terminal, the wireless communication terminal may stop receiving the WUR PPDU including the WUR frame. In addition, when it is clear that the wireless communication terminal is not the intended recipient of the received WUR frame, the wireless communication terminal may stop receiving the WUR PPDU including the corresponding WUR frame. Specifically, when it is clear that the ID field of the WUR frame does not indicate the wireless communication terminal, the wireless communication terminal may stop receiving the WUR PPDU including the WUR frame.

In the present specification, stopping receiving the WUR PPDU may mean stopping receiving the WUR frame. In addition, in the present specification, stopping receiving the WUR PPDU or the WUR frame may indicate stopping the receiving operation before the FCS operation on the WUR frame. In addition, stopping receiving the WUR PPDU or the WUR frame may be stopping MAC parsing. When the reception of the WUR frame is stopped, the energy of the remaining OOK symbols of the WUR frame in which reception is stopped in the process of detecting a new WUR frame may be detected as WUR sync to the WURx. The wireless communication terminal that has stopped receiving the WUR frame may not perform the WUR sync detection operation until a specific time point or may ignore it even if it is detected. In this case, the specific time point is until the time point when the WUR frame of which the receiving is stopped is transmitted before the FCS field is received. Specifically, the wireless communication terminal may determine whether WUR frame transmission continues based on the length of the WUR frame. As described above, the length of the WUR frame may be determined based on the Length field.

In another specific embodiment, the specific time point may be a time point when the amount of energy detected after stopping receiving the WUR frame suddenly drops. At this time, the wireless communication terminal may determine whether the amount of energy detected based on a predetermined reference value drops sharply. In addition, when the wireless communication terminal does not support the reception of the variable length WUR frame, the wireless communication terminal does not perform the WUR sync detection operation until a time point when the amount of energy detected after stopping receiving the WUR frame sharply drops, or may ignore it even if it is detected. This is because when the wireless communication terminal does not support reception of the variable length WUR frame, the wireless communication terminal may not check the Length field of the WUR frame.

In another specific embodiment, even if the wireless communication terminal does not support reception of a variable length WUR frame, the wireless communication terminal may acquire a value of the Length field of the WUR frame. In this case, the wireless communication terminal may not perform the WUR sync detection operation while the transmission of the WUR frame is continued, or may ignore it even if it is detected, and may determine whether the transmission of the WUR frame is continued based on the Length field.

In addition, the specific time point may be a time point when a predetermined time elapses from the time point at which reception of the WUR frame is stopped. In the above-described embodiments, the wireless communication terminal may perform the WUR sync detection operation again after a specific time point.

The WUR frame the wireless communication terminal stops receiving may be transmitted from a neighboring base wireless communication terminal other than the base wireless communication terminal associated with the wireless communication terminal. In this case, while the wireless communication terminal stops the WUR sync detection operation, the WUR frame may be transmitted from the base wireless communication terminal associated with the wireless communication terminal. Accordingly, the wireless communication terminal may not receive the WUR frame that the wireless communication terminal is required to receive. In addition, when the ID field of the WUR frame indicates the TXID corresponding to the BSS to which the wireless communication terminal belongs, it may be certain that the base wireless communication terminal associated with the wireless communication terminal will not transmit a new WUR frame while the WUR sync detection operation is stopped.

When the wireless communication terminal detects energy having a magnitude higher than the intensity of the signal subjected to WUR sync detection after the WUR frame reception operation, the wireless communication terminal may restart the WUR sync detection operation. Specifically, when the wireless communication terminal detects energy having a larger amount than a predetermined magnitude after the WUR frame reception operation, the wireless communication terminal may restart the WUR sync detection operation. These embodiments may be applied when the ID field of the variable WUR frame does not indicate the TXID corresponding to the BSS to which the wireless communication terminal belongs. Specifically, when the ID field of the variable WUR frame does not indicate the TXID corresponding to the BSS to which the wireless communication terminal belongs and the wireless communication terminal detects energy stronger than the intensity of the signal subjected to WUR sync detection after the WUR frame reception operation, the wireless communication terminal may restart the WUR sync detection operation. In another specific embodiment, when the ID field of the WUR frame does not indicate the TXID corresponding to the BSS to which the wireless communication terminal belongs, the wireless communication terminal may not stop the WUR sync detection based on the corresponding WUR frame. Even if the wireless communication terminal does not support reception of the variable length WUR frame, the wireless communication terminal may obtain the value of the ID field simultaneously. In addition, even if the wireless communication terminal does not support the reception of the variable length WUR frame with respect to the Length field in the above-described embodiment, the wireless communication terminal may simultaneously obtain the value of the Length field and the value of the ID field.

In addition, when the wireless communication terminal stops receiving the WUR frame, the wireless communication terminal may transmit a signal reception stop command from the MAC layer to the physical layer. Specifically, the wireless communication terminal may transmit a command for resetting a clear channel assessment (CCA) function from the MAC layer to the physical layer. For example, the wireless communication terminal may transmit PHY.CCA-RESET.request from the MAC layer to the physical layer.

Figure 14:
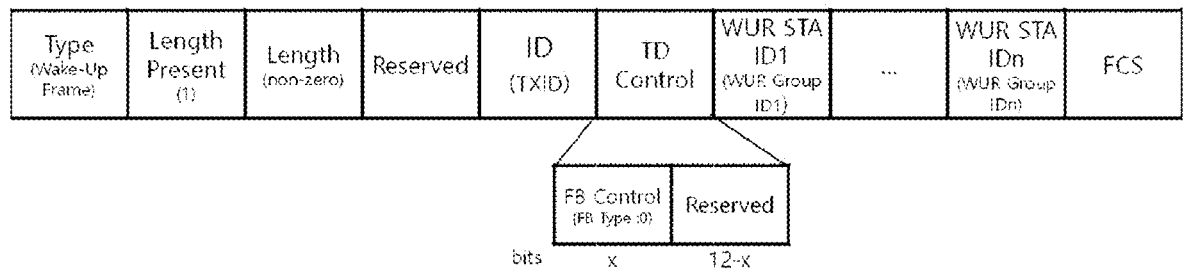
FIG. 14 illustrates a format of a variable length wake-up radio (WUR) frame according to an embodiment of the present invention.
Figure 14:
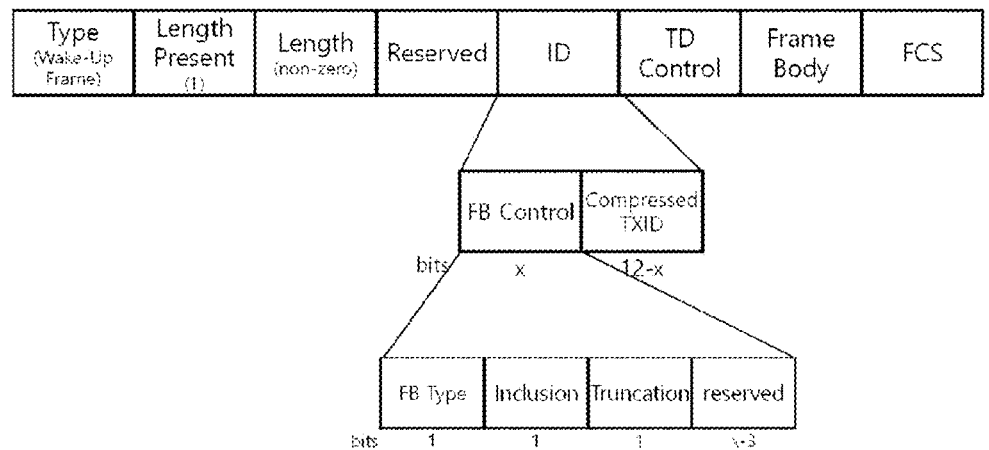
Figure 14:
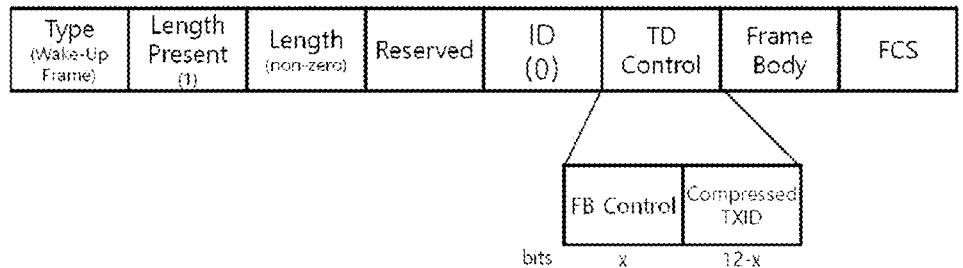

A specific method of configuring the variable length WUR frame will be described with reference to FIGS. 14 to 22. FIG. 14 illustrates a format of a variable length wake-up radio (WUR) frame according to an embodiment of the present invention.

When the ID field of the WUR frame indicates TXID, the wireless communication terminal may interpret the WUR frame differently according to the configuration of another field of the WUR frame. Specifically, when the ID field of the WUR frame indicates TXID, the wireless communication terminal may determine the intended recipient of the WUR frame differently according to the configuration of another field of the WUR frame.

FIG. 14(a) illustrates a WUR frame in which the Length Present field indicates that the WUR frame is a fixed length WUR frame, the ID field in the WUR frame indicates the TXID, and the Type field indicates that the WUR frame is the Wake-Up frame.

When the WUR frame is a fixed length WUR frame, the Frame Body field of the WUR frame may not include the WUR STA ID field or the WUR Group ID. Therefore, when the ID field of the fixed length WUR frame indicates the TXID of the BSS to which the wireless communication terminal belongs, the WUR frame may be a broadcast WUR frame transmitted to all wireless communication terminals operating in the WUR mode within the BSS corresponding to the TXID. In this case, when the type of the WUR frame is a Wake-Up frame, the WUR frame may induce wake-up of all wireless communication terminals operating in the WUR mode within the BSS in which the WUR frame is transmitted. When the ID field of the fixed length WUR frame indicates the TXID of the BSS to which the wireless communication terminal belongs, the wireless communication terminal may determine that the wireless communication terminal is included in the intended recipient of the corresponding WUR frame. When the Length Present field of the WUR frame is 0, the wireless communication terminal may determine that the WUR frame is a fixed length WUR frame.

FIG. 14(b) illustrates a WUR frame in which the Length Present field indicates that the WUR frame is a variable length WUR frame, the ID field in the WUR frame indicates the TXID, and the Type field indicates that the WUR frame is the Wake-Up frame.

When the WUR frame is a variable length WUR frame, the Frame Body field of the WUR frame may include the WUR STA ID field or the WUR Group ID. Therefore, when the ID field of the variable length WUR frame indicates the TXID of the BSS to which the wireless communication terminal belongs, the WUR frame may be a WUR frame transmitted to some of the wireless communication terminals belonging to the BSS corresponding to the TXID. In this case, when the type of the WUR frame is a Wake-Up frame, the WUR frame may induce wake-up of some wireless communication terminals operating in the WUR mode within the BSS in which the WUR frame is transmitted. In addition, it may not be allowed to include an individual WUR STA ID in the ID field of the variable length Wake-Up frame. In this case, when the ID field of the variable length WUR frame indicates a value different from the TXID of the BSS to which the wireless communication terminal belongs and the WUR frame is a Wake-Up frame, the wireless communication terminal may stop receiving the WUR frame. Specifically, at the time point when the wireless communication terminal determines that the ID field of the WUR frame indicates a value different from the TXID of the BSS to which the wireless communication terminal belongs, the wireless communication terminal may stop receiving the WUR frame. When the ID field of the variable length WUR frame indicates the TXID of the BSS to which the wireless communication terminal belongs and the WUR frame is a Wake-Up frame, the wireless communication terminal may operate as follows. When it is clear that the Frame Body field of the WUR frame does not include the WUR STA ID indicating the wireless communication terminal or the WUR Group ID indicating the group to which the wireless communication terminal belongs, the wireless communication terminal may stop receiving the WUR frame. When the Frame Body field of the WUR frame includes the WUR STA ID indicating the wireless communication terminal or the WUR Group ID indicating the group to which the wireless communication terminal belongs, the wireless communication terminal may receive the entire WUR frame. In this case, the wireless communication terminal may determine the validity of the WUR frame. A method of determining the validity of the WUR frame by the wireless communication terminal may follow the above-described embodiments.

The base wireless communication terminal may sort the WUR STA IDs according to the size of the WUR STA ID value in the Frame Body field. In addition, the wireless communication terminal may acquire the WUR STA IDs in the order in which they are positioned in the Frame Body field. Unless otherwise specified in the specification, description will be made on the assumption that the wireless communication terminal acquires subfields included in the Frame Body field according to the order in which they are positioned in the Frame Body field. The wireless communication terminal may stop receiving the WUR frame based on whether the WUR STA ID value obtained in the Frame Body field is greater than the WUR STA ID field value of the wireless communication terminal. Specifically, the base wireless communication terminal may sort the WUR STA IDs in the Frame Body field in order from a smaller value to a larger value. In this case, when the wireless communication terminal acquires a WUR STA ID having a value larger than the WUR STA ID value of the wireless communication terminal before acquiring the WUR STA ID of the wireless communication terminal in the Frame Body field, the wireless communication terminal may stop receiving the WUR frame. The wireless communication terminal may receive the Frame Body field until the WUR STA ID of the wireless communication terminal is acquired in the Frame Body field or the last WUR STA ID is acquired. The wireless communication terminal may determine whether the last WUR STA ID is acquired in the Frame Body field based on the Length field of the WUR frame. In addition, when the Length Present field of the WUR frame is 1, the wireless communication terminal may determine that the WUR frame is a variable length WUR frame. In addition, the wireless communication terminal may determine whether the WUR frame is a Wake-Up frame based on the Type field of the WUR frame. The Frame Body field may include the WUR STA ID and the WUR Group ID together. Even in this case, the above-described embodiments may be applied.

The base wireless communication terminal may make allocation such that the WUR Group ID always has a smaller value than the WUR STA ID. This is because the number of WUR Group IDs is required to be less than the number of WUR STA IDs. In addition, the base wireless communication terminal may sort the WUR STA IDs and the WUR Group IDs in the Frame Body field in order from an identifier having a smaller value to the identifier having a larger value, among the WUR STA IDs and the WUR Group IDs. In this case, when the wireless communication terminal acquires a WUR STA ID having a value larger than the WUR STA ID value of the wireless communication terminal before acquiring the WUR STA ID of the wireless communication terminal in the Frame Body field, the wireless communication terminal may stop receiving the WUR frame. In addition, when the last WUR STA ID of the Frame Body field of the wireless communication terminal is smaller than the WUR STA ID value of the wireless communication terminal, the wireless communication terminal may stop receiving the WUR frame. According to the embodiments, the wireless communication terminal may reduce power consumption used to receive the variable length WUR frame.

The WUR frame may include a field indicating information included in the Frame Body field. A field including at least one field indicating information included in the Frame Body field may be referred to as an FB Control field. The FB Control field may be included in the TD Control field. In addition, the size of the FB Control field may be X bits. The field indicating information included in the Frame Body field will be described in detail with reference to FIG. 14(c).

FIG. 14(c) illustrates a specific example of fields included in the FB Control field according to an embodiment of the present invention.

Specifically, the WUR frame may include a field indicating what kind of information is included in the Frame Body field. The field may be referred to as an FB Type field. The FB Type field may indicate that the Frame Body field includes a plurality of WUR STA IDs. In addition, the FB Type field may indicate that the Frame Body field includes information in the form of a bitmap. Specifically, the FB Type field may be 1 bit. For example, when the value of the FB Type field is 0, the FB Type field may indicate that the Frame Body field includes a plurality of WUR STA IDs. When the value of the FB Type field is 1, the FB Type field may indicate that the Frame Body field includes information in the form of a bitmap. In addition, the WUR frame may include a field indicating whether the intended recipient of the WUR frame is a wireless communication terminal indicated by the Frame Body field or all wireless communication terminals except for the wireless communication terminal indicated by the Frame Body field. In this case, all wireless communication terminals except for the wireless communication terminal indicated by the Frame Body field may refer to wireless communication terminals except for the wireless communication terminal indicated by the Frame Body field among all wireless communication terminals belonging to the BSS operated by the base wireless communication terminal that has transmitted the WUR frame. The field may be referred to as an Inclusion field. For example, when the value of the Inclusion field is 0 and the WUR frame is a Wake-Up frame, the WUR frame may induce wake-up of all other wireless communication terminals except for the wireless communication terminal indicated by the Frame Body field. When the value of the Inclusion field is 1 and the WUR frame is a Wake-Up frame, the WUR frame may induce wake-up of the wireless communication terminal indicated by the Frame Body field. When the value of the field is applied in reverse, the field may be referred to as an Exclusion field.

In addition, the WUR frame may include a field indicating how many last bits are omitted from the Frame Body field configured in units of 2 octets. The field may be referred to as a Truncation field. The Truncation field may indicate that the length of the Frame Body field indicated by the Length field is omitted by a predetermined number of bits. In this case, the predetermined number may be 8 bits. In addition, the Truncation field may be included in the FB Control field. This is because the Frame Control field is included in all WUR frames and thus it may not be appropriate to increase the size of the Frame Control field. In addition, this is because only some types of WUR frames may require detailed length adjustment. When the Truncation field of the WRU frame is activated, the terminal may determine that the length of the Frame Body field indicated by the Length field of the WRU frame is omitted by a predetermined number of bits.

As described above, the FB Control field may be included in the TD Control field. In another specific embodiment, the FB Control field may be included in the ID field. Specifically, when the TD Control field includes other fields such as a Partial TSF field and the size of the TD Control field is insufficient, some bits of the FB Control field may be included in the ID field.

When the FB Control field is included in the ID field, ID fields other than bits occupied by the FB Control field may be reserved fields. Bits included in the reserved field may have the same value (e.g., 0 or 1). In addition, when the FB Control field is included in the ID field, ID fields other than bits occupied by the FB Control field may include a compressed ID. The compressed ID may be at least one of a compressed WUR STA ID, a compressed WUR Group ID, and a compressed TXID. The compressed ID may be a specific number of consecutive least significant bits (LSBs) or most significant bits (MSBs) of the ID. When the FB Control field is included in the ID field and the intended recipient of the WUR frame is a plurality of wireless communication terminals of a specific BSS, the ID field may include a compressed TXID. The wireless communication terminal receiving the WUR frame may determine whether the intended recipient of the WUR frame is the wireless communication terminal based on a compressed identifier included in the ID field. Specifically, the wireless communication terminal may determine whether the compressed TXID indicated by the ID field corresponds to the BSS to which the wireless communication terminal belongs, and may determine whether the wireless communication terminal corresponds to the WUR STA ID or WUR Group ID included in the Frame Body field.

In another specific embodiment, the ID field may indicate that a plurality of WUR STA IDs are included in the Frame Body field, including a specific value. In this case, the specific value may be 0x000. In this case, the compressed ID may be included in the TD Control field, not the ID field, as illustrated in FIG. 14(d).

Figure 15:
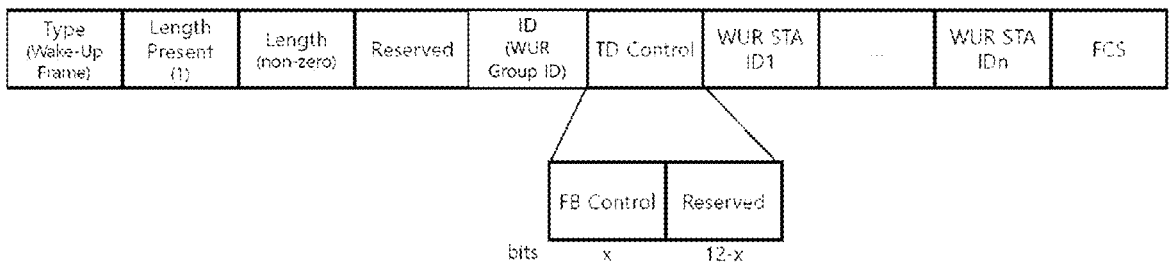
FIG. 15 illustrates a format of a variable length WUR frame according to another embodiment of the present invention.
Figure 15:
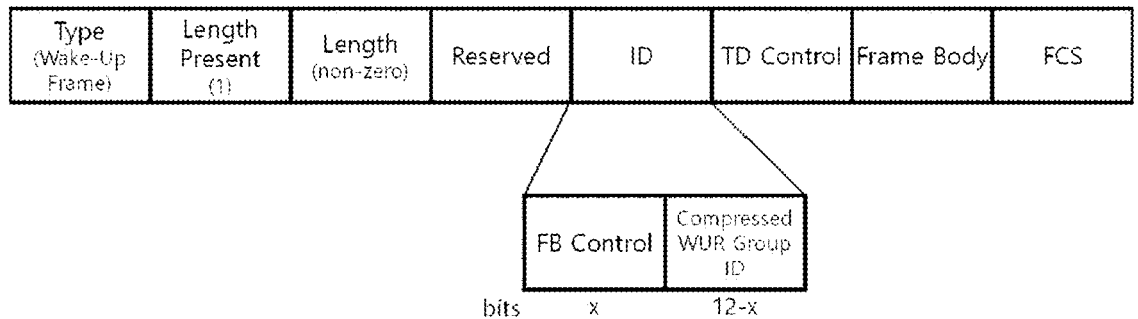
Figure 15:
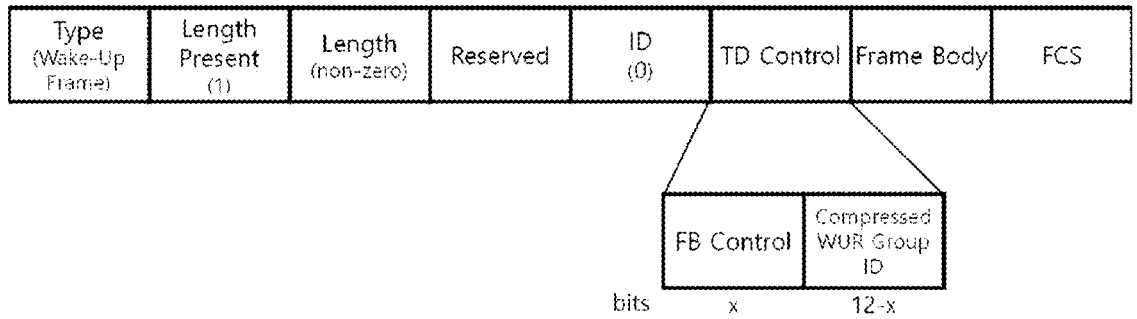

FIG. 15 illustrates a format of a variable length WUR frame according to another embodiment of the present invention.

FIG. 15(a) illustrates a WUR frame in which the Length Present field indicates that the WUR frame is a fixed length WUR frame, the ID field in the WUR frame indicates the WUR Group ID, and the Type field indicates that the WUR frame is the Wake-Up frame.

When the WUR frame is a fixed length WUR frame, the Frame Body field of the WUR frame may not include the WUR STA ID field or the WUR Group ID. When the ID field of the fixed length WUR frame indicates the WUR Group ID of the BSS to which the wireless communication terminal belongs, the WUR frame may be a group addressed WUR frame transmitted to all wireless communication terminals included in the group corresponding to the WUR Group ID. In this case, when the type of the WUR frame is a Wake-Up frame, the WUR frame may induce wake-up of all wireless communication terminals included in the group corresponding to the WUR Group ID. When the ID field of the fixed length WUR frame indicates the group ID of the group including the wireless communication terminal, the wireless communication terminal may determine that the wireless communication terminal is included in the intended recipient of the corresponding WUR frame. When the Length Present field of the WUR frame is 0, the wireless communication terminal may determine that the WUR frame is a fixed length WUR frame.

FIG. 15(b) illustrates a WUR frame in which the Length Present field indicates that the WUR frame is a fixed length WUR frame, the ID field in the WUR frame indicates the WUR Group ID, and the Type field indicates that the WUR frame is the Wake-Up frame.

When the WUR frame is a variable length WUR frame, the Frame Body field of the WUR frame may include the WUR STA ID field or the WUR Group ID. When the variable length WUR frame is transmitted to a plurality of wireless communication terminals included in the same group, the base wireless communication terminal may insert, into the ID field, the WUR group identifier of the group including all of the plurality of wireless communication terminals. Therefore, when the ID field of the variable length WUR frame indicates the WUR Group ID of the BSS to which the wireless communication terminal belongs, the WUR frame may be a WUR frame transmitted to some of the wireless communication terminals included in the group corresponding to the WUR Group ID. In this case, when the type of the WUR frame is a Wake-Up frame, the WUR frame may induce wake-up of some of the wireless communication terminals included in the group corresponding to the WUR Group ID. When the ID field of the variable length WUR frame indicates a WUR Group ID of a group other than the group including the wireless communication terminal, the wireless communication terminal may stop receiving the WUR frame. Specifically, when the ID field of the variable length WUR frame indicates a value different from the TXID, the WUR Group ID of the group including the wireless communication terminal and the WUR STA ID of the wireless communication terminal of the BSS to which the wireless communication terminal belongs and the WUR frame is a Wake-Up frame, the wireless communication terminal may stop receiving the WUR frame. Specifically, at the time point when it is determined that the ID field of the WUR frame indicates a value different from the TXID, the WUR Group ID of the group including the wireless communication terminal and the WUR STA ID of the wireless communication terminal of the BSS to which the wireless communication terminal belongs, the wireless communication terminal may stop receiving the WUR frame. When the ID field of the variable length WUR frame indicates the WUR Group ID of the group including the wireless communication terminal and the WUR frame is a Wake-Up frame, the wireless communication terminal may operate as follows. When it is clear that the Frame Body field of the WUR frame does not include the WUR STA ID indicating the wireless communication terminal or the WUR Group ID indicating the group to which the wireless communication terminal belongs, the wireless communication terminal may stop receiving the WUR frame. A method of determining whether the Frame Body field of the WUR frame includes the WUR STA ID indicating the wireless communication terminal or the WUR Group ID indicating the group to which the wireless communication terminal belongs may follow the above-described embodiments. When the Frame Body field of the WUR frame includes the WUR STA ID indicating the wireless communication terminal or the WUR Group ID indicating the group to which the wireless communication terminal belongs, the wireless communication terminal may receive the entire WUR frame. In this case, the wireless communication terminal may determine the validity of the WUR frame. A method of determining the validity of the WUR frame by the wireless communication terminal may follow the above-described embodiments. According to the embodiment, the power consumption required for the wireless communication terminal to receive the WUR frame may be reduced.

As in the embodiment described with reference to FIG. 14, the ID field may include the FB Control field. In this case, bits of the ID field other than the bits occupied by the FB Control field may include the compressed WUR Group ID. In this case, the format of the WUR frame may be as illustrated in FIG. 15(c). In addition, the ID field may indicate that a plurality of WUR STA IDs are included in the Frame Body field, including a specific value. In this case, the specific value may be 0x000. In this case, the compressed WUR Group ID may be included in the TD Control field, not the ID field, as illustrated in FIG. 15(d).

As described above, in the variable WUR frame, the Frame Body field may include a plurality of WUR STA IDs. The length of the Frame Body field is indicated in units of 2 octets, and the WUR STA ID is indicated through a field having a length of 12 bits. Therefore, when a plurality of WUR STA IDs are included in the Frame Body field, a method of using bits other than the bits occupied by the WUR STA ID is to be considered. This will be described with reference to FIGS. 16 to 20.

Figure 16:
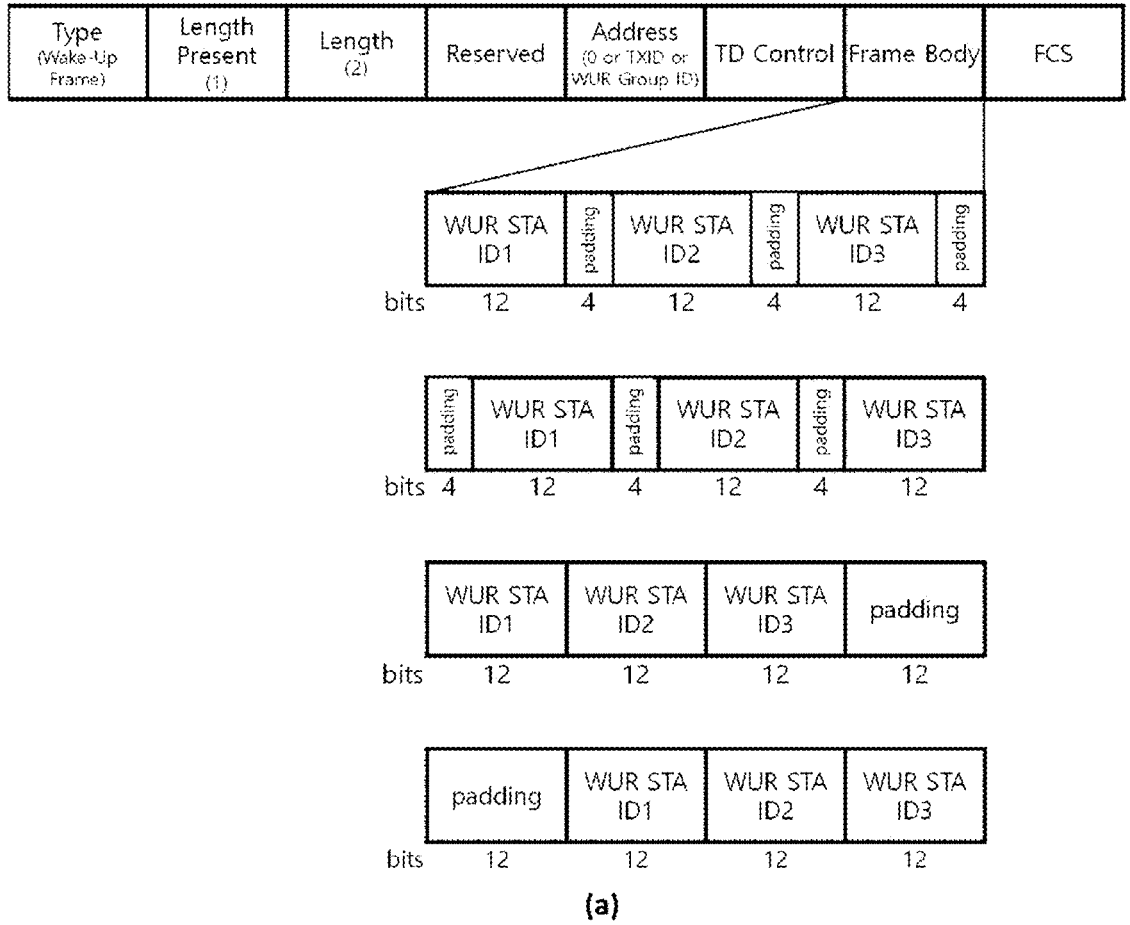
FIG. 16 illustrates a method of configuring a Frame Body field using padding in a variable length WUR frame by a wireless communication terminal according to an embodiment of the present invention.

FIG. 16 illustrates a method of configuring a Frame Body field using padding in a variable length WUR frame by a wireless communication terminal according to an embodiment of the present invention.

When the value of the Length field is L, the Frame Body field indicated by the Length field has a length of 2(L+1) octets. Therefore, when the value of the Length field is 0, the Frame Body field has a length of 2 octets (16 bits). In this case, the Frame Body field may include one WUR STA ID, and 4 bits of the Frame Body field are not used. When the value of the Length field is 1, the Frame Body field has a length of 4 octets (32 bits). In this case, the Frame Body field may include two WUR STA IDs, and 8 bits of the Frame Body field are not used. When the value of the Length field is 2, the Frame Body field has a length of 6 octets (48 bits). In this case, the Frame Body field may include three or four WUR STA IDs, and 12 bits of the Frame Body field may not be used or all bits may be used. The relationship between a specific Length field value, the number of WUR STA IDs included in the Frame Body field, and the number of bits not used in the Frame Body field may be as illustrated in the table of FIG. 16(b). In this case, unused bits may be filled with padding. The position of the padding may be determined according to various embodiments.

The base wireless communication terminal may arrange one WUR STA ID and 4-bit padding together such that the wireless communication terminal receiving the WUR frame makes parsing in units of octets. In a specific embodiment, in the Frame Body field, the WUR STA ID may be placed first and then 4 bits of padding may be placed. In the Frame Body field, 4 bits of padding may be placed first and then the WUR STA ID may be placed. Specifically, like the first Frame Body field or the second Frame Body field of FIG. 16(a), the WUR STA ID and 4 bits of padding may be arranged.

In another specific embodiment, the base wireless communication terminal may place WUR STA IDs consecutively, and may place padding after consecutive WUR STA IDs. For example, a value of the Length field is 3 and the Frame Body field may include three WUR STA IDs. In this case, the base wireless communication terminal may arrange three WUR STA IDs in the Frame Body field and may arrange 12-bit padding bits after the three WUR STA IDs. In addition, the base wireless communication terminal may arrange 12-bit padding bits in the Frame Body field and 3 WUR STA IDs after the 12-bit padding bits. Specifically, like the third Frame Body field or the fourth Frame Body field of FIG. 16(a), the WUR STA ID and 4 bits of padding may be placed. According to the embodiment, as the value of the Length field increases, the Frame Body field may include a greater number of WUR STA IDs than in the above-described embodiments. However, when the value of the Length field is 3 or 6, it may be difficult for the wireless communication terminal to determine how many WUR STA IDs are included in the Frame Body field.

Figure 17:
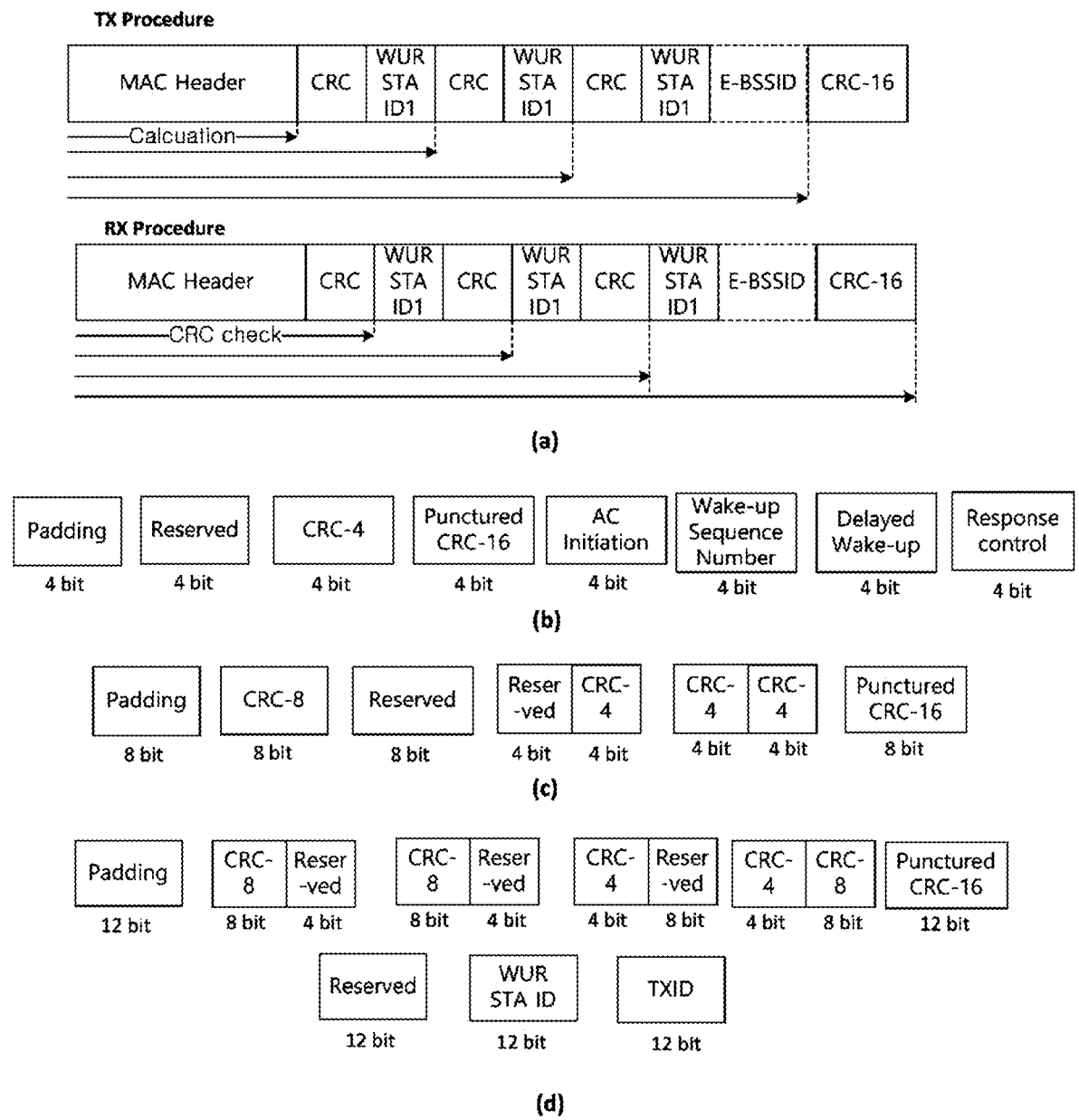
FIG. 17 illustrates a method of configuring a Frame Body field using padding in a variable length WUR frame by a wireless communication terminal according to yet another embodiment of the present invention.

FIG. 17 illustrates a method of configuring a Frame Body field using padding in a variable length WUR frame by a wireless communication terminal according to yet another embodiment of the present invention.

FIG. 17(a) illustrates a transmission process and a reception process when a bit that is not used in the Frame Body field is used as a CRC field.

Bits not used in the Frame Body field may be used as the CRC field. Specifically, the CRC field may be used to determine whether information positioned ahead of the CRC field in the WUR frame includes an error. The wireless communication terminal may use the CRC field to determine whether information positioned ahead of the CRC field in the WUR frame includes an error. When the CRC field is located at the most front of the Frame Body field, the wireless communication terminal may determine whether the information obtained in the header of the WUR frame is valid. When the information obtained by the wireless communication terminal in the header of the WUR frame is not valid, the wireless communication terminal may stop receiving the WUR frame. The information obtained in the header of the WUR frame may include at least one of the Frame Control field and the ID field. The Frame Body field may include a plurality of CRC fields. Specifically, when one WUR STA ID is included every 2 octets in the Frame Body field, one CRC field may be included every 2 octets. In another specific embodiment, the CRC field may be included in a specific position of the Frame Body field. Specifically, the base wireless communication terminal may insert the CRC field into the Frame Body field at the most front of the Frame Body field. In addition, the base wireless communication terminal may insert the CRC field into the Frame Body field at a position that is half of the portion excluding the FCS field in the Frame Body field. In addition, even when the wireless communication terminal determines the validity of the WUR frame based on the CRC field, the wireless communication terminal may determine the validity of the WUR frame based on the FCS field. Specifically, even when the wireless communication terminal determines the validity of the WUR frame based on the CRC field, the wireless communication terminal may determine the validity of the WUR frame according to the 16-bit CRC acquired based on the FCS field. Furthermore, the base communication terminal may use a generator polynomial used to generate a 16-bit CRC of the FCS field in the CRC field. Specifically, the base wireless communication terminal may generate 16 bits by using the generator polynomial used for FCS field generation, and may insert four bits into the CRC field by puncturing them. In this case, the base wireless communication terminal may puncture 4 MSBs or 4 LSBs. In the embodiment, the wireless communication terminal may determine the validity of the WUR frame based on the CRC field by using an existing 16-bit CRC check module without a separate module. Specifically, the wireless communication terminal may determine the validity of the WUR frame based on a value obtained by inserting null bits as many as the number of punctured bits in the value of the CRC field.

In addition, in the embodiments, the above-described Embedded BSSID field may be used together to determine the validity of the WUR frame. Bits not used in the Frame Body field may be used as a field indicating control information. In this case, the control information may indicate which Access Category (AC) is used to perform channel access after the wireless communication terminal wakes up the PCR transceiver. In this case, the control information may be indicated through a 2-bit field or a bitmap.

In this case, the control information may indicate whether the buffered bufferable unit (BU) that the wireless communication terminal has to receive after wake-up corresponds to a normal power save mode (PS) or unscheduled-automatic power save delivery (U-APS). BU may refer to a unit of data that is able to be buffered in the buffer of the base wireless communication terminal.

In another specific embodiment, the control information may be information indicating the number of times the Wake-Up frame is transmitted. In this case, the control information may be in the form of a counter. Furthermore, the counter may be represented by 4 bits. In a specific embodiment, a counter having the same value as the counter included in the Frame Body field may be included in the TD control of a unicast Wake-Up frame. The value of the counter may be increased each time a Wake-Up frame including the WUR STA ID of the terminal is transmitted. Specifically, even when a multicast Wake-Up frame including the WUR STA ID in the Frame Body field is transmitted, the base wireless communication terminal may increase the value of the counter. However, when a group addressed Wake-Up frame or a broadcast Wake-Up frame including the WUR Group ID in the ID field of the wireless communication terminal is transmitted, the wireless communication terminal may not increase the value of the counter. In addition, the base wireless communication terminal may increase the value of the counter only when the wireless communication terminal transmits a PCR frame after wake-up of the PCR transceiver or it is determined that the Wake-Up frame is successfully exchanged. As described above, the counter may be included for each Wake-Up frame including the WUR STA ID of the wireless communication terminal.

In addition, the control information may be information indicating a minimum waiting time before the wireless communication terminal wakes up. The information may be referred to as delayed wake-up information. The wireless communication terminal may wake-up the PCR transceiver after the time indicated by the delayed wake-up information elapses from the time when the Wake-Up frame is completely received. In this case, the control information may be expressed as a 4-bit field as described above. The delayed wake-up information may indicate 16 values. In this case, the field indicating delayed wake-up may indicate a time equal to a product (u×n) of a delayed wake-up unit value (u) and a value (n) of the field indicating delayed wake-up. For example, when the value of the field indicating the delayed wake-up is 0000b, the wireless communication terminal may immediately wake-up the PCR transceiver until the reception of the Wake-Up frame is completed. When the value of the field indicating the delayed wake-up is 1111b and the delayed wake-up unit value is 100 μs, the wireless communication terminal may wake up the PCR transceiver after 1500 μs elapses from the time when the reception of the Wake-Up frame is completed. In another specific embodiment, the field indicating delayed wake-up may indicate a time equal to a product ($u \times (n+1)$) of a delayed wake-up unit value (u) and a value (n+1) obtained by adding 1 to the value of the field indicating delayed wake-up. In another specific embodiment, different scaling values may be applied to each of values of the field indicating delayed wake-up. For example, the field indicating delayed wake-up may indicate a time equal to a product ($u \times 2^n$) of the delayed wake-up unit value u and power of 2 ($2^n$) with the value of the field indicating delayed wake-up as an exponent.

In a specific embodiment, 12 bits indicating WUR STA ID and 4 bits indicating delayed wake-up information may constitute one field. This field may be referred to as a Paged STA field. In a specific embodiment, the base wireless communication terminal may differently specify a delayed wake-up time for each of a plurality of wireless communication terminals that wake-up through one Wake-Up frame.

Through the embodiment, it is possible to prevent a plurality of wireless communication terminals from attempting channel access at the same time. In particular, when the amount of data to be transmitted to each wireless communication terminal is large or the base wireless communication terminal configures the PCR channel and the WUR channel 0differently, the base wireless communication terminal may allow the wireless communication terminal to access the channel effectively by using the delayed wake-up information. When the base wireless communication terminal changes the PCR channel and the WUR channel, the base wireless communication terminal may first perform a NAV synchronization operation to determine whether the NAV is configured for the corresponding channel before performing channel access. Therefore, when the base wireless communication terminal frequently changes the PCR channel and the WUR channel, the channel access efficiency may rapidly decrease. As a result, after accumulating downlink transmission data, the base wireless communication terminal may transmit, to each of the plurality of terminals, the variable length Wake-Up frame in which the delayed wake-up information is indicated. In this way, the base wireless communication terminal may reduce the decrease in channel access efficiency of the base wireless communication terminal. In addition, in this way, the base wireless communication terminal may prevent the wireless communication terminal from maintaining the PCR transceiver turned on for an unnecessarily long time.

In addition, the control information may be information indicating that the wireless communication terminal performs a specific operation after waking up the PCR transceiver. Specifically, the control information may indicate whether the wireless communication terminal transmits the PCR response frame to the base wireless communication terminal after waking up the PCR transceiver. When the control information indicates that the wireless communication terminal does not transmit the PCR response frame after waking up the PCR transceiver, the control information may indicate that the base wireless communication terminal transmits a frame polling the PCR response frame or performs DL transmission. When the control information indicates that the wireless communication terminal does not transmit the PCR response frame after waking up the PCR transceiver and a UL frame is present in the transmission queue of the wireless communication terminal, the wireless communication terminal may transmit the UL frame separately from the DL transmission reception. Even in this case, a limitation that UL transmission is capable of being performed only when the wireless communication terminal receives DL transmission may be applied.

In addition, the control information may be information indicating that the base wireless communication terminal transmits a frame for polling the PCR response frame transmission after the wireless communication terminal wakes up the PCR transceiver. In this case, the wireless communication terminal may wake-up the PCR transceiver and then transmit an awake indication frame required in the power save operation.

In addition, the control information may be information indicating that a target wake-up time (TWT) at a time point closest to the wake-up of the PCR transceiver is to be used. When the control information is activated, the wireless communication terminal may maintain the doze state from the time of receiving the Wake-Up frame to the nearest TWT service period after the PCR transition delay, and operate in the awake state at the start of the service period. Then, the wireless communication terminal may exchange PCR frames with the base wireless communication terminal according to the TWT configuration. When individual TWT is allowed in all situations, the control information may be information indicating that frame exchange is to be performed in broadcast TWT. When the control information is activated, the wireless communication terminal may maintain the doze state from the time of receiving the Wake-Up frame to the nearest broadcast TWT service period after the PCR transition delay, and operate in the awake state at the start of the service period.

The control information may be information indicating that the Wake-Up frame is retransmitted. When it is determined that the transmission of the Wake-Up frame previously transmitted by the base wireless communication terminal fails, the base wireless communication terminal may transmit the Wake-Up frame by activating the control information.

The control information may be information indicating whether the data buffered in the buffer of the base wireless communication terminal is a bufferable unit (BU) belonging to a trigger-enabled AC or a BU belonging to a non-trigger-enabled AC. When the information is activated, the wireless communication terminal may receive a BU buffered in the base wireless communication terminal through unscheduled-automatic power save delivery (U-APSD). When the information is deactivated, the wireless communication terminal may receive a BU buffered in the base wireless communication terminal through a PS-poll frame. When the BU belonging to the trigger-enabled AC and a BU belonging to the non-trigger-enabled AC is simultaneously buffered in the buffer of the base wireless communication terminal, the base wireless communication terminal may be defined as activating the information. This is because the presence of the non-trigger-enabled AC may be signaled in the U-APSD process.

As described above, the Paged STA field may include 12 bits indicating the WUR STA ID and 4 bits indicating control information. In this case, 2 bits of the 4 bits may indicate delayed wake-up information. 1 bit of the remaining 2 bits may indicate whether the data buffered in the buffer of the base wireless communication terminal is the bufferable unit (BU) belonging to the trigger-enabled AC or the BU belonging to the non-trigger-enabled AC. In addition, the remaining 1 bit may indicate whether the wireless communication terminal wakes up the PCR transceiver and then transmits the PCR response frame to the base wireless communication terminal, or waits for transmission of the base wireless communication terminal. In another specific embodiment, the remaining 1 bit may indicate that the Wake-Up frame is retransmitted.

In another specific embodiment, 2 bits other than 2 bits of 4 bits indicating delayed wake-up information may indicate the type of AC, to which the BU for the wireless communication terminal which is buffered in the base wireless communication terminal corresponds. The wireless communication terminal that has received the Wake-Up frame may start the DL BU transmission process according to the protocol corresponding to the AC indicated by the 2 bits. In addition, the wireless communication terminal may perform U-APSD trigger or PS-poll transmission by using the indicated AC. When BUs corresponding to a plurality of ACs are buffered in the buffer of the base wireless communication terminal, the base wireless communication terminal may configure the 2-bit field as the AC having the highest priority or the shortest lifetime.

In the above-described embodiments, the control information may be included in the TD control field as well as the Frame Body field in the unicast Wake-Up frame in the same manner for the same purpose.

FIG. 17(b) illustrates usage of a 4-bit field according to embodiments of the present invention, the corresponding field being in bits not used in the Frame Body field. The 4-bit field may be filled with padding bits or may be used as a Reserved field. Furthermore, as described above, the 4-bit field may be a field indicating CRC-4 (CRC-4) or a field indicating a punctured value as much as 12 bits in CRC-16 (Punctured CRC-16). In addition, the 4-bit field may indicate one piece of the control information described above. For example, the 4-bit field may indicate information (AC initiation) indicating which AC is used to perform channel access after the wireless communication terminal wakes up the PCR transceiver. In addition, the 4-bit field may indicate information (Wake-up Sequence Number) indicating the number of times the Wake-Up frame is transmitted. In addition, the 4-bit field may indicate delayed wake-up information. In addition, the 4-bit field may indicate information (Response Control) indicating that the wireless communication terminal is to perform a specific operation after waking up the PCR transceiver.

FIG. 17(c) illustrates usage of an 8-bit field according to embodiments of the present invention, where the field being included in bits not used in the Frame Body field.

When consecutive 8 bits are not used in the Frame Body field, the 8 bits may be used as a reserved field. In this case, each bit included in the reserved field may have the same value (e.g., 0 or 1). Furthermore, consecutive 8 bits that are not used in the Frame Body field may be used as the CRC field. The CRC field may indicate an 8-bit CRC value or may repeatedly indicate a 4-bit CRC value. In addition, the CRC field may indicate a value obtained by puncturing 8 bits from the 16-bit CRC value. The position of the CRC field may be applied in the same manner as in the embodiment about the 4-bit CRC field described above.

FIG. 17(d) illustrates usage of a 12-bit field according to embodiments of the present invention, the corresponding field being included in bits not used in the Frame Body.

When consecutive 12 bits are not used in the Frame Body field, the 12 bits may be used as a reserved field. In this case, it may be a problem to distinguish between the reserved field and the field indicating the WUR STA ID. The base wireless communication terminal may configure the reserved field as a value that is not used as the WUR STA ID. In another specific embodiment, when the base wireless communication terminal sorts the WUR STA IDs in the Frame Body field in order from a smaller WUR STA ID to a larger WUR STA ID, the value of the reserved field positioned at the first consecutive 12 bits in the Frame Body field may be set to 0xFFF. In addition, when the base wireless communication terminal sorts the WUR STA IDs in the Frame Body field in order from a smaller WUR STA ID to a larger WUR STA ID, the value of the reserved field positioned at the last consecutive 12 bits in the Frame Body field may be set to 0x000. In the embodiments, the wireless communication terminal may determine that the 12 bits are reserved fields. In another specific embodiment, the base wireless communication terminal may set the value of the reserved field value to the TXID. In another specific embodiment, the base wireless communication terminal may set a value of the reserved field to an already inserted WUR STA ID. In this case, the already inserted WUR STA ID may be the first WUR STA ID inserted in the Frame Body field.

In addition, when consecutive 12 bits are not used in the Frame Body field, the 12 bits may be used as the CRC field. In this case, the CRC field may include a 4-bit CRC value and an 8-bit CRC value. In addition, the CRC field may indicate a value obtained by puncturing 4 bits from the 16-bit CRC value. In the embodiments, the base wireless communication terminal may include information that may be distinguished from the WUR STA ID in the CRC field.

The base wireless communication terminal may prevent the occurrence of bits that are not used in the Frame Body field by changing the method in which the length of the frame body is signaled. This will be described with reference to FIGS. 18 to 20.

Figure 18:
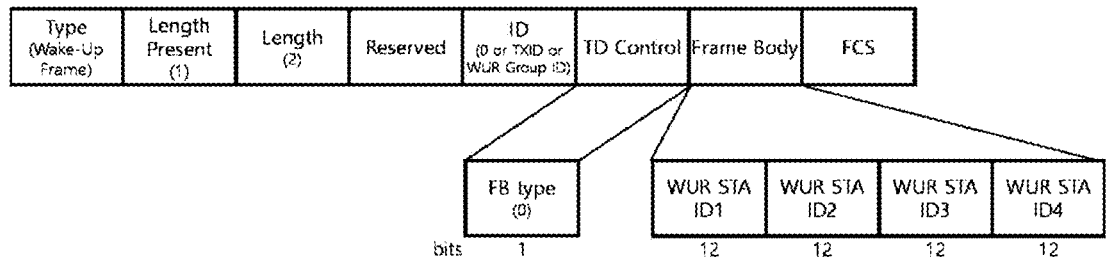
FIG. 18 illustrates a method of configuring a Frame Body field by a base wireless communication terminal according to yet another embodiment of the present invention.

FIG. 18 illustrates a method of configuring a Frame Body field by a base wireless communication terminal according to yet another embodiment of the present invention. FIG. 18(a) illustrates a detailed configuration of the Frame Body field when the embodiments described below are applied.

A Length field may indicate the number of WUR STA IDs included in the Frame Body field. When the value of the Length field is 2, the Frame Body field may be limited to include 4 WUR STA IDs. When the value of the Length field is 5, the Frame Body field may be limited to include 8 WUR STA IDs. In the embodiment, in order for the base wireless communication terminal to wake up 3 or 7 wireless communication terminals, the base wireless communication terminal has to transmit two Wake-Up frames. Alternatively, the base wireless communication terminal has to insert one WUR STA ID twice or insert a TXID into the Frame Body field of the Wake-Up frame indicating that 4 or 8 WUR STA IDs are included. FIG. 18(b) illustrates a relationship between a value of the Length field (L), a size of the Frame Body field (FB size), the number of WUR STA IDs included in the Frame Body field (# of WUR STA IDs), and a size of padding bits (padding), when the embodiment is applied.

In another specific embodiment, the base wireless communication terminal may transmit the Wake-Up frame by puncturing 4 bits or 8 bits not used in the Frame Body field. FIG. 18(c) illustrates a relationship between the value of the Length field (L), the size of the Frame Body field (FB size), the number of WUR STA IDs included in the Frame Body field (# of WUR STA IDs), and the size of padding bits (padding), when the embodiment is applied.

In another specific embodiment, the base wireless communication terminal may set the length of the Frame Body field to a value obtained by multiplying the size of the WUR ID field, that is, a multiple of 12 bits by the number of WUR STA IDs indicated by the Length field and may perform transmission. For example, when the value of the Length field is L, the size of the Frame Body field may be 12(L+1). FIG. 18(d) illustrates a relationship between the value of the Length field (L), the size of the Frame Body field (FB size), the number of WUR STA IDs included in the Frame Body field (# of WUR STA IDs), and the size of padding bits (padding), when the embodiment is applied. In another implementation number, the size of the Frame Body field may be 12(L+2). This is because it may be unnecessary if only one WUR STA ID is included in the Frame Body field. FIG. 18(e) illustrates a relationship between the value of the Length field (L), the size of the Frame Body field (FB size), the number of WUR STA IDs included in the Frame Body field (# of WUR STA IDs), and the size of padding bits (padding), when the embodiment is applied.

Figure 19:
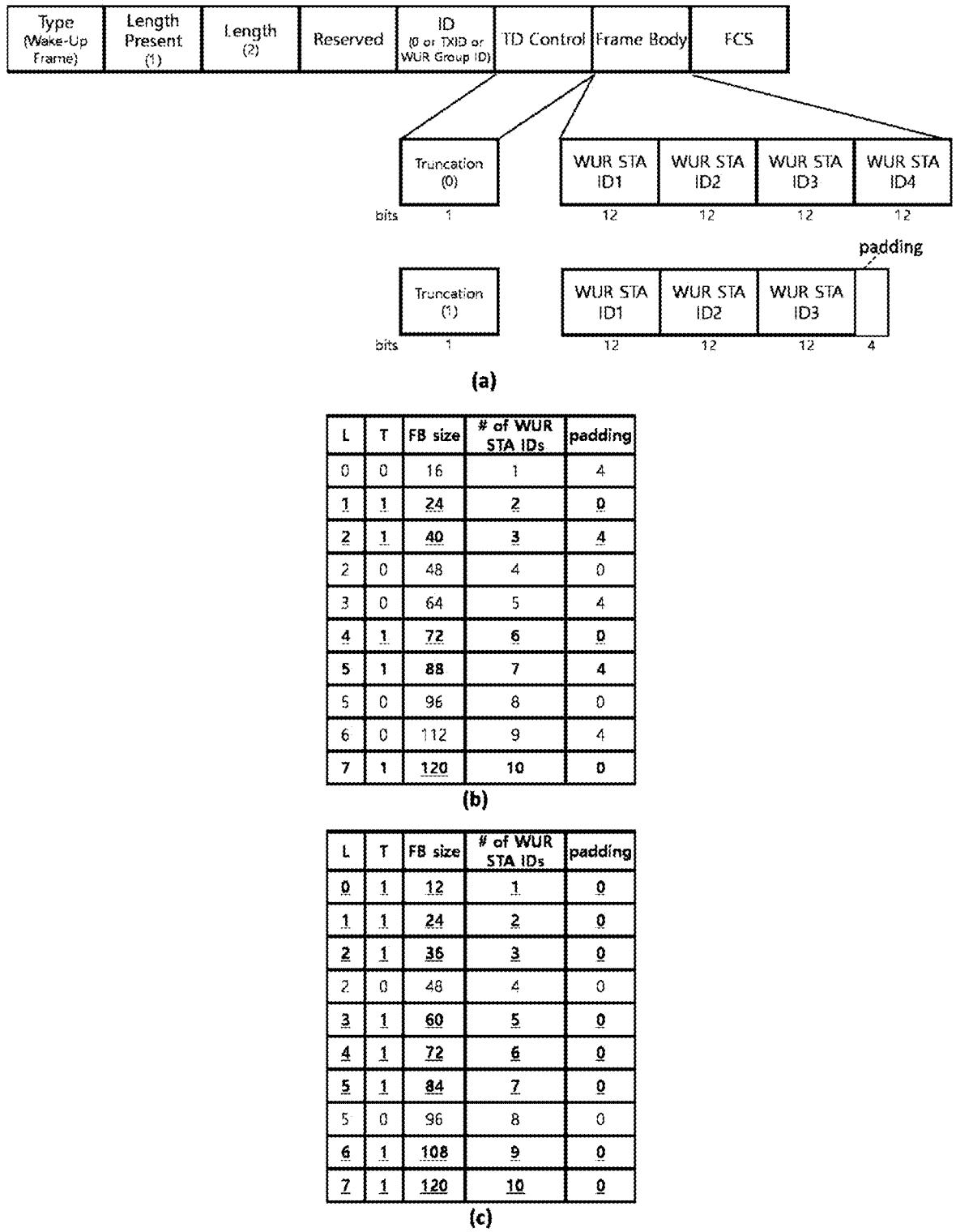
FIG. 19 illustrates a method of configuring a Frame Body field by a base wireless communication terminal according to yet another embodiment of the present invention.

FIG. 19 illustrates a method of configuring a Frame Body field by a base wireless communication terminal according to yet another embodiment of the present invention. FIG. 19(a) illustrates a detailed configuration of the Frame Body field when the embodiments described below are applied.

The base wireless communication terminal may signal the length of the Frame Body field by using the Truncation field described above. In this case, the Length field indicates the size of the Frame Body field in units of 2 octets. When the Truncation field is activated, the Truncation field may indicate that 1 octet is deleted from the length of the Frame Body indicated by the Length field. When the value of the Length field is 2 and the Truncation field is activated, the size of the Frame Body field may be 40 bits. When the value of the Length field is 2 and the Truncation field is deactivated, the size of the Frame Body field may be 48 bits. In the embodiment, even when the value of the Length field is 2 or 5, the number of WUR STA ID fields that may be included in the Frame Body field may be clearly signaled. In addition, when the embodiment is applied, when the value of the Length field is 2, 4, or 7, the size of the padding bits included in the Frame Body field may be reduced by 8 bits. When the embodiment is applied, the Frame Body field includes a maximum of 4 bits of padding. In addition, the size of the Frame Body field may be maintained in units of octets. FIG. 19(b) illustrates a relationship between a value of the Length field (L), whether the Truncation field is activated (T), a size of the Frame Body field (FB size), the number of WUR STA IDs included in the Frame Body field (# of WUR STA IDs), and a size of padding bits (padding), when the embodiment is applied.

When the Truncation field is activated, the Truncation field may indicate that predetermined number of bits are deleted from the length of the Frame Body indicated by the Length field according to the value of the Length field. When the value of the Length field is 0, 3, or 6 and the Truncation field is activated, the Truncation field may indicate that 4 bits are deleted from the length of the Frame Body indicated by the Length field. In addition, when the value of the Length field is 1, 4, or 7 and the Truncation field is activated, the Truncation field may indicate that 8 bits are deleted from the length of the Frame Body indicated by the Length field. In addition, when the value of the Length field is 2 or 5 and the Truncation field is activated, the Truncation field may indicate that 12 bits are deleted from the length of the Frame Body indicated by the Length field. In the embodiment, the length of the Frame Body field is not determined in units of octets, but does not include padding bits. The wireless communication terminal may clearly determine how many WUR STA ID fields are included in the Frame Body field. However, the embodiment may be limited to being applied only when the 12-bit WUR STA ID field is included in the Frame Body field. FIG. 19(c) illustrates a relationship between the value of the Length field (L), whether the Truncation field is activated (T), the size of the Frame Body field (FB size), the number of WUR STA IDs included in the Frame Body field (# of WUR STA IDs), and the size of padding bits (padding), when the embodiment is applied.

Figure 20:
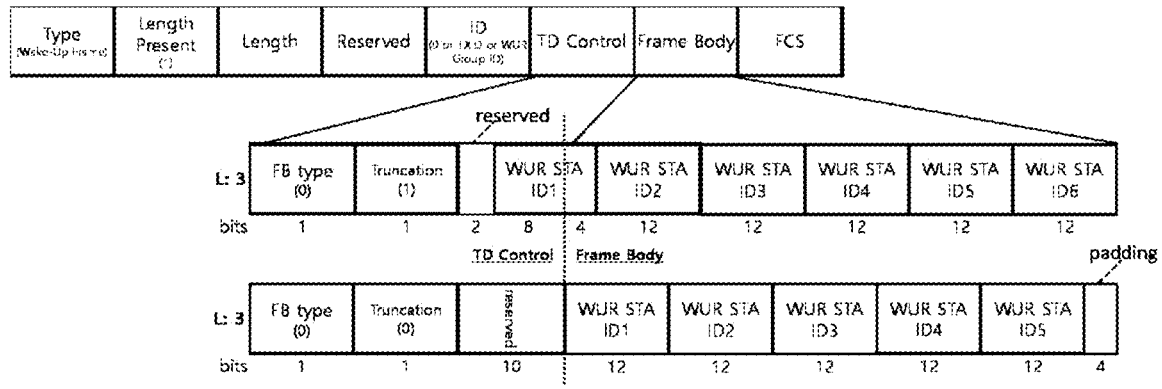
FIG. 20 illustrates a method of configuring a Frame Body field by a base wireless communication terminal according to yet another embodiment of the present invention.

FIG. 20 illustrates a method of configuring a Frame Body field by a base wireless communication terminal according to yet another embodiment of the present invention. FIG. 20(a) illustrates a detailed configuration of the Frame Body field when the embodiments described below are applied.

The base wireless communication terminal may insert a WUR STA ID by additionally using the last n bits of the Frame Body field and a TD Control field. Specifically, n may be an integer determined according to the value of the Length field. When the value of the Length field is 1, 4, or 7, n may be 4. When the value of the Length field is 0, 3, or 6, n may be 8. In another specific embodiment, n may be a predetermined integer regardless of the value of the Length field. In this case, n may be 4 or 8. In addition, in the embodiments, the Truncation field described above may also be used.

FIGS. 20(b) and 20(c) illustrate relationships between a value of the Length field (L), whether the Truncation field is activated (T), a size of the Frame Body field (FB size), the number of WUR STA IDs included in the Frame Body field (# of WUR STA IDs), and a size of padding bits (padding), when the embodiment is applied. In the case of FIG. 20(b), an embodiment is illustrated in which the length of the truncated bit varies depending on the value of the Length field as the Truncation field is activated. In the case of FIG. 20(c), an embodiment is illustrated in which the length of the truncated bit is constant as the Truncation field is activated.

As described above, the intended recipient of the WUR frame may be a plurality of wireless communication terminals. The base wireless communication terminal may indicate that a plurality of wireless communication terminals are intended recipients of the WUR frame by using a plurality of WUR STA IDs. A method of indicating a plurality of wireless communication terminals will be described with reference to FIGS. 21 to 22.

Figure 21:
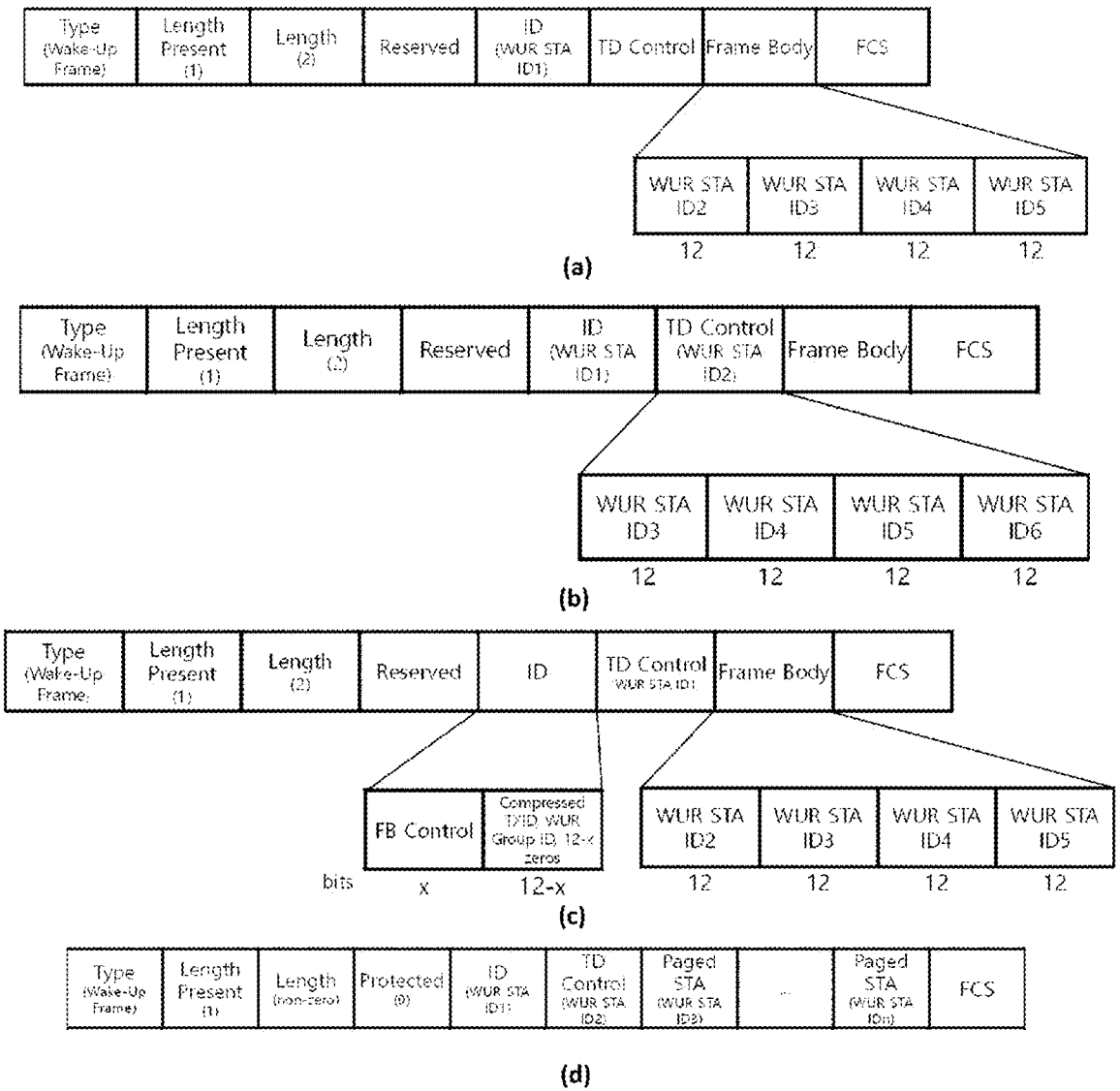
FIG. 21 illustrates a method of configuring a variable length WUR frame by a wireless communication terminal according to another embodiment of the present invention.

FIG. 21 illustrates a method of configuring a variable length WUR frame by a wireless communication terminal according to another embodiment of the present invention.

A base wireless communication terminal may insert an individual WUR STA ID into an ID field of the variable WUR frame. In this case, the WUR frame may be a Wake-Up frame. FIG. 21(a) illustrates a Wake-Up frame to which the embodiment is applied. A first WUR STA ID (WUR STA ID) is included in the ID field, and a second WUR STA ID (WUR SAT ID2) to a fifth WUR STA ID (WUR STA ID5) are included in the Frame Body field. When the ID field indicates an individual WUR STA ID field, it may be impossible for a wireless communication terminal that is not an intended recipient of the WUR frame or belongs to another BSS to stop receiving early. However, the length of the WUR Frame Body field may be reduced through the embodiment, which in turn the air time of the WUR frame may be reduced. In this case, as described above, the base wireless communication terminal may sort the WUR STA IDs in the ID field and the Frame Body field according to the size of the WUR STA ID value. The base wireless communication terminal may insert, into the ID field, the first WUR STA ID among the WUR STA IDs corresponding to the intended recipients of the WUR frame. In this case, the first WUR STA ID may be the smallest WUR STA ID among the WUR STA IDs. In another specific embodiment, the first WUR STA ID may be the largest WUR STA ID among WUR STA IDs.

When the base wireless communication terminal does not have to transmit additional information through the TD Control field, the base wireless communication terminal may insert the WUR STA ID in the TD Control field. In this case, the WUR frame may be a Wake-Up frame. FIG. 21(b) illustrates a Wake-Up frame to which the embodiment is applied. A first WUR STA ID (WUR STA ID) is included in the ID field, a second WUR STA ID (WUR SAT ID2) is included in the TD Control field, and a third WUR STA ID (WUR STA ID) to a fifth WUR STA ID (WUR STA ID5) are included in the Frame Body field. In the embodiment, the base wireless communication terminal may insert the second WUR STA ID into the TD Control field. The base wireless communication terminal may insert the remaining WUR STA IDs in the sorted order. When WUR STA IDs are included in the TD Control field, the base wireless communication terminal may insert the WUR STA IDs into the Frame Body field starting from the third WUR STA ID. In addition, when the WUR STA ID is not included in the TD Control field, the base wireless communication terminal may insert the WUR SAT IDs into the Frame Body field starting from the second WUR STA ID. As described above, the base wireless communication terminal may insert the FB Control field into the ID field and insert a compressed identifier into the remaining bits of the ID field. In this case, the base wireless communication terminal may insert the WUR STA ID field into the TD Control field. In this case, the WUR frame may be a Wake-Up frame. FIG. 21(c) illustrates a Wake-Up frame to which the embodiment is applied. A compressed ID (e.g., compressed TXID ID, compressed WUR Group ID) is included in the ID field, a second WUR STA ID (WUR SAT ID2) is included in the TD Control field, and a third WUR STA ID (WUR STA ID) to a fifth WUR STA ID (WUR STA ID5) are included in the Frame Body field.

In the embodiments, the wireless communication terminal may stop receiving the WUR frame based on the WUR STA ID sorting order. Specifically, WUR STA IDs within a WUR frame may be sorted in order from a smaller WUR STA ID to a larger WUR SAT ID. In this case, when the wireless communication terminal acquires a WUR STA ID larger than its WUR STA ID before acquiring its WUR STA ID, the wireless communication terminal may stop receiving the WUR frame. In addition, when the last WUR STA ID of the Frame Body field of the wireless communication terminal is smaller than the WUR STA ID value of the wireless communication terminal, the wireless communication terminal may stop receiving the WUR frame.

The field including an individual WUR STA ID and padding in the Frame Body field may be referred to as the Paged STA field. As described above, the Paged STA field may include control information. Specifically, the control information may play the same role as in the embodiments described with reference to FIG. 17. The base wireless communication terminal may insert, into the TD Control field, the WUR STA ID of the wireless communication terminal that does not require additional control information. This is because there may be insufficient bits to insert additional information in the TD Control field. In this case, when sorting the WUR STA IDs in the ID field and the Frame Body field, the base wireless communication terminal may sort the WUR STA IDs according to the WUR STA ID sorting order. When WUR STA IDs are sorted in the Frame Body field in order from a smaller WUR STA ID to a larger WUR STA ID, the base wireless communication terminal may insert the WUR STA ID having the smallest value among other WUR STA IDs excluding the WUR STA ID included in the TD Control field into the ID field and may insert the WUR STA ID having the second smallest value into the first Paged STA field. In another specific embodiment, when inserting the WUR STA IDs in the Frame Body field, the base wireless communication terminal may sort the WUR STA IDs according to the WUR STA ID sorting order. When WUR STA IDs are sorted in the Frame Body field in order from a smaller WUR STA ID to a larger WUR STA ID, the base wireless communication terminal may insert the WUR STA ID having the smallest value among other WUR STA IDs excluding the WUR STA ID included in the TD Control field into the first Paged STA field. In this case, the WUR frame may be a Wake-Up frame. FIG. 21(d) illustrates a Wake-Up frame to which the embodiment is applied. A second WUR STA ID (WUR STA ID2) is a WUR STA ID of a wireless communication terminal that does not require control information. Therefore, the TD Control field includes the second WUR STA ID (WUR STA ID2). In addition, a first WUR STA ID (WUR STA ID), which corresponds to the first WUR STA ID according to the WUR STA ID sorting order, among WUR STA IDs excluding the second WUR STA ID (WUR STA ID2), is included in the ID field. A third WUR STA ID (WUR STA ID3), which corresponds to the second WUR STA ID according to the WUR STA ID sorting order, among WUR STA IDs excluding the second WUR STA ID (WUR STA ID2), is included in the first Paged STA field, the Paged STA fields including the remaining WUR STA IDs are sorted according to the WUR STA ID sorting order.

The above-described embodiments may also be applied to the fixed length WUR frame. Specifically, the base wireless communication terminal may insert the first WUR STA ID into the ID field, and may insert the second WUR STA ID into the TD control field.

If a Type field of the WUR frame indicates the Wake-Up frame, the Length Present field is 0, and the ID field does not indicate the TXID corresponding to the BSS of the wireless communication terminal, the wireless communication terminal compares the value of the ID field with the WUR STA ID of the wireless communication terminal and the WUR Group ID including the wireless communication terminal. When the value of the ID field does not match the WUR STA ID of the wireless communication terminal and the WUR Group ID including the wireless communication terminal, the wireless communication terminal may not immediately stop receiving the WUR frame. This is because the remaining fields (e.g., TD Control field) of the WUR frame may include the WUR STA ID. However, as described above, when the WUR STA IDs are sorted according to a certain rule within the WUR frame, the wireless communication terminal may stop receiving the WUR frame based on the WUR STA ID sorting order. Specifically, within a WUR frame, WUR STA IDs may be sorted in order from a smaller WUR STA ID to a larger WUR STA ID. When the wireless communication terminal acquires a WUR STA ID larger than its WUR STA ID before acquiring its WUR STA ID, the wireless communication terminal may stop receiving the WUR frame. In addition, when the last WUR STA ID of the Frame Body field of the wireless communication terminal is smaller than the WUR STA ID value of the wireless communication terminal, the wireless communication terminal may stop receiving the WUR frame. In addition, when the wireless communication terminal acquires the same WUR STA ID as the WUR STA ID of the wireless communication terminal, the wireless communication terminal completely receives the WUR frame, and then has to verify whether the WUR frame is a WUR frame transmitted from the base wireless communication terminal associated with the wireless communication terminal by using the FCS operation. A specific WUR frame reception stop operation may follow the embodiment described with reference to FIG. 13.

Figure 22:
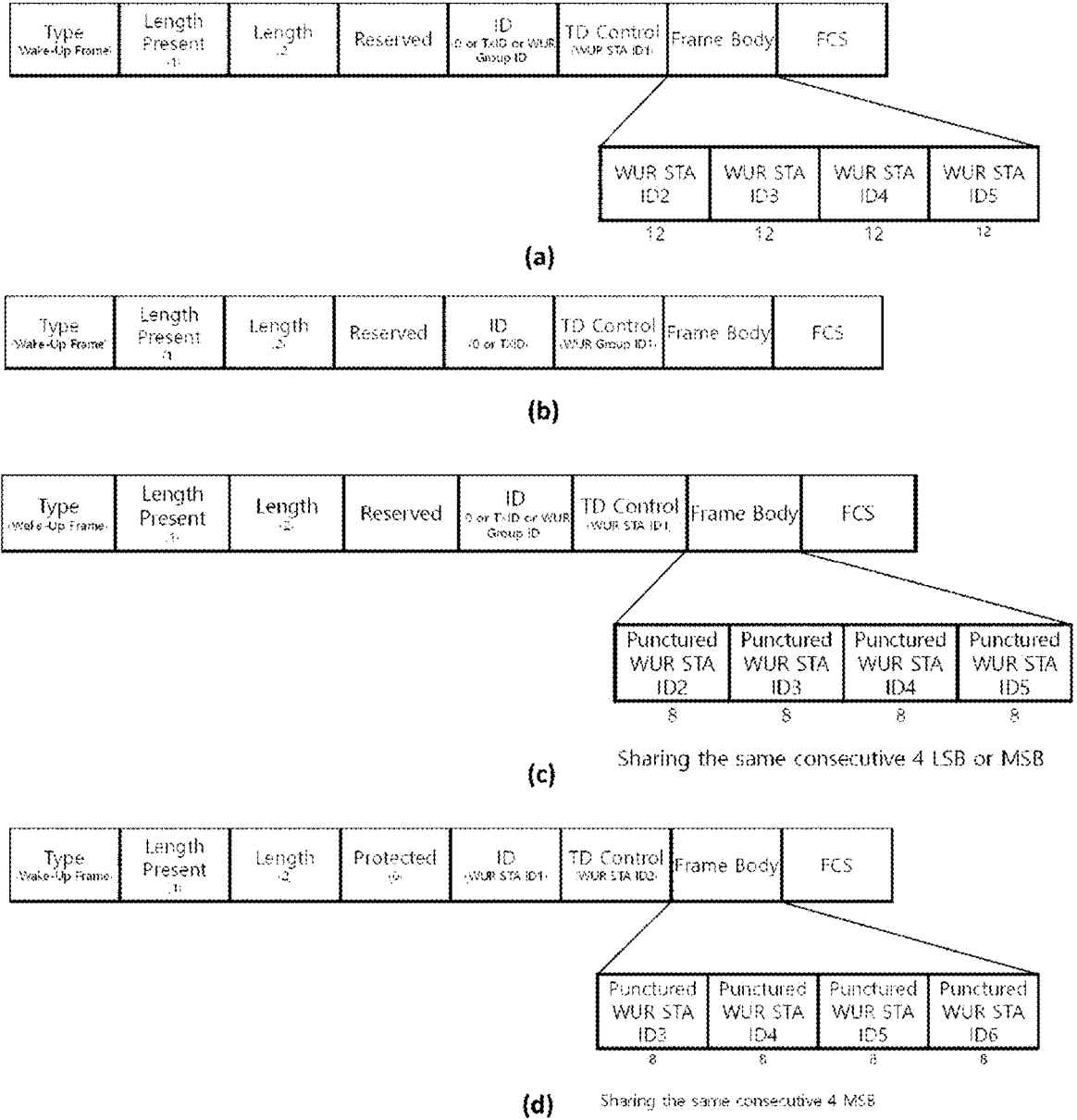
FIG. 22 illustrates a method of configuring a variable length WUR frame by a wireless communication terminal according to another embodiment of the present invention.

FIG. 22 illustrates a method of configuring a variable length WUR frame by a wireless communication terminal according to another embodiment of the present invention.

When the value of an ID field of the WUR frame is 0, the ID field may indicate that the WUR frame is a WUR frame that has to be received by all wireless communication terminals regardless of the BSS. The base wireless communication terminal may set 0, a TXID, or a WUR Group ID in the ID field, and may insert a WUR STA ID in a TD Control field and a Frame Body field. In this case, the WUR frame may be a Wake-Up frame. FIG. 22(a) illustrates a Wake-Up frame to which the embodiment is applied. A first WUR STA ID (WUR STA ID) is included in the TD control field, and a second WUR STA ID (WUR SAT ID2) to a fifth WUR STA ID (WUR STA ID5) are included in the Frame Body field.

In another specific embodiment, the base wireless communication terminal may set 0 or the TXID in the ID field and may set the WUR Group ID in the TD Control field. In this case, the base wireless communication terminal may insert, into the Frame Body field, only the WUR STA ID of the wireless communication terminal included in the group corresponding to the WUR Group ID. The wireless communication terminal may determine a WUR STA ID that may be included in the Frame Body field based on the WUR Group ID indicated by the TD Control field. In this case, the WUR frame may be a Wake-Up frame. FIG. 22(b) illustrates a Wake-Up frame to which the embodiment is applied.

In another specific embodiment, the base wireless communication terminal may insert, into the TD Control field, the WUR STA ID of the wireless communication terminal belonging to the BSS corresponding to the TXID indicated by the ID field, or the WUR STA ID of the wireless communication terminal included in the group corresponding to the WUR Group ID indicated by the ID field. In this case, the base wireless communication terminal may insert, into the Frame Body field, the punctured WUR STA ID of the wireless communication terminal belonging to the BSS corresponding to the TXID indicated by the ID field, or the punctured WUR STA ID of the wireless communication terminal included in the group corresponding to the WUR Group ID indicated by the ID field. The punctured WUR STA ID may be a punctured WUR STA ID by 4 bits. Specifically, a 4-bit MSB or LSB may be a punctured WUR STA ID. When the base wireless communication terminal inserts the punctured WUR STA ID into the Frame Body field, the base wireless communication terminal may be limited such that only the punctured WUR STA ID, where the value of the punctured bit is equal to the value of the bit corresponding to the position of the punctured bit in the WUR STA ID inserted into the TD Control field, is inserted into the Frame Body field. This is because when values of the punctured WUR STA ID of different wireless communication terminals may be the same and there is no such limitation, the wireless communication terminal that is not the intended recipient of the WUR frame may determine that the Frame Body field of the WUR frame indicates the wireless communication terminal. In this case, the WUR frame may be a Wake-Up frame. FIG. 22(c) illustrates a Wake-Up frame to which the embodiment is applied. A first WUR STA ID (WUR STA ID) is included in the TD control field, and a second WUR STA ID (WUR SAT ID2) to a fifth WUR STA ID (WUR STA ID5) are included in the Frame Body field.

In the embodiment, when the value of the bit corresponding to the position of the punctured bit in the WUR STA ID of the wireless communication terminal and the value of the bit corresponding to the position of the punctured bit in the WUR STA ID indicated by the TD Control field are the same, the wireless communication terminal may determine whether the Frame Body field indicates the WUR STA ID of the wireless communication terminal. For example, when the ID field indicates the TXID, the wireless communication terminal belonging to the BSS corresponding to the TXID may compare the values of the bit corresponding to the position of the punctured bit in the WUR STA ID indicated by the TD Control field. In addition, when the ID field indicates the WUR Group ID, the wireless communication terminal belonging to the group corresponding to the WUR Group ID may compare the values of the bit corresponding to the position of the punctured bit in the WUR STA ID indicated by the TD Control field. In the embodiments, when the values of the bit corresponding to the position of the punctured bit in the WUR STA ID indicated by the TD Control field match each other, the wireless communication terminal may determine whether the WUR STA ID of the wireless communication terminal is included in the Frame Body field. When the WUR frame is a Wake-Up frame and the WUR STA ID of the wireless communication terminal is included in the Frame Body field, the wireless communication terminal may wake-up the PCR transceiver.

In another specific embodiment, the base wireless communication terminal may not compare the punctured bit in the WUR STA ID of the wireless communication terminal with the value of the bit corresponding to the position of the punctured bit in the TD Control field. Specifically, when the Frame Body field includes the punctured WUR STA ID of the wireless communication terminal, the wireless communication terminal may wake-up the PCR transceiver based on the Wake-Up frame. In the embodiment, the base wireless communication terminal may insert the punctured WUR STA ID field into the Frame Body field only when different wireless communication terminals do not have the same punctured WUR STA ID. The embodiment related to the punctured WUR STA ID may be equally applied to the embodiments described with reference to FIG. 21.

In another specific embodiment, the base wireless communication terminal may insert the WUR STA ID into the ID field. In this case, the base wireless communication terminal may be limited such that only the punctured WUR STA ID, where the value of the punctured is the same as the value of the bit corresponding to the position of the punctured bit in the WUR STA ID indicated by the ID field, is inserted into the Frame Body field. For example, the base wireless communication terminal may insert, into the Frame Body field, only the punctured WUR STA ID of the WUR STA ID having the same MSB as the four MSBs of the WUR STA ID indicated by the ID field. When the TD Control field indicates the WUR STA ID, the base wireless communication terminal may be limited such that only the punctured WUR STA ID, where the value of the punctured bit is the same as the value of the bit corresponding to the position of the punctured bit in the WUR STA ID indicated by the ID field or the WUR STA ID indicated by the TD Control field, is inserted into the Frame Body field. For example, the base wireless communication terminal may insert, into the Frame Body field, only the punctured WUR STA ID of the WUR STA ID having the same MSB as the four MSBs of the WUR STA ID indicated by the ID field or the four MSBs of the WUR STA ID indicated by the TD Control field. In the embodiments, the WUR frame may be a Wake-Up frame. FIG. 22(d) illustrates a Wake-Up frame to which the embodiment is applied. A first WUR STA ID (WUR STA ID1) is included in the ID Control field, a second WUR STA ID (WUR STA ID2) is included in the TD Control field, and the punctured values of a third WUR STA ID (punctured WUR STA ID3) to a sixth WUR STA ID (punctured WUR STA ID6) are included in the Frame Body field.

The base wireless communication terminal may insert the smallest WUR STA ID into the ID field and the largest WUR STA ID into the TD Control field, among the plurality of WUR STA IDs corresponding to the plurality of wireless communication terminals that are intended recipients of the WUR frame. The base wireless communication terminal may insert all punctured WUR STA IDs where the bit punctured from the start of the Frame Body field has the same value as the bit value corresponding to the position of the punctured bit in the WUR STA ID indicated by the ID field, and may insert the punctured WUR STA IDs where the punctured bit to the next bit of the Frame Body field has the same value as the bit value corresponding to the position of the punctured bit in the WUR STA ID indicated by the TD Control field. In this case, a plurality of punctured WUR STA IDs, where the punctured bit has the same value as the value of the bit corresponding to the position of the punctured bit in the WUR STA ID indicated by the ID field, may be sorted according to the size of the STA ID value in the Frame Body field. Specifically, in this case, a plurality of punctured WUR STA IDs, where the punctured bit has the same value as the value of the bit corresponding to the position of the punctured bit in the WUR STA ID indicated by the ID field, may be positioned in the Frame Body field in order from a smaller WUR STA ID to a larger WUR STA ID. A plurality of punctured WUR STA IDs, where the punctured bit has the same value as the value of the bit corresponding to the position of the punctured bit in the WUR STA ID indicated by the TD Control field, may be sorted according to the size of the WUR STA ID value in the Frame Body field. Specifically, in this case, a plurality of punctured WUR STA IDs, the punctured bit has the same value as the value of the bit corresponding to the position of the punctured bit in the WUR STA ID indicated by the TD Control field may be positioned in the Frame Body field from a WUR STA ID of a smaller value. The wireless communication terminal may determine that the previous field based on the position that contains a smaller value than the previous WUR STA ID in the Frame Body field is a punctured WUR STA ID where the punctured bit is the same as the value of the bit corresponding to the position of the punctured bit in the WUR STA ID indicated by the ID field. In addition, the wireless communication terminal may determine that the later field based on the position that contains a smaller value than the previous WUR STA ID in the Frame Body field is a punctured WUR STA ID in which the punctured bit is the same as the value of the bit corresponding to the position of the punctured bit in the WUR STA ID indicated by the TD Control field. In a specific embodiment, when the WUR STA ID that satisfies these rules is not able to be inserted into the Frame Body field, the base wireless communication terminal may not insert, into the TD Control field, the WUR STA ID where the value of the bit corresponding to the position of the punctured bit in the WUR STA ID indicated by the ID field is different from the value of the bit corresponding to the position of the punctured bit.

In some of the embodiments described above, the ID field of the variable length WUR frame includes the WUR STA ID. In this case, only for the Wake-Up frame of a fixed length, the ID field may indicate the TXID. Therefore, when the ID field indicates the TXID, the wireless communication terminal may determine that the Wake-Up frame is a fixed length Wake-Up frame. When the ID field indicates the TXID, the Length Present field does not have to be used. When the ID field indicates the TXID, the base wireless communication terminal may insert control information into the Length Present field. This will be described with reference to FIG. 23.

FIG. 23 illustrates a method of configuring a fixed length wake up frame by a wireless communication terminal according to an embodiment of the present invention.

When the ID field indicates the TXID, the base wireless communication terminal may insert control information into the Length Present field. In this case, the control information may indicate whether the bufferable unit (BU) that the wireless communication terminal has to receive after wake-up is in the normal power save (PS) mode or unscheduled-automatic power save delivery (U-APS). The BU may represent a frame buffered in a buffer of the base wireless communication terminal. In addition, the control information may indicate whether the wireless communication terminal is to transmit a wake-up response frame after wake-up. In addition, the control information may be information indicating that the wireless communication terminal is to immediately perform an operation. In addition, the control information may be information indicating that the encoding structure of the TD Control field is changed. In addition, the control information may indicate whether a PCR group-addressed BU exists. In this case, the control information may be a 1-bit field.

In addition, for the WUR beacon frame, only a fixed length WUR frame may be used. Therefore, as in the above-described embodiments, the Length Present field may not be used. The base wireless communication terminal may insert control information into the Length Present field of the WUR beacon frame. In this case, the control information may be set according to the above-described embodiments.

In the embodiment of FIG. 23, in the WUR frame, the Type field indicates that the WUR frame is a Wake-Up frame or a WUR beacon frame. In this case, the ID field indicates the TXID field. As described above, the base wireless communication terminal inserts control information (Special Control) into the Length Present field.

Figure 24:
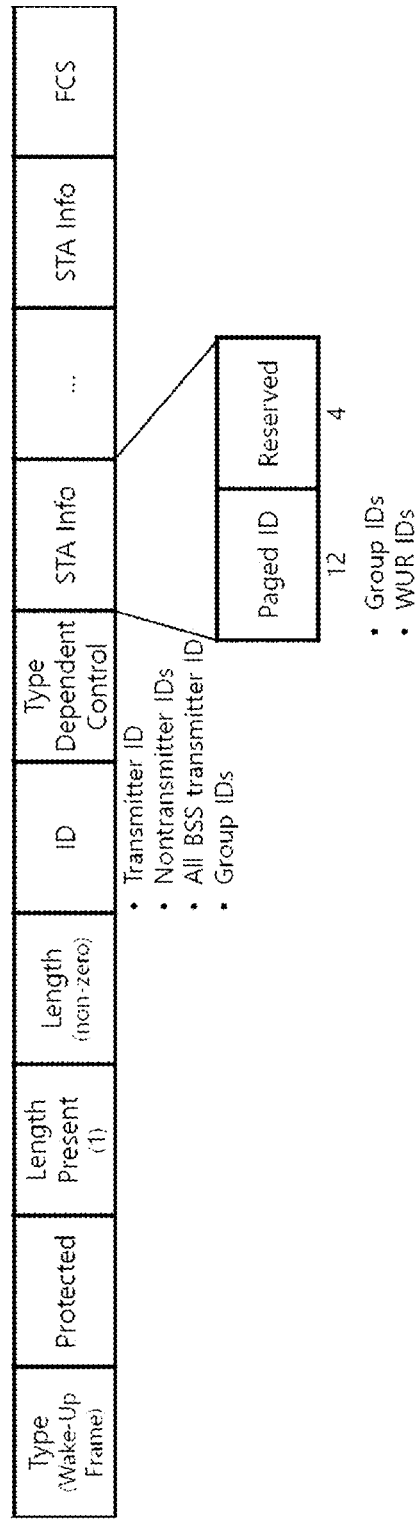
FIG. 24 illustrates a method of configuring a variable length wake up frame by a wireless communication terminal according to another embodiment of the present invention.

FIG. 24 illustrates a method of configuring a variable length wake up frame by a wireless communication terminal according to another embodiment of the present invention.

A base wireless communication terminal may insert any one of a TXID, a non-transmitter ID (NTXID), and an All BSS transmitter ID (ATXID) into an ID field of a variable length Wake-Up frame. In this case, the NTXID is an identifier for identifying a non-transmitted BSSID in a multiple BSSID set. The ATXID is a BSS that identifies all BSSs. For example, the value of the ATXID may be 0 as described above. In another specific embodiment, the value of the ATXID may be one less than the TXID. In addition, the base wireless communication terminal may insert the WUR Group ID into the ID field of the variable length Wake-Up frame. Depending on the type of the identifier indicated by the ID field, the identifier that may be included in an STA Info field included in the Frame Body field may be limited. In this case, the STA Info field may include a 12-bit indicating the WUR STA ID or the WUR Group ID and a reserved 4-bit field. When the ID field indicates any one of the TXID, the NTXID, and the ATXID, the wireless communication terminal may insert, into the STA Info field, the WUR STA ID of the wireless communication terminal belonging to the BSS corresponding to the identifier indicated by the ID field. In addition, when the ID field indicates any one of the TXID, the NTXID, and the ATXID, the wireless communication terminal may insert, into the STA Info field, the WUR Group ID of the wireless communication terminal group belonging to the BSS corresponding to the identifier indicated by the ID field. In the embodiment, the base wireless communication terminal may simultaneously page a plurality of groups to the BSS identified by the ID field, and may simultaneously page at least one group and at least one individual wireless communication terminal.

In this case, when the ID field does not indicate an identifier including the BSS in which the wireless communication terminal is included, the wireless communication terminal receiving the Wake-Up frame may stop receiving the Wake-Up frame. When the ID field indicates the WUR Group ID, the base wireless communication terminal may insert, into the STA Info field, only the WUR STA ID of the wireless communication terminal included in the group identified by the corresponding WUR Group ID. In this case, when the ID field does not indicate the group including the wireless communication terminal, the wireless communication terminal receiving the Wake-Up frame may stop receiving the Wake-Up frame. Through the embodiment, the base wireless communication terminal may further reduce the number of wireless communication terminals processing the variable length WUR frame than when any one of the TXID, the NTXID, and the ATXID is inserted into the ID field. In addition, it may be limited that the TXID-related identifier is inserted into the variable length Wake-Up frame. In this case, the base wireless communication terminal may insert, into the ID field, at least one of a transmitter GID (TGID), a non-transmitter GID (NTGID), and an all BSS transmitter GID (ATGID). The TGID may be an identifier used to page all wireless communication terminals belonging to the BSS corresponding to the TXID. In addition, the NTGID may be an identifier used to page all wireless communication terminals belonging to the BSS corresponding to the NTXID. In addition, the ATXID may be an identifier used to page all communication terminals belonging to all BSSs. The TGID, the NTGID, and the ATGID may be allocated within the GID space or the WUR identifier space. The TGID, the NTGID, and the ATGID may be allocated as consecutive values within the GID space. In addition, the TGID values may be continuous with each other. The TGID, the NTGID, and the ATGID are not individually allocated to the wireless communication terminal, but may be automatically allocated for each BSS. Accordingly, the base wireless communication terminal may allocate the TGID, the NTGID, and the ATGID for each BSS without using the Group ID bitmap field. Accordingly, the base wireless communication terminal may allocate the TGID, the NTGID, and the ATGID as consecutive values based on the smallest value in the GID space or WUR space, or as consecutive values based on the largest value. The base wireless communication terminal may specify a specific value of the TGID as a representative value, insert the specified representative value into the PCR element related to WUR, and transmit it. In this case, the wireless communication terminal may acquire the NTGID, the ATGID, and the TGID allocated to the wireless communication terminal in the same manner as the TXID combination method. When the ID field identifies the BSS or group in which the wireless communication terminal is included, the wireless communication terminal may process the Frame Body field. In this case, when the identifier allocated to the wireless communication terminal is not included until the last STA Info field of the Frame Body field, the wireless communication terminal may stop receiving the Wake-Up frame without processing the FCS field. In this case, the operation of stopping receiving the Wake-Up frame by the wireless communication terminal may follow the operation of stopping receiving the WUR frame described above. Specifically, the wireless communication terminal may transmit a PHY-CCARESET.request to the physical layer.

As described above, the base wireless communication terminal may sort the plurality of STA Info fields in the Frame Body field in order of the size of the identifier included in each of the plurality of STA Info fields. In a specific embodiment, the base wireless communication terminal may sort a plurality of STA Info fields in the Frame Body field such that an STA Info field including an identifier of a small value is first located. In this case, when the wireless communication terminal acquires a WUR STA ID larger than the WUR STA ID of the wireless communication terminal, the wireless communication terminal may stop receiving the Wake-Up frame. In addition, when the WUR STA ID of the last STA Info field of the Frame Body field of the wireless communication terminal is smaller than the WUR STA ID value of the wireless communication terminal, the wireless communication terminal may stop receiving the WUR frame. The operation of stopping receiving the Wake-Up frame by the wireless communication terminal may follow the operation of stopping receiving the WUR frame described above. Specifically, the wireless communication terminal may transmit a PHY-CCARESET.request to the physical layer.

As in the above-described embodiments, the STA Info field may indicate the WUR Group ID. In this case, when the wireless communication terminal acquires an identifier larger than the largest of the WUR STA ID and the WUR Group ID allocated to the wireless communication terminal, the wireless communication terminal may stop receiving the Wake-Up frame. Specifically, when the wireless communication terminal acquires an identifier greater than the largest of the WUR STA ID and WUR Group ID allocated to the wireless communication terminal before the wireless communication terminal acquires the allocated WUR STA ID or WUR Group ID, the wireless communication terminal may stop receiving the Wake-Up frame. In this case, the operation of stopping receiving the Wake-Up frame by the wireless communication terminal may follow the operation of stopping receiving the WUR frame described above. Specifically, the wireless communication terminal may transmit a PHY-CCARESET.request to the physical layer.

Figure 25:
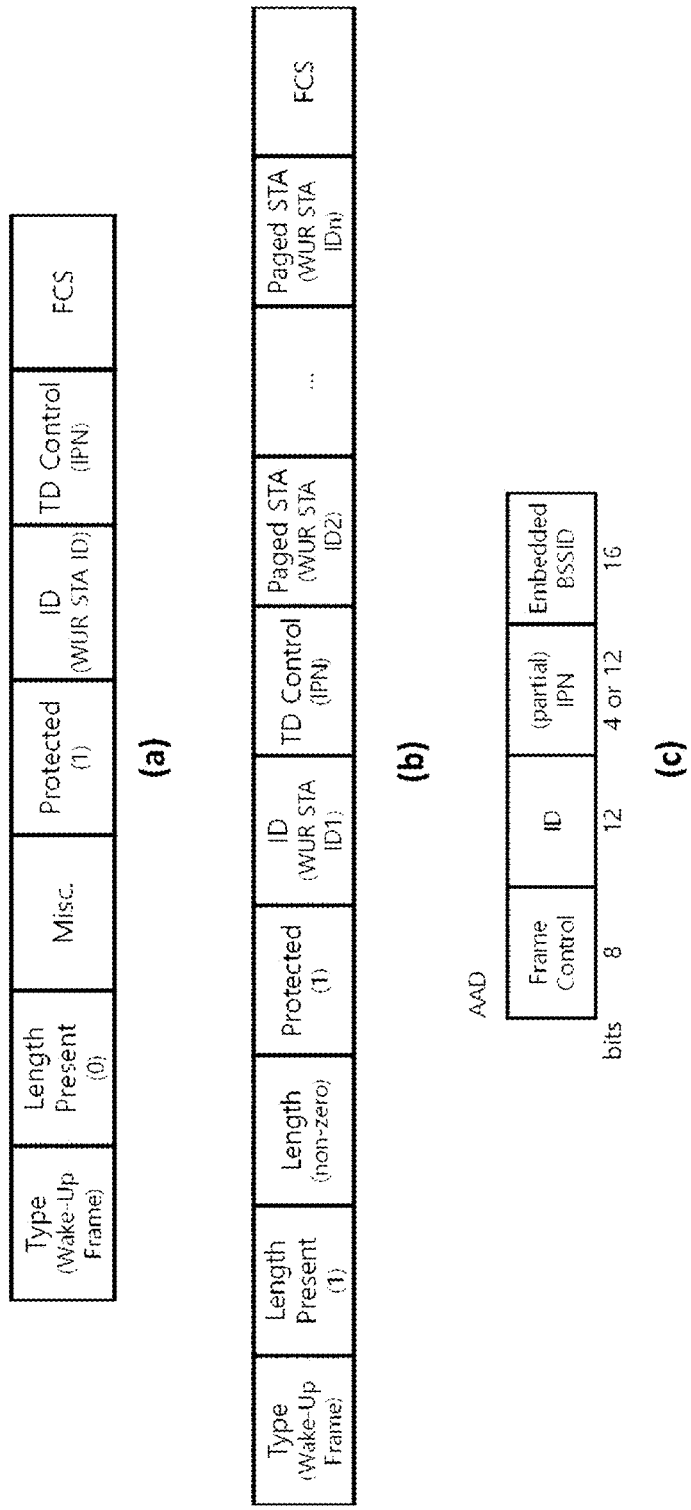
FIG. 25 illustrates a Wake-Up frame format used to protect a wake-up sequence from an external attack, by a wireless communication terminal according to an embodiment of the present invention.

FIG. 25 illustrates a Wake-Up frame format used to protect a wake-up sequence from an external attack, by a wireless communication terminal according to an embodiment of the present invention.

As described above, the WUR frame may include a Protected field. The Protected field may indicate whether the WUR frame is a frame protected by applying additional encryption. When the Protected field is activated, the FCS field contains a MIC value. In order for the wireless communication terminal to detect a replay attack based on the MIC, a specific counter (e.g., integrity group temporal key packet number and IPN) value may be used. Specifically, when the counter value included in the WUR frame received by the wireless communication terminal is equal to or less than the counter value stored in the wireless communication terminal, the wireless communication terminal may not process the WUR frame. Specifically, the wireless communication terminal may discard or ignore the WUR frame.

The base wireless communication terminal may insert, into the TD Control field, all or some of the specific counter values described above. In PCR, a counter value allocated to the same security key used by the wireless communication terminal may be used as a specific counter value. In another specific embodiment, the specific counter value may be a newly generated value for the WUR operation. In addition, the wireless communication terminal may obtain a specific counter value from the base wireless communication terminal during WUR mode negotiation. In another specific embodiment, a specific bit of the TSF may be used as a specific counter value. The wireless communication terminal and the base wireless communication terminal may store specific counter values. In addition, the terminal and the base wireless communication terminal may increase the value of a specific counter each time the WUR frame is transmitted and received.

The base wireless communication terminal may truncate, in 16 bits, a value obtained by encrypting basic information generated based on information included in the WUR frame with an encryption key. The base wireless communication terminal may use a value truncated in 16 bits as the MIC value. The base wireless communication terminal may concatenate at least one of the Frame Control field, the ID field, a part or all of the IPN of the TD Control field, and the Embedded BSSID field of the WUR frame and may use it as basic information. FIG. 25(a) illustrates an example of a fixed-length Wake-Up frame in which the Protected field is activated. FIG. 25(b) illustrates an example of a variable length Wake-Up frame in which the Protected field is activated. FIG. 25(c) illustrates an example of basic information (additional authentication data, AAD) used by the base wireless communication terminal and the wireless communication terminal.

The wireless communication terminal may generate information based on the received WUR frame. The wireless communication terminal may generate the MIC based on the generated basic information. The wireless communication terminal may check the integrity of the WUR frame by comparing the generated MIC value with the MIC value obtained in the FCS field of the WUR frame.

Figure 26:
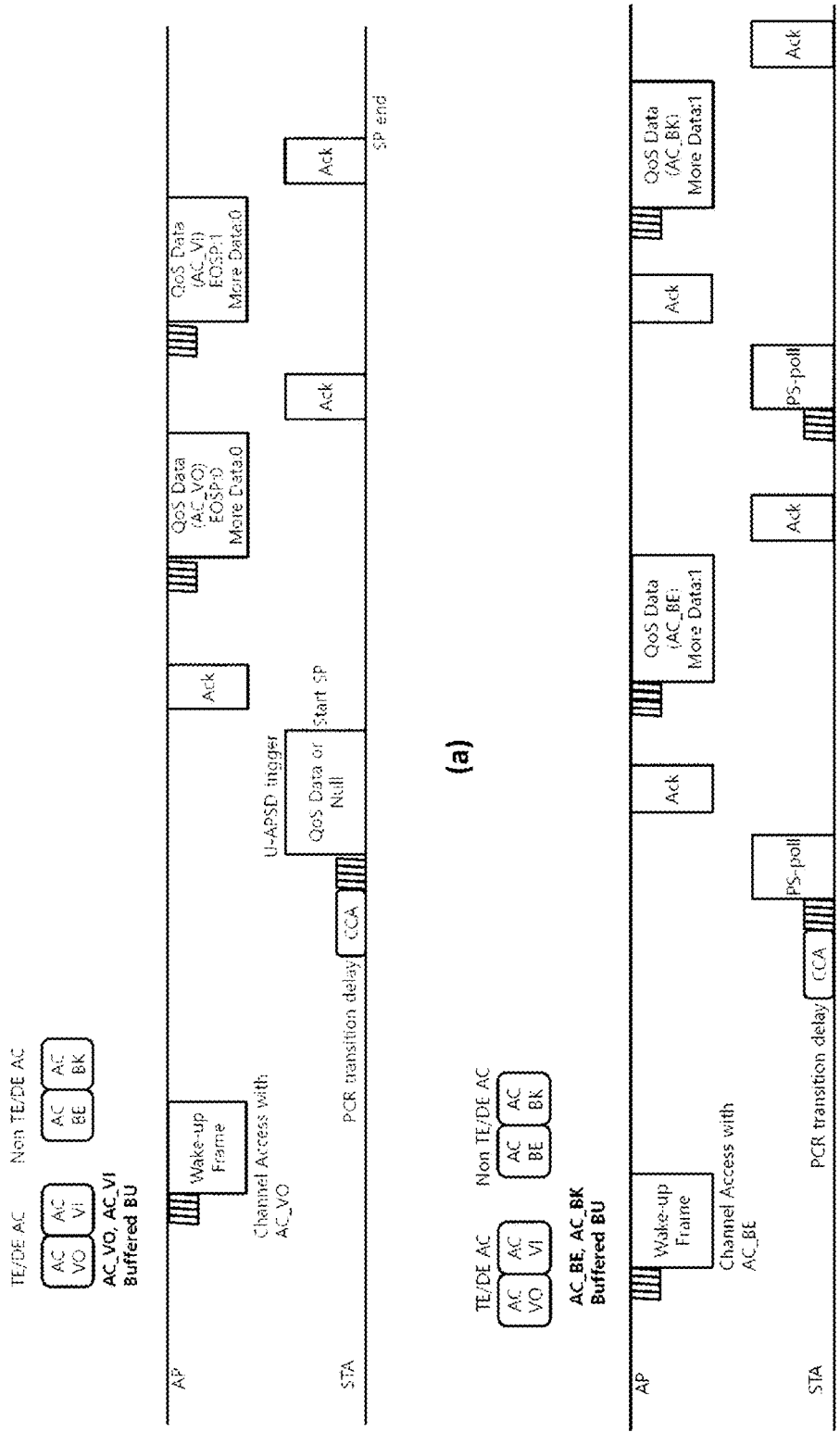
FIG. 26 illustrates an operation of transmitting a Wake-Up frame by a base wireless communication terminal according to an embodiment of the present invention.

FIG. 26 illustrates an operation of transmitting a Wake-Up frame by a base wireless communication terminal according to an embodiment of the present invention.

When DL data for a wireless communication terminal operating in WUR mode arrives at the base wireless communication terminal, the base wireless communication terminal has to induce the wake-up of the wireless communication terminal by transmitting the Wake-Up frame to the wireless communication terminal. In this case, the base wireless communication terminal transmits the Wake-Up frame through an EDCA contention procedure. When the base wireless communication terminal transmits the Wake-Up frame to a plurality of wireless communication terminals, the base wireless communication terminal may access a channel using any 0Access Category (AC). This is because when the base wireless communication terminal transmits the Wake-Up frame to a plurality of wireless communication terminals, the transmission has a high priority. The base wireless communication terminal may transmit the Wake-Up frame to a plurality of wireless communication terminals by using an AC expected to succeed in channel accessing at the earliest time point. The base wireless communication terminal may determine the AC expected to succeed in channel accessing at the earliest time point based on at least one of a backoff counter for each AC, a traffic characteristic of the DL BU, and a life of the DL BU. However, when the base wireless communication terminal transmits the Wake-Up frame to any one terminal, it may not be appropriate for the base wireless communication terminal to transmit the Wake-Up frame by using any AC. When the base wireless communication terminal transmits the Wake-Up frame to any one terminal, the base wireless communication terminal may randomly select one of the ACs in which the DL BU for the wireless communication terminal intended to transmit the Wake-Up frame exists. In this case, the base wireless communication terminal may select the AC based on traffic characteristics of the DL BU, a lifetime of the DL BU, and an internal EDCA parameter. Specifically, the base wireless communication terminal may select the AC to which the DL BU whose lifetime expires most quickly belongs. In addition, the base wireless communication terminal may select an AC with the earliest channel access time point based on at least one of a backoff counter and an arbitration inter-frame space (AIFS).

When the wireless communication terminal receives the Wake-Up frame inducing wake-up of the wireless communication terminal from the base wireless communication terminal, the wireless communication terminal may perform the PCR wake-up operation. In this case, the wireless communication terminal may perform NAV synchronization after the PCR conversion delay time elapses. When the wireless communication terminal fails to receive, from the base wireless communication terminal, a PCR frame that is the intended recipient of the wireless communication terminal until the NAV synchronization is completed, the wireless communication terminal may transmit a response frame to the base wireless communication terminal using PCR. In this case, the response frame may be a frame for notifying that transmission of the Wake-Up frame is successful and for receiving the DL BU. In addition, the response frame may be a PS-poll frame, a U-APSD trigger frame, or a frame indicating active mode switching.

When the PCR conversion delay elapses since the base wireless communication terminal transmits the Wake-Up frame or the base wireless communication terminal receives the response frame from the wireless communication terminal, the base wireless communication terminal may perform the EDCA operation for transmitting the DL BU to the wireless communication terminal. When the DL BU to be transmitted to the wireless communication terminal is in two or more ACs, the base wireless communication terminal may select any one of the two or more ACs to perform channel access.

However, when the base wireless communication terminal uses different ACs for each of the channel access when transmitting the Wake-Up frame and the channel access when transmitting the DL BU, a fairness problem may occur. Specifically, in order to transmit a DL BU corresponding to an AC having a low priority, the base wireless communication terminal may intentionally transmit the Wake-Up frame using an AC having a high priority after channel access. Accordingly, the base wireless communication terminal may transmit the DL BU to the wireless communication terminal that wakes up based on the Wake-Up frame, by using, for channel access, the same AC as that used for channel access for the Wake-Up frame transmission. The base wireless communication terminal may not be allowed to transmit the DL BU to the wireless communication terminal that wakes up based on the Wake-Up frame by using an AC different from the AC used for the Wake-Up frame transmission.

At the time when the base wireless communication terminal transmits the DL BU, there may be no DL BU corresponding to the AC used for channel access for the Wake-Up frame transmission. For example, the DL BU may have reached the end of its life and be discarded from the buffer. Therefore, when the DL BU corresponding to the AC used for channel access for the Wake-Up frame transmission is not in the buffer of the base wireless communication terminal when the base wireless communication terminal transmits the DL BU, the base wireless communication terminal may use any AC for channel access for DL BU transmission. In another specific embodiment, when the DL BU corresponding to the AC used for channel access for the Wake-Up frame transmission is not in the buffer of the base wireless communication terminal when the base wireless communication terminal transmits the DL BU, the base wireless communication terminal may use an AC having the highest priority among the ACs in which the DL BU exists, for channel access for DL BU transmission. In another specific embodiment, when the DL BU corresponding to the AC used for channel access for the Wake-Up frame transmission is not in the buffer of the base wireless communication terminal when the base wireless communication terminal transmits the DL BU, the base wireless communication terminal may use an AC with the earliest channel access time point for channel access for DL BU transmission.

After the wireless communication terminal transmits the DL BU to the base wireless communication terminal, the wireless communication terminal and the base wireless communication terminal may operate according to the protocol defined in the PCR operation according to the AC of the DL BU and the type of transmitted frame. In this case, the protocol defined in the PCR operation may be at least one of a normal PS mode, U-APSD, and TWT.

In FIG. 26(*a*), among ACs (AC_VO, AC_VI) in which the DL BU exists, a base wireless communication terminal AP uses AC_VO for channel access for Wake-Up frame transmission. In addition, AC_VO and AC_VI are trigger-enabled (TE) and deliver-enabled (DE) ACs. In addition, AC_VO and AC_VI are non-trigger-enabled (TE) and non-deliver-enabled (non-DE) ACs. A wireless communication terminal STA receives the Wake-Up frame, and wakes up the PCR transceiver. The wireless communication terminal STA transmits a QoS data frame or a QoS null frame as a U-APSD trigger. The base wireless communication terminal AP transmits an ACK for the U-APSD trigger. Then, the base wireless communication terminal AP accesses the channel using AC_VO used for channel access for the Wake-Up frame transmission, and transmit the QoS data frame corresponding to AC_VO to the wireless communication terminal STA. In this case, a More Data field is set to 0. The wireless communication terminal STA transmits an ACK to the base wireless communication terminal AP. The base wireless communication terminal AP accesses the channel using AC_VI, and transmits the QoS data frame corresponding to AC_VI to the wireless communication terminal STA. In this case, a More Data field is set to 0. The wireless communication terminal STA transmits an ACK to the base wireless communication terminal AP.

In FIG. 26(*b*), among ACs (AC_BE, AC_BK) in which DL BU exists, the base wireless communication terminal AP uses AC_BE for channel access for the Wake-Up frame transmission. In addition, AC_VO and AC_VI are trigger-enabled (TE) and deliver-enabled (DE) ACs. In addition, AC_VO and AC_VI are non-trigger-enabled (TE) and non-deliver-enabled (non-DE) ACs. A wireless communication terminal STA receives the Wake-Up frame, and wakes up the PCR transceiver. The wireless communication terminal STA transmits a PS-poll frame. The base wireless communication terminal AP transmits an ACK for the PS-poll frame. Then, the base wireless communication terminal AP accesses the channel using AC_BE used for channel access for the Wake-Up frame transmission, and transmit the QoS data frame corresponding to AC_BE to the wireless communication terminal STA. In this case, the More Data field is set to 1. The wireless communication terminal STA transmits an ACK to the base wireless communication terminal AP. The base wireless communication terminal AP accesses the channel using AC_BK, and transmits the QoS data frame corresponding to AC_BK to the wireless communication terminal STA. In this case, the More Data field is set to 1. The wireless communication terminal STA transmits an ACK to the base wireless communication terminal AP.

Figure 27:
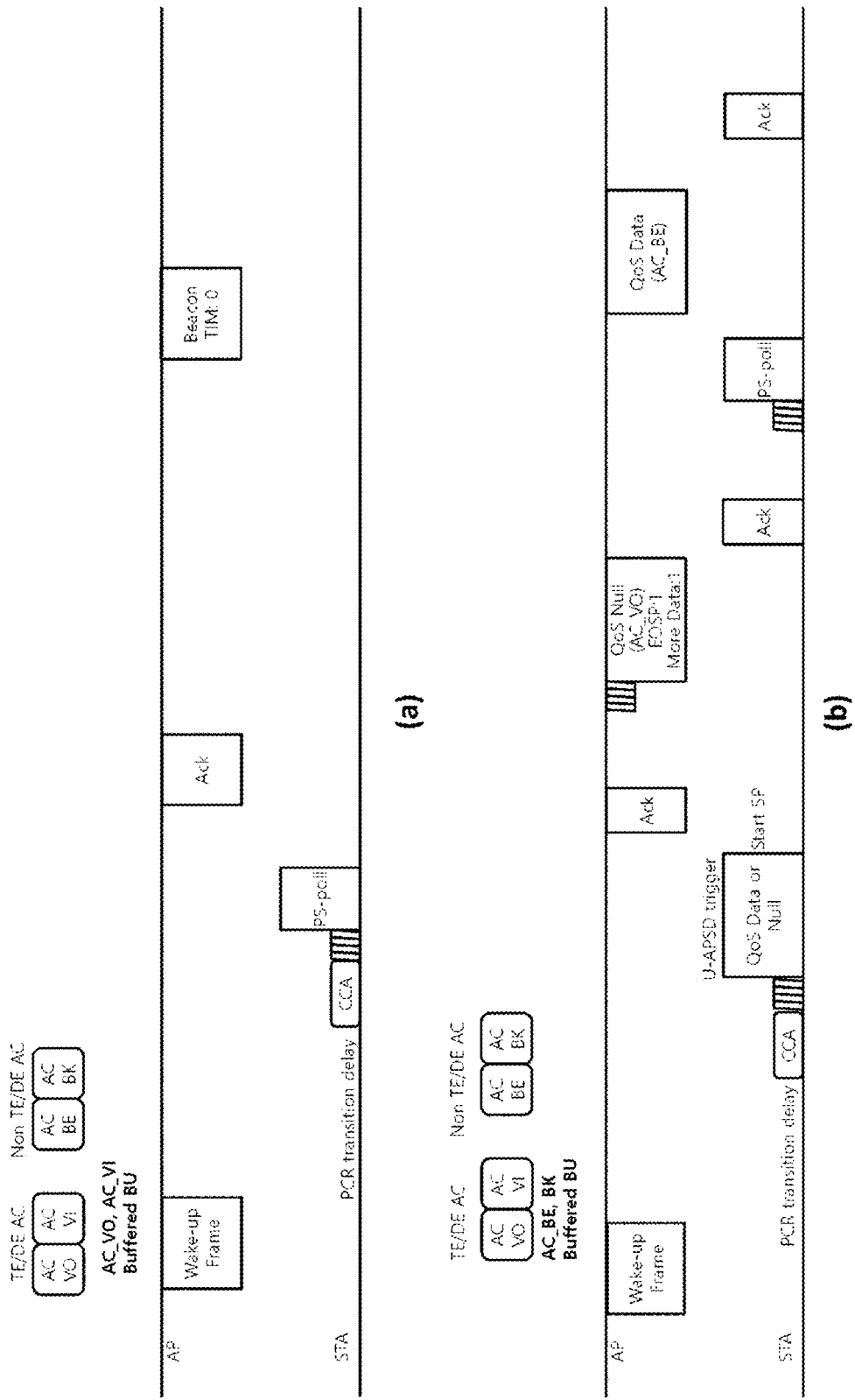
FIG. 27 illustrates a method of receiving a downlink bufferable unit (DL BU) after wake-up, by a wireless communication terminal according to an embodiment of the present invention.

FIG. 27 illustrates a method of receiving a downlink bufferable unit (DL BU) after wake-up, by a wireless communication terminal according to an embodiment of the present invention.

As described above, after the wireless communication terminal wakes up the PCR transceiver, the wireless communication terminal may operate according to the PCR PS operation. Accordingly, the base wireless communication terminal may transmit the DL BU to the wireless communication terminal in response to the request of the wireless communication terminal. When the wireless communication terminal uses U-APSD for some ACs in the PCR PS mode, DL BU transmission may not proceed smoothly depending on which response frame the wireless communication terminal responds with after waking up the PCR transceiver. This will be described with reference to FIGS. 27(*a*) and 27(*b*). For example, in the U-APSD configuration where AC_VO and AC_VI are trigger-enabled (TE) and deliver-enabled (DE) ACs, the wireless communication terminal STA is operating in the WUR mode. In this case, when AC_BO corresponds to the base wireless communication terminal AP and a BU for the wireless communication terminal STA arrives, the base wireless communication terminal AP may transmit a Wake-Up frame to the wireless communication terminal STA. When the wireless communication terminal STA receives the Wake-Up frame and wakes up the PCR transceiver and then transmits the response frame using PCR, the wireless communication terminal STA may not know the type of AC to which the BU to be received by the wireless communication terminal corresponds. In addition, since the type of frame that the wireless communication terminal STA may transmit as a response frame is not separately specified, the wireless communication terminal STA may transmit a frame other than the frame that may be used as a U-APSD trigger frame, as a response frame. In the U-APSD configuration where AC_VO and AC_VI are TE and trigger-enabled (TE) and deliver-enabled (DE) ACs, the frame that may be used as a U-APSD trigger frame is a QoS data frame of AC_VO and AC_VI or a QoS null frame. When the base wireless communication terminal AP receives the U-APSD trigger frame, the base wireless communication terminal may start a U-APSD service period (SP) and may transmit a buffered BU of the corresponding AC. When the base wireless communication terminal receives the QoS data or the QoS null frame as the U-APSD trigger frame, the base wireless communication terminal may transmit an Ack for the QoS data or the QoS null frame.

When the wireless communication terminal STA transmits the PS-poll frame as a response frame as illustrated in FIG. 27(a), the base wireless communication terminal AP may not recognize the start of the U-APSD SP. Accordingly, the base wireless communication terminal AP may not transmit the buffered BU to the wireless communication terminal STA. In this case, the wireless communication terminal STA has to wait for transmission of the BU buffered in the base wireless communication terminal AP until the time to transmit the trigger frame for the trigger-enabled (TE) AC to the base wireless communication terminal AP. In addition, when the operation of transmitting the U-APSD trigger frame to the wireless communication terminal STA is not implemented, the wireless communication terminal has to wait in a PCR awake state until receiving the beacon frame, and may return to the PCR doze state only after confirming the indicator that there is no non-DE AC data to the AID of the wireless communication terminal in a traffic indication map (TIM) element. In FIG. 27(a), after wake-up, the wireless communication terminal STA maintains the PCR awake state until receiving a beacon frame including the TIM element.

In addition, when the BU corresponding to the AC configured as non-trigger-enabled (Non TE) in the U-APSD configuration is transmitted to the base wireless communication terminal, and the base wireless communication terminal transmits the Wake-Up frame to transmit the BU corresponding to the AC configured as non-trigger-enabled, there may be a problem. In FIG. 27(b), AC_BE corresponds to an AC configured as non-trigger-enabled (Non TE). The BU for the wireless communication terminal STA which corresponds to AC_BE is transmitted to the base wireless communication terminal AP. The base wireless communication terminal AP transmits the Wake-Up frame to the wireless communication terminal STA to transmit the BU corresponding to the AC_BE. The wireless communication terminal STA receives the Wake-Up frame, and wakes up the PCR transceiver. The wireless communication terminal STA transmits a QoS data frame of AC_VO or a QoS null frame of one of trigger-enabled (TE) ACs as a U-APSD trigger frame. The base wireless communication terminal AP receives the U-APSD trigger frame and transmits an Ack to the wireless communication terminal STA. Since the base wireless communication terminal AP does not have a buffered BU corresponding to AC_VO, the base wireless communication terminal transmits the QoS NULL frame in which the EOSP field is configured as 1 to the wireless communication terminal STA. Therefore, the SP ends. The base wireless communication terminal AP may signal that the BU of the non-deliver-enabled (Non DE) AC is in the buffer by configuring the More Data field of the QoS Null frame as 1. However, since the wireless communication terminal prepares to transmit the PS-poll frame when receiving the QoS null frame, the timing at which the DL BU is transmitted may be very delayed.

As in the above-described embodiments, the Wake-Up frame received by the wireless communication terminal is the frame for transmitting the BU corresponding to the AC; however, the wireless communication terminal may not know the type of AC. In this case, even if the wireless communication terminal wakes up the PCR transceiver, there may be a situation in which the BU buffered in the base wireless communication terminal is received. As a result, the power saving efficiency of the wireless communication terminal operating in the WUR mode may be greatly reduced.

Figure 28:
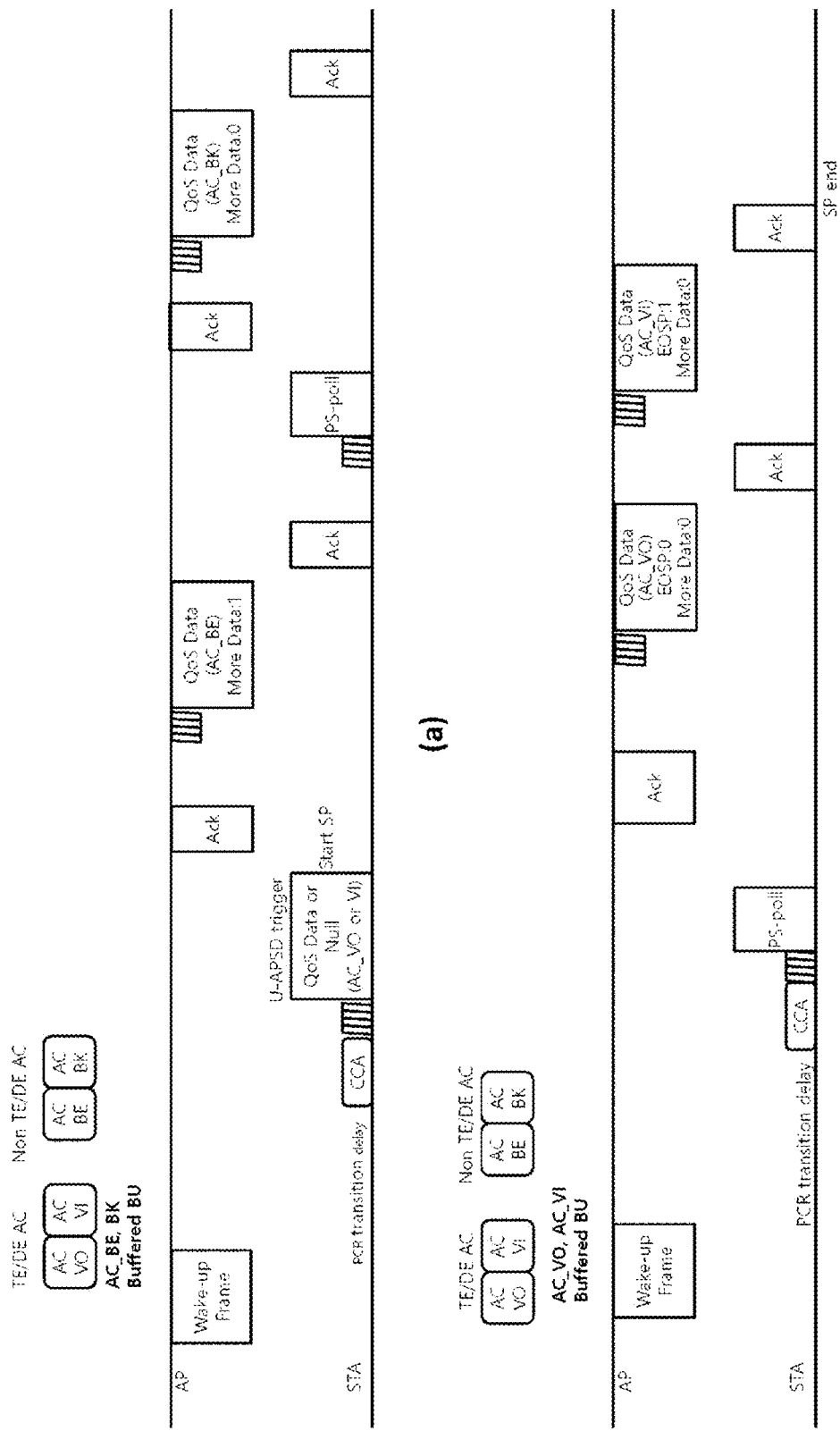
FIG. 28 illustrates a method of receiving a DL BU after wake-up, by a wireless communication terminal according to an embodiment of the present invention.

FIG. 28 illustrates a method of receiving a DL BU after wake-up, by a wireless communication terminal according to an embodiment of the present invention.

The base wireless communication terminal may transmit a frame including the DL BU regardless of the type of response frame transmitted by the wireless communication terminal. Specifically, even when the AC used for channel access for the Wake-Up frame transmission does not correspond to the PS protocol of the response frame, the base wireless communication terminal may transmit the frame including the DL BU of the AC. In addition, the base wireless communication terminal selects any one of the ACs having the BU for the wireless communication terminal, regardless of the PS protocol of the response frame transmitted by the wireless communication terminal, and may transmit a frame including the DL BU corresponding to the selected AC.

In FIG. 28(a), the BU for the wireless communication terminal STA when the AC corresponds to AC_BE and the BU for the wireless communication terminal STA and the AC corresponds to AC_BK is transmitted to the base wireless communication terminal AP. The base wireless communication terminal performs channel access for the Wake-Up frame transmission using AC_BE. The base wireless communication terminal AP transmits the Wake-Up frame to the wireless communication terminal STA. The wireless communication terminal receives the Wake-Up frame and wakes up the PCR transceiver. The wireless communication terminal STA transmits the U-APSD trigger frame to the base wireless communication terminal AP. In this case, the U-APSD trigger frame is the QoS data frame or the QoS null frame corresponding to AC_VO or AC_VI. The base wireless communication terminal AP transmits an Ack to the wireless communication terminal STA. The base wireless communication terminal (AP) transmits, to the wireless communication terminal STA, the QoS data frame including the DL BU corresponding to AC_BE buffered in the base wireless communication terminal, regardless of AC indicated by the U-APSD trigger frame. In this case, the More Data field of the QoS data frame is set to 1. The wireless communication terminal STA that has received the DL BU may change the PS protocol to the normal PS mode according to the AC of the BU. When the PS mode is changed to the normal PS mode, the wireless communication terminal STA may poll DL transmission by transmitting the PS-poll frame until a frame having a More Data field of 0 is received.

In the U-APSD configuration where AC_VO and AC_VI are trigger-enabled (TE) and deliver-enabled (DE) ACs, the wireless communication terminal STA is operating in the WUR mode. In this case, the BU for the wireless communication terminal STA which corresponds to AC_VO and corresponds to the BU for the wireless communication terminal STA and AC_VI is transmitted to the base wireless communication terminal AP. The wireless communication terminal performs channel access for the Wake-Up frame transmission using AC_VO. The base wireless communication terminal AP transmits the Wake-Up frame to the wireless communication terminal STA. The wireless communication terminal receives the Wake-Up frame and wakes up the PCR transceiver. The wireless communication terminal STA transmits the PS-poll frame to the base wireless communication terminal AP. The base wireless communication terminal AP may select and transmit one of the DL BU of AC_VO used to transmit the Wake-Up frame, the DL BU of AC_VO buffered in the base wireless communication terminal, or the DL BU of AC_VI buffered in the base wireless communication terminal. The base wireless communication terminal AP may transmit, to the wireless communication terminal STA, the QoS data frame including one of the DL BU of AC_VO used to transmit the Wake-Up frame, the DL BU of AC_VO buffered in the base wireless communication terminal, or the DL BU of AC_VI buffered in the base wireless communication terminal. In this case, the EOSP field of the QoS data frame may be set to 0. The wireless communication terminal STA may change the PS protocol from the normal PS mode to U-APSD according to the received AC of the BU. The wireless communication terminal may maintain the PCR awake state at least until the wireless communication terminal receives the BU of deliver-enabled (DE) AC with EOSP set to 1.

The embodiment described with reference to FIG. 28 may be equally applied in a situation in which the base wireless communication terminal transmits the Wake-Up frame to a plurality of wireless communication terminals in order to transmit the DL BU to the plurality of wireless communication terminals.

Figure 29:
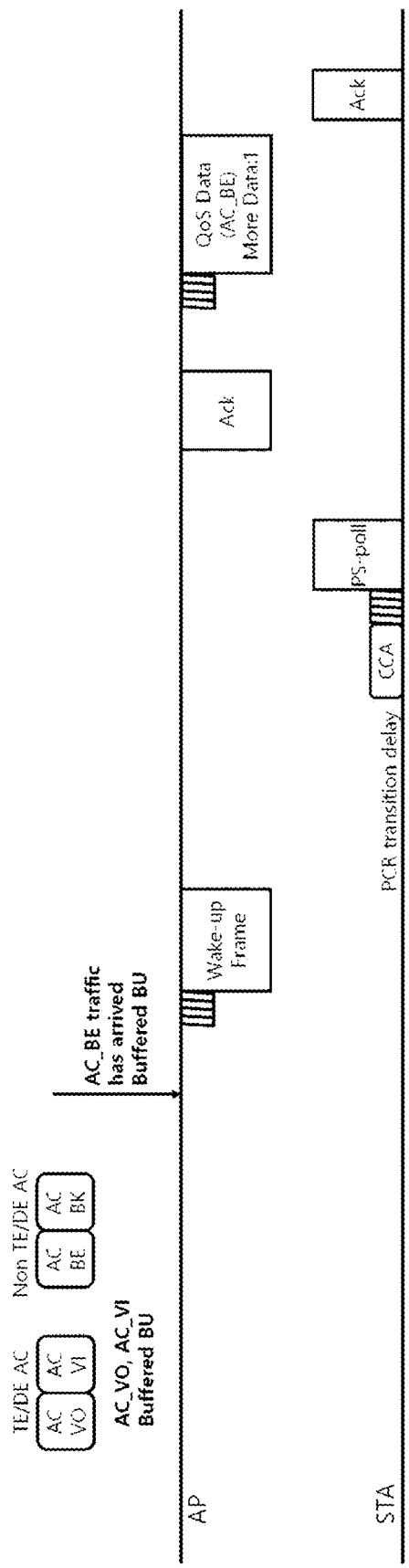
FIG. 29 illustrates a method of receiving a DL BU after wake-up, by a wireless communication terminal according to an embodiment of the present invention.

FIG. 29 illustrates a method of receiving the DL BU after wake-up, by the wireless communication terminal according to an embodiment of the present invention.

The base wireless communication terminal may not transmit the Wake-Up frame to the wireless communication terminal operating in the WUR mode for transmission of the BU of U-APSD. Specifically, it may be limited that the base wireless communication terminal transmits the Wake-Up frame to the wireless communication terminal operating in the WUR mode for transmission of the BU of U-APSD. When U-APSD is used, the wireless communication terminal may trigger transmission of the DL BU. Therefore, except when the wireless communication terminal specifies that all ACs are used in U-APSD, the base wireless communication terminal may not signal that the BU of the deliver-enabled (DE) AC in the TIM element is buffered in the buffer of the base wireless communication terminal. The wireless communication terminal may induce transmission of the DL BU by transmitting the U-APSD trigger frame to the base wireless communication terminal at a time point desired by the wireless communication terminal regardless of the beacon frame. Therefore, when the base wireless communication terminal transmits the Wake-Up frame for transmission of the BU corresponding to trigger-enabled (TE)/deliver-enabled (DE) AC in U-APSD, receiving the DL BU at a time point desired by the wireless communication terminal may be disturbed and unnecessary power consumption of the wireless communication terminal may be caused. To prevent this, the base wireless communication terminal may operate as follows.

When the communication terminal uses the U-APSD, the base wireless communication terminal may not transmit the Wake-Up frame for transmission of the BU corresponding to trigger-enabled (TE)/deliver-enabled (DE) AC in U-APSD. In this case, the base wireless communication terminal may transmit the Wake-Up frame only for the BU corresponding to the non-deliver-enabled (non-DE) AC. In the embodiment, when the wireless communication terminal receives the Wake-Up frame, the wireless communication terminal may determine that the Wake-Up frame has been transmitted for transmission of the BU corresponding to the non-deliver-enabled (non-DE) AC. In addition, the base wireless communication terminal may transmit the Wake-Up frame only to the BU corresponding to the non-deliver-enabled (non-DE) AC, and may transmit the BU to the wireless communication terminal according to the normal PS mode regardless of the type of the response frame transmitted by the wireless communication terminal. Since the base wireless communication terminal may not transmit the Wake-Up frame for transmission of the BU corresponding to a trigger-enabled (TE)/delivery-enabled (DE) AC in U-APSD, the wireless communication terminal may periodically wake up the PCR transceiver to transmit the U-APSD trigger frame to the base wireless communication terminal. In this way, the wireless communication terminal may receive the BU corresponding to the trigger-enabled (TE)/deliver-enabled (DE) AC in U-APSD.

In FIG. 29, the trigger-enabled (TE)/deliver-enabled (DE) ACs in U-APSD are AC_VO and AC_VI. Although the BU corresponding to AC_VO and the BU corresponding to AC_VI are in the buffer of the base wireless communication terminal, the base wireless communication terminal does not transmit the Wake-Up frame to the wireless communication terminal. After the BU of AC_BE, which is non-deliver-enabled (non-DE AC), is transmitted to the buffer of the base wireless communication terminal, the base wireless communication terminal transmits the Wake-Up frame to the wireless communication terminal. The wireless communication terminal wakes up the PCR transceiver based on the Wake-Up frame. Then, the wireless communication terminal receives the DL BU from the base wireless communication terminal according to the normal PS mode.

In the above-described embodiment, when the wireless communication terminal uses U-APSD for all ACs, the Wake-Up frame for transmission of the BU corresponding to the trigger-enabled (TE)/deliver-enabled (DE) AC in the U-APSD may be transmitted. In this case, even if the wireless communication terminal receives the Wake-Up frame, the wireless communication terminal may not wake-up immediately after receiving the wake-up. In this way, the wireless communication terminal may receive, from the base wireless communication terminal, a BU corresponding to the trigger-enabled (TE)/deliver-enabled (DE) AC in U-APSD at a time point desired by the wireless communication terminal. In addition, the base wireless communication terminal transmits the Wake-Up frame to the wireless communication terminal, and then, even if the PCR switching delay elapses from the time of the transmission of the Wake-Up frame by the base wireless communication terminal, the base wireless communication terminal may not transmit the BU to the wireless communication terminal until the wireless communication requests it. Furthermore, the base wireless communication terminal may transmit the BU to the wireless communication terminal by using the U-APSD SP, only when the wireless communication terminal transmits the U-APSD trigger frame. In the embodiment, the base wireless communication terminal may not determine whether or not the Wake-Up frame transmission fails. However, the base wireless communication terminal may retransmit the Wake-Up frame. The base wireless communication terminal may increase the reliability of the Wake-Up frame transmission in this way.

In the above-described embodiment, when the wireless communication terminal enters into the TWT negotiation with the base wireless communication terminal, the Wake-Up frame for transmission of the BU corresponding to the trigger-enabled (TE)/deliver-enabled (DE) AC in the U-APSD may be transmitted. When the wireless communication terminal uses the TWT, within the TWT SP, the base wireless communication terminal may transmit as many BUs as desired by the base wireless communication terminal to the wireless communication terminal regardless of the type of the poll frame of the wireless communication terminal. In addition, when the base wireless communication terminal transmits the Wake-Up frame to the wireless communication terminal, the base wireless communication terminal may use the nearest TWT SP after the wireless communication terminal wakes up the PCR transceiver.

Consequently, the base wireless communication terminal may efficiently transmit a BU to the wireless communication terminal within the TWT SP. Therefore, when the communication terminal enters into the TWT negotiation with the base wireless communication terminal, the Wake-Up frame for transmission of the BU corresponding to a trigger-enabled (TE)/deliver-enabled (DE) AC in U-APSD may be transmitted.

The description of the present disclosure described above is only exemplary, and it will be understood by those skilled in the art to which the present disclosure pertains that various modifications and changes can be made without changing the technical spirit or essential features of the present disclosure. Therefore, it should be construed that the embodiments described above are illustrative in all respects and not restrictive. For example, each component described as a single type may be implemented in a distributed manner, and similarly, components described as being distributed may also be implemented in a combined form.

The scope of the present disclosure is indicated by the attached claims rather than the detailed description, and it should be construed that all changes or modifications derived from the meaning and scope of the claims and their equivalents are included in the scope of the present disclosure.

The invention claimed is:

1. A wireless communication terminal for wireless communicating, comprising:
   a first wireless transceiver transmitting and receiving a signal through a first waveform;
   a second wireless receiver receiving a signal through a second waveform different from the first waveform; and
   a processor, wherein the processor is configured to:
   receive, from a base wireless communication terminal of a basic service set (BSS) to which the wireless communication terminal belongs, a starting group identifier corresponding to a first bit of a bitmap and the bitmap indicating one or more group identifiers allocated to one or more groups including the wireless communication terminal together with the starting group identifier through the first wireless receiver,
   determine, as a group identifier allocated to the group including the wireless communication terminal, a value obtained by applying a modulo operation that uses a value obtained based on the starting group identifier and the bitmap as a numerator and the maximum number of values that the ID field is able to represent as a denominator,
   start receiving a variable length Wake-Up frame through the second wireless receiver, from the base wireless communication terminal,
   determine whether or not a Frame Body field of the Wake-Up frame includes an identifier of the wireless communication terminal, when an ID field of the Wake-Up frame indicates the group identifier allocated to the group including the wireless communication terminal, and
   wake up the first wireless transceiver based on the Wake-Up frame, when the Frame Body field of the Wake-Up frame includes the identifier of the wireless communication terminal,
   wherein the Frame Body field of the Wake-Up frame does not include an identifier of a wireless communication terminal that is not included in a group identified by the ID field, when the Wake-Up frame has a variable length and the ID field of the Wake-Up frame indicates a group identifier identifying a group including one or more wireless communication terminals.

2. The wireless communication terminal of claim 1, wherein the processor is configured to determine that a group identifier corresponding to (starting group id, SGID+n) %(2^12) is allocated to the group including the wireless communication terminal when a value of a bit position n of the bitmap is 1,
   a bit position 0 of the bitmap indicates a first bit of the bitmap, and
   the SGID is the starting group identifier.

3. The wireless communication terminal of claim 1, wherein the processor is configured to stop receiving the Wake-Up frame based on whether or not an identifier acquired from the Frame Body field of the Wake-Up frame in a location order in the Frame Body field is greater than the identifier of the wireless communication terminal, and
   the Frame Body field includes identifiers of one or more wireless communication terminals, and the identifiers of the one or more wireless communication terminals in the Frame Body field are located in order from a smaller value to a larger value.

4. The wireless communication terminal of claim 3, wherein the processor is configured to deliver, to a physical layer of the wireless communication terminal, a command for resetting a clear channel assessment (CCA) function when the wireless communication terminal stops receiving the Wake-Up frame.

5. The wireless communication terminal of claim 1, wherein the processor is configured to stop receiving the Wake-Up frame when the ID field indicates a group identifier of a group that does not include the wireless communication terminal.

6. A base wireless communication terminal for wireless communicating, comprising:
   a first wireless transceiver transmitting and receiving a signal through a first waveform;
   a second wireless transmitter transmitting a signal through a second waveform different from the first waveform; and
   a processor, wherein the processor is configured to:
   establish a bitmap such that a value obtained based on a modulo operation indicates a group identifier allocated to a group including a wireless communication terminal receiving the bitmap, wherein the value obtained based on the modulo operation is obtained based on the modulo operation in which a value obtained based on a starting group identifier and the bitmap is a numerator and the maximum number of values that the ID field is able to represent is a denominator, wherein the starting group identifier indicates the group identifier corresponding to a first bit of the bitmap of the group,
   transmit, through the first wireless transmitter, the starting group identifier and the bitmap to at least one wireless communication terminal of the BSS,
   insert, into an ID field of a variable length Wake-Up frame, a group identifier identifying a group of wireless communication terminals including one or more wireless communication terminals belonging to a basic service set (BSS) operated by the base wireless communication terminal;
   insert an identifier of at least one of the one or more wireless communication terminals and does not insert an identifier of a wireless communication terminal that is not included in a group identified by the group identifier, into a Frame Body field of the Wake-Up frame, and transmit, through the second wireless transmitter, the Wake-Up frame to one or more wireless communication terminal of the basic service set (BSS) operated by the base wireless communication terminal.

7. The base wireless communication terminal of claim 6, wherein the processor establishes the bitmap such that a group identifier corresponding to (starting group id, SGID+n) %($2^{12}$) is allocated to a group including the wireless communication terminal, when a value of a bit position n of the bitmap field is 1,
a bit position 0 of the bitmap indicates a first bit of the bitmap, and
the SGID is the starting group identifier.

8. The base wireless communication terminal of claim 7, wherein the processor allocates the group identifier within a subset of consecutive values obtained in 0 to 0xFFF.

9. The base wireless communication terminal of claim 6, wherein the processor inserts identifiers of the one or more wireless communication terminals into the Frame Body field such that the identifier of the at least one wireless communication terminal is located in the Frame Body field in order from a smaller value to a larger value.

10. A method of operating a wireless communication terminal transmitting and receiving a signal through a first waveform and receiving a signal through a second waveform different from the first waveform, the method comprising:
receiving, from a base wireless communication terminal of a basic service set (BSS) to which the wireless communication terminal belongs, a starting group identifier corresponding to a first bit of a bitmap and the bitmap indicating one or more group identifiers allocated to one or more groups including the wireless communication terminal together with the starting group identifier through the first waveform,
determining, as the group identifier allocated to the group including the wireless communication terminal, a value obtained by applying a modulo operation that uses a value obtained based on the starting group identifier and the bitmap as a numerator and the maximum number of values that the ID field is able to represent as a denominator,
starting receiving a variable length Wake-Up frame through the second waveform, from the base wireless communication terminal;
determining whether or not a Frame Body field of the Wake-Up frame includes an identifier of the wireless communication terminal, when an ID field of the Wake-Up frame indicates the group identifier allocated to the group including the wireless communication terminal; and
waking up a first wireless transceiver transmitting and receiving a signal through the first waveform based on the Wake-Up frame, when the Frame Body field of the Wake-Up frame includes the identifier of the wireless communication terminal, wherein the Frame Body field of the Wake-Up frame does not include an identifier of a wireless communication terminal that is not included in a group identified by the ID field, when the Wake-Up frame has a variable length and the ID field of the Wake-Up frame indicates a group identifier identifying a group including one or more wireless communication terminals.

11. The method of claim 10, wherein the determining the obtained value as the group identifier allocated to the group including the wireless communication terminal includes determining that a group identifier corresponding to (starting group id, SGID+n) %($2^{12}$) is allocated to the group including the wireless communication terminal when a value of a bit position n of the bitmap is 1,
a bit position 0 of the bitmap indicates a first bit of the bitmap, and
the SGID is the starting group identifier.

12. The method of claim 10, further comprising:
stopping receiving the Wake-Up frame based on whether or not an identifier acquired from the Frame Body field of the Wake-Up frame in a location order in the Frame Body field is greater than the identifier of the wireless communication terminal, wherein the Frame Body field includes identifiers of one or more wireless communication terminals, and the identifiers of the one or more wireless communication terminals in the Frame Body field are located in order from a smaller value to a larger value.

13. The method of claim 12, wherein the stopping receiving the Wake-Up frame includes delivering, by the processor, a command for resetting a clear channel assessment (CCA) function to a physical layer of the wireless communication terminal.

14. The method of claim 10, further comprising:
stopping, by the processor, receiving the Wake-Up frame when the ID field indicates a group identifier of a group that does not include the wireless communication terminal.

* * * * *